United States Patent Office 3,390,966
Patented July 2, 1968

3,390,966
CHEMICAL PRODUCTS AND THEIR
PREPARATION
Walter H. Knoth, Jr., Mendenhall, Pa., assignor to E. I.
du Pont de Nemours and Company, Wilmington, Del.,
a corporation of Delaware
No Drawing. Continuation-in-part of application Ser. No.
135,710, Aug. 24, 1961. This application Nov. 13, 1962,
Ser. No. 237,392
29 Claims. (Cl. 23—361)

This application is a continuation-in-part of my copending application Ser. No. 135,710, filed Aug. 24, 1961, now abandoned, which in turn, is a continuation-in-part of my application Ser. No. 6,852, filed Feb. 5, 1960, and now abandoned.

This invention relates to new boron compounds. More particularly, it relates to a new class of ionic boron compounds and to their preparation.

Boron compounds, particularly boron hydrides, have achieved technical importance in recent years. In many potential applications boron compounds, including boron hydrides, halides and alkyls, have been severely limited by hydrolytic, oxidative and other types of instability. To illustrate, diborane, chlorodiborane, pentaborane and trialkylboron compounds are spontaneously flammable in air. Diborane, pentaborane, chlorodiborane, boron trichloride, iododecaborane and most other boron halides are rapidly hydrolyzed in water or alcohol. Even the most stable known boron hydride, i.e., decaborane, is hydrolyzed at a moderate rate in water. Ionic boron hydrides, e.g., sodium borohydride and sodium decaborohydride, are similarly hydrolyzed at a rapid rate at 100° C.

This invention is directed to a broad class of boron compounds which have stability characteristics that are unique among boron compounds. The compounds of the invention generally show hydrolytic, oxidative and chemical stabilities normally associated with aromatic organic compounds.

The novel class of ionic boron compounds are represented generically by the following formula:

(1) $M_a(B_{10}H_{10-y}X_y)_b$

M is an atom or group of atoms which forms a cation, i.e., a positively charged ion, in aqueous solution; X represents a monovalent substituent capable of bonding to carbon of a benzene nucleus by replacement of hydrogen bonded to said carbon; $y$ is a positive whole number of 1–10, inclusive; and $a$ and $b$ are positive whole numbers of 1–3, inclusive, whose values are determined by the valence of M, i.e., $a$ multiplied by the valence of M is equal to $2b$. The X groups, when more than one is present, can be alike or different.

In the compounds represented by generic Formula 1, the novel and characterizing component is the boron-containing group shown in parentheses, i.e., $B_{10}H_{10-y}X_y$. This group forms an anion in aqueous solution and it behaves as a stable chemical entity or radical in conventional reactions. This group will be discussed more fully in later paragraphs with particular reference to the substituent X. Therefore the novel invention may be considered as comprising derivatives of the acid $H_2B_{10}H_{10}$ and its salts, wherein at least one hydrogen of the $B_{10}H_{10}{}^{2-}$ anion is replaced by an X substituent.

The group M

In the generic formula, M is a group which can be composed of one or more than one element and which is ionically bonded to the boron-containing group. To illustrate, when M is a monovalent group, the compound can be represented by the following formula to show the ionically-bonded groups: $(M^+)_2(B_{10}H_{10-y}X_y)^=$. When M is a divalent group, the compound is represented as follows: $M^{++}(B_{10}H_{10-y}X_y)^=$. In like manner, when M is a trivalent group, the compound is repressented as follows: $(M^{+++})_2(B_{10}H_{10-y}X_y^=)_3$.

The groups represented by M bear a positive ionic charge and they have in common the property of forming positively charged groups in water. The properties of these positively charged groups are not critical. The group M represents a broad range of elements and combinations of elements. To illustrate, M can be hydrogen, hydronium ($H_3O^+$), a metal, ammonium ($NH_4^+$), hydrazonium ($NH_2$—$NH_3^+$), N-substituted hydrazonium, aryldiazonium, sulfonium, phosphonium, metal ammine, long chain pyridinium, and the like.

To illustrate, M can be lithium, sodium, cesium, beryllium, barium, lanthanum, zirconium, vanadium, manganese, iron, cobalt, copper, zinc, mercury, aluminum, thallium, tin, lead, antimony, bismuth, silver, or any other metal.

As further more specific examples, M can be $RNH_3^+$, $R_2NH_2^+$, $R_3NH^+$, $R_4N^+$, $(RNHNH_3)^+$, $(R_2N$—$NH_2)^+$, $R_3S^+$, or $R_4P^+$, where R is an organic radical bonded to the nitrogen, sulfur or phosphorus. The R groups are not critical features of these cation groups. The substituents represented by R can be open-chain or closed-chain, saturated or unsaturated, or the groups can be composed of heterocyclic rings of which the nitrogen, sulfur, or phosphorus is a component, e.g., pyridine, quinoline, morpholine, hexamethyleneimine, and the like. Preferably R, for reasons of availability of reactants, represents a hydrocarbon group of at most 18 carbons.

The group M can be a Werner-type coordination complex, e.g., a metal ammine such as $[Ni(NH_3)_6]^{+2}$, $[Zn(NH_3)_6]^{+2}$, $[Co(NH_2C_2H_4NH_2)_3]^{+2}$, $[Co(NH_3)_6]^{+3}$, and the like.

The group $(B_{10}H_{10-y}X_y)^{-2}$

The pertinent feature in the novel group

is the substituent X, which is bonded to boron. The number of substituents which can be present in the group is not less than 1 or more than 10 and the substituents can be alike or different.

In its broadest aspects, X is a monovalent group which has the characterizing property of forming X—C bonds where C represents a carbon which is a nuclear member of a benzene ring and where the X—C bond is formed in place of the H—C bond. The property of forming X—C bonds, where C is nuclear carbon as defined above, is common to all the groups which are represented by X.

The group X can represent a substituent introduced into the $B_{10}H_{10}{}^{2-}$ anion by direct reaction or it can represent a substituent obtained by subsequent chemical modification of a group which has been introduced by direct reaction, e.g., a substituent obtained by reduction, esterification, hydrolysis or amidation of directly introduced groups.

The ionic charge of —2 on the boron-containing anion refers to a charge which is inherent in the boro-hydrogen cage structure. The value of the ionic charge is independent of and does not take into consideration any ionic charge which may reside in the X substituents by virtue of ionizable functional groups. The ions which are formed by ionizable substituents are considered to be part of the X groups and are included within the definition of these groups. For example, carboxyl, sulfo, amino and like substituents will function as groups which possess acidic or basic properties which are independent of the properties of the boron cage structure.

Compounds of the invention are obtained by processes which employ as a principal reactant a salt or acid having the $B_{10}H_{10}^{-2}$ anion. In one process, substituents are introduced directly into the $B_{10}H_{10}^{-2}$ anion by reaction with an electrophilic reagent. Substituents obtained by this process are called hereinafter "electrophilic groups" and these groups form a preferred class of substituents. Thus, in this preferred group, X is a monovalent group which is capable of bonding to carbon of a benzene nucleus by reaction of benzene or a substituted benzene with an electrophilic reagent.

An electrophilic group is a group which is deficient in electrons and which has a point of low electron density. Electrophilic groups and reagents which are employed to effect substitution of such groups for hydrogen on carbon of a benzene nucleus are described in conventional textbooks, of which the following are examples:

Remick, "Electronic Interpretations of Organic Chemistry," pp. 89–110, Wiley (1943).
Ingold, "Structure and Mechanism in Organic Chemistry," pp. 198–200, 269–304 (especially pp. 202, 211), Cornell University Press (1953).
Fuson, "Advanced Organic Chemistry," chap. 1, Wiley (1953).
Wheland, "Advanced Organic Chemistry," 2nd ed., p. 83, Wiley (1949).

Examples of electrophilic groups or substituents which are included in the scope of X are as follows: halogens (F, Cl, Br, I), hydrocarbon (—R′), $$\text{carboxyl } (-\overset{O}{\underset{\|}{C}}-OH), \text{ N, N-disubstituted carbamyl } (-\overset{O}{\underset{\|}{C}}-NR'_2)$$

$$\text{haloformyl } (-\overset{O}{\underset{\|}{C}}-Y, \text{ where Y is F, Cl, Br, I})$$

cyano (—CN), trihalomethyl (—CCl₃, —CF₃, etc.), $$\text{acyl } (-\overset{O}{\underset{\|}{C}}-R'), \text{ formyl } (-\overset{O}{\underset{\|}{C}}-H)$$

nitro (—NO₂), nitroso (—NO), hydrocarbylazo $$(-N{=}N{-}R')$$

sulfo (—SO₃H), sulfonyl (—SO₂R′), and mercuric acetyl $$(-\text{HgO}\overset{O}{\underset{\|}{C}}CH_3)$$

R′ where used in the above substituents is a monovalent organic group which is preferably a hydrocarbon group (alkyl, cycloalkyl, alkenyl, cycloalkenyl, aryl, alkaryl, aralkyl) of at most 18 carbons.

A second and larger preferred group of compounds of the invention includes those in which X can be introduced directly into the $B_{10}H_{10}^{-2}$ anion, not necessarily by electrophilic attack, or the group can be obtained by modification of an X substituent present on the anion. Examples of substituents which are included within the scope of X in this preferred group are as follows: halogens (F, Cl, Br, I), hydrocarbon, carboxyl $$(-\overset{O}{\underset{\|}{C}}-OH)$$

carbamyl and N-substituted carbamyl $$(-\overset{O}{\underset{\|}{C}}-NH_2, -\overset{O}{\underset{\|}{C}}-NHR'), -\overset{O}{\underset{\|}{C}}-NR_2'), \text{ halocarbonyl } (-\overset{O}{\underset{\|}{C}}-Y$$
where Y is F, Cl, Br, I)

halomethyl (—CH₂Y′, where Y′ is F, Cl, Br, I), hydroxyl (—OH), hydrocarbonoxy (—OR′), monooxahydrocarbonoxy (R′OR′O—), acetal [—CH(OR′)₂], ketal [—CR′(OR′)₂], hydrocarboncarbonyloxy $$[-OC(O)R']$$

hydrocarbonoxycarbonyl [—C(O)OR′], isocyanate $$(-NCO)$$

thiocyanate (—CNS), isothiocyanate (—NCS), hydrocarbonmercapto (—SR¹), hydroxymethyl (—CH₂OH), hydrocarbonoxymethyl (—CH₂OR′), aminomethyl $$(-CH_2NH_2, -CH_2NHR', -CH'NR'_2),$$

cyano (—CN), amino (—NH₂), substituted amino (—NHR′, —NR₂′), trihalomethyl (—CCl₃, —CR₃, etc.), $$\text{acyl } (-\overset{O}{\underset{\|}{C}}-R), \text{ formyl } (-\overset{O}{\underset{\|}{C}}-H)$$

nitro (—NO₂), nitroso (—NO), azo (—N=N—Ar, where Ar is an aromatic hydrocarbon of up to 10 carbons), sulfo (—SO₃H), sulfonyl (—SO₂R′), and acetoxymercury (—HgOCCH₃); R′, where used in the above substituents, is a monovalent organic group which is preferably a hydrocarbon group (alkyl, cycloalkyl, alkenyl, cycloalkenyl, aryl, alkaryl, aralkyl, and the like) of at most 18 carbons.

The number of substituents which can be present on the decahydrodecaborate(2−) anion is not less than 1 or more than 10. Thus, the anion $(B_{10}H_{10-y}X_y)^{-2}$, in the generic formula, $(M)_a(B_{10}H_{10-y}X_y)_b$, may range from $(B_{10}H_9X)^{-2}$ through successively decreasing hydrogen content to $(B_{10}X_{10})^{-2}$.

Examples of the new compounds of the invention, illustrated by formulas are as follows:

$[(CH_3)_4N]_2(B_{10}H_9OH)$, $[(C_2H_5)_2NH_2]_2(B_{10}H_9OCH_3)$ $Hg[B_{10}H_8(OH)_2]$, $(H_3O)_2(B_{10}H_9COOH)$ $[(CH_3)_2N\text{---}NH_3]_2(B_{10}H_8Cl_2)$ $CaB_{10}H_6Cl_4$, $Na_2[B_{10}H_8(CH_3)_2]$, $K_2(B_{10}H_9C_2H_5)$ $Li_2(B_{10}H_9\overset{O}{\underset{\|}{C}}OCH_3)$, $[Al(OH)_6]_2(B_{10}H_9\overset{O}{\underset{\|}{C}}NH_2)_3$ $Zn(B_{10}H_9\overset{O}{\underset{\|}{C}}NHCH_3)$, $Hg[B_{10}H_9\overset{O}{\underset{\|}{C}}N(C_2H_5)_2]$ $Cu(H_2O)_4[B_{10}H_8(CN)_2]$, $Ni(B_{10}H_9CF_3)$ $Co(H_2O)_6(B_{10}H_5Cl_5)$ $Fe_2(B_{10}Cl_{10})_3$, $(H_3O)_2[B_{10}H_8(SO_3H)_2]$ $Na_2B_{10}H_9(HgO\overset{O}{\underset{\|}{C}}CH_3)$ $Cs_2B_{10}H_9C(CN){=}C(CN)_2$, $CsHB_{10}H_8(C_6H_5)_2$ $(C_4H_9NH_3)_2(B_{10}H_9SO_2NH_2)$ $(NH_4)_2B_{10}H_4F_6$, $K_2B_{10}H_8F_2$, $(NH_4)_2(B_{10}H_9SO_2C_6H_5)$ $Ba[B_{10}H_7(NO_2)_3]$, $Sn[B_{10}H_8(NO_2)]_2$ $Mn(H_2O)_6[B_{10}H_9N(CH_3)_2]_2$ $MgB_{10}]_{10}Br_{10}$ $H_2B_{10}H_9\overset{O}{\underset{\|}{C}}CH_3$ $[Co(NH_3)_6]B_{10}H_5Cl_5$, $[Zn(NH_3)_4]B_{10}Br_{10}$ $[Co(H_2O)_6]B_{10}H_9C_2H_5$, $(C_6H_5NHNH_3)_2B_{10}I_{10}$ $[(CH_3)_4N]_2B_{10}H_8(OH)_2$ $[(CH_3)_3S]_2B_{10}H_8[OC(O)CH_3]_2$ and $[(C_4H_9)_4P]_2B_{10}H_9OCH_2CH_2OCH_3$ The scope of the monovalent groups encompassed by X in the generic formula for the compounds of the invention can be understood more clearly by describing methods for obtaining the compounds.

Preparation of compounds

Electrophilic substitution—In this method, which involves the direct substitution of hydrogen, two reactants are employed which are defined as follows:

(a) A boron-containing compound of the general formula $M_a(B_{10}H_{10})_b$, wherein M, a and b have the meanings given earlier in generic Formula 1 for the novel compounds.

(b) A reagent capable of introducing an electrophilic group into a benzene nucleus by replacement of hydrogen bonded to a carbon of said nucleus. This second reactant is referred to as an electrophilic reagent.

The characteristics of each group of reactants are discussed in more detail in the following paragraphs.

The boron-containing reactant, $M_a(B_{10}H_{10})_b$, is a dibasic acid or a salt of a dibasic acid which has, as a characterizing group, a divalent anion, $(B_{10}H_{10})^{-2}$. This anion will be referred to as the "decahydrodecaborate(2−) anion" or, for simplicity, as "decahydrodecarborate(2−)."

At this point, it should be noted that the novelty of the compounds of the invention is such that no officially approved system of nomenclature has yet been established. The name "decahydrodecaborate(2−)" follows the lines recommended for naming other boron compounds and its use here permits the logical naming of a derivative of the $(B_{10}H_{10})^{-2}$ anion as a substituted "decaborate(2−)."

Decahydrodecaborate(2−) is a unique species of divalent anion which has remarkable and unexpected chemical properties. In many respects it shows much greater chemical stability than any previously reported boron hydride, whether neutral or bearing a charge. For example, the anion is inert to sodium methoxide in refluxing methanol and it does not hydrolyze in water. The anion forms salts with basic materials, e.g., amines and metals, and from these salts there can be obtained a strongly acidic hydronium compound by treatment with an ion exchange resin. Solutions of silver nitrate are not reduced by aqueous solutions containing the $B_{10}H_{10}^{-2}$ anion, a behavior which is in marked contrast to the behavior of other boron hydrides.

It is surprising, in view of the chemical stability described above, to find that the decahydrodecaborate(2−) anion undergoes electrophilic substitution reactions in a manner which resembles the behavior of a carbocyclic aromatic compound, e.g., benzene or naphthalene. More specifically, the hydrogens bonded to boron in the $B_{10}H_{10}^{-2}$ group are replaceable by substituents which can also replace hydrogen bonded to nuclear carbon in benzene or a substituted benzene such as toluene. This behavior of the decahydrodecaborate(2−) anion is particularly surprising in view of the completely inorganic composition of the anion. It is the previously unknown "aromatic character" of the decahydrodecaborate(2−) anion which forms the basis of the present invention leading to a broad range of novel substituted decaborates(2−).

It is evident from the above description of the chemistry of the decahydrodecaborate(2−) anion that the second reactant, i.e., the electrophilic reagent, employed in preparing the novel compounds is a reagent which can effect a substitution reaction on a benzene nucleus. These reagents, in view of the extensive work which has been done on substitution reactions in the benzene nucleus, form a well-known group of compounds.

Electrophilic reagents which are broadly operable in the process are reagents which will effect direct substitution of hydrogen bonded to carbon of a benzene nucleus, i.e., the hydrogen is replaced by a group derived from the electrophilic reagent. Electrophilic reagents are compounds which react by acquiring electrons or acquiring a share in electrons which previously belonged to a foreign molecule (see Ingold, vide supra, p. 201). Examples of electrophilic reagents which are within the scope of the above definition and which are operable in the process of the invention are given below, together with the substituent group which in the process is bonded to boron in the final product.

| Electrophilic Reagent | Electrophilic Group Bonded to Boron |
|---|---|
| Halogens ($F_2$, $Cl_2$, $Br_2$, $I_2$) | Halogen (F, Cl, Br, I) |
| Cyanogen halides (CNF, CNCl) | Nitrile (CN) |
| Sulfuric acid | —$SO_3H$ |
| Nitric acid | —$NO_2$ |
| $H_2NOSO_3H$ | —$NH_2$ |
| Olefins | —alkyl [e.g., —$C_2H_5$, —$CH(CH_3)_2$] |
| Acetylenes | —alkenyl |
| Acyl halides | $-\overset{O}{\underset{\|}{C}}-R''$ |
| $Hg(OCCH_3)_2$ | —$HgOCCH_3$ |
| $(CN)_2C=C(CN)_2$ | —(CN)C=C(CN)_2 |
| $HNO_2$ | —NO |
| CO/HCl | $-\overset{O}{\underset{\|}{C}}H$ |
| $R'SO_2Cl$ | —$SO_2$—$R''$ |
| $R_2''NCCl$ | $-\overset{O}{\underset{\|}{C}}NR_2''$ |
| $(R''OR''' \cdot H)^+Cl^-$ (oxonium salt) | —$OR''$ |
| $(R''OH_2)^+Cl^-$ (oxonium salt) | —OH |
| $(H_3O)^+Cl^-$ (hydronium salt) | —OH |
| $R''SCl$ | —$SR''$ |

In the above groups, R'' is a monovalent organic radical, preferably hydrocarbon of at most 18 carbons, which can be alkyl, alkenyl, cycloalkyl, cycloalkenyl, aryl, alkaryl, aralkyl, and the like.

In the reactions employing some of the above electrophilic reagents, a catalyst may be used, e.g., aluminum trichloride, boron trifluoride and polyphosphoric acid. These catalysts are employed in the same manner as in the well-known procedures in organic chemistry. In some cases the boron compounds themselves function as catalysts, e.g., in alkylation of $(H_3O)_2B_{10}H_{10}$.

The electrophilic reagents employed in the process are materials which are usually readily available or which are obtained by conventional methods.

Processes which are employed to introduce one or more X groups on the boron cage are not necessarily identical with the processes employed to introduce the X groups on a benzene nucleus. Consideration must be given to differences in reactivity or in reaction mechanism between a completely inorganic system, as represented by the $B_{10}H_{10}^{-2}$ anion, and an organic aromatic system represented by the benzene ring. The differences in preparative procedures which may be employed do not change in any way the common characteristic or property of all of the X groups, i.e., the property of bonding to a nuclear carbon of a benzene ring.

It is surprising that, despite the inorganic nature of the boron-containing reactant, so many of the processes employed in aromatic chemistry are, in fact, operable in the present invention, e.g., the processes of halogenation, alkylation, acylation, amination, and the like. Even more surprising and unexpected is the fact that the X groups bonded to boron in the decaborate(2−) anion exhibit a chemical behavior in subsequent reactions which resembles closely the behavior of the same X groups bonded to an aromatic nuclear carbon. This similarity in behavior permits the preparation of a broad range of X substituents bonded to the boron cage.

In view of the above discussion, it is obvious that a wide range of processes is available for the preparation of compounds of the invention. These processes are illustrated more fully in the examples which appear later.

In the preparation of the compounds of the invention by the process described above, the substitutent which ultimately is bonded to boron in the final product is not necessarily the substituent which would be obtained with a process employing a conventional carbocyclic aromatic reactant. To illustrate, reaction of formaldehyde with a decahydrodecaborate yields a compound of Formula 1 in which X is —$OCH_3$ instead of —$CH_2OH$ which might be obtained. Variations of this nature from conventional results are not unexpected in view of the completely inorganic character of the decahydrodecaborate reactant. Such variations do not change the view of the basic aromatic character of the boron sphere or cage in the decaborate anion.

The boron hydride reactants of the formula $$M_a(B_{10}H_{10})_b$$

are materials which can be obtained by relatively simple methods from a decaborane(12)/organic sulfide adduct of the general formula $B_{10}H_{12} \cdot 2YSY'$, where Y and Y' are hydrocarbon groups, preferably alkyl. The adduct is prepared by reacting an organic sulfide of the formula YSY' with decaborane(14), i.e., $B_{10}H_{14}$, at a temperature between 0° and 150° C. until approximately 1 mole of hydrogen is evolved. The decaborane(12)/organic sulfide adduct is then reacted with liquid ammonia or an amine at a temperature between about −50° C. and 0° C. for about 1 hour to obtain the salt $M_a(B_{10}H_{10})_b$, where M represents the cation derived from ammonia or the amine. Thus, with liquid ammonia as the reagent, M is $(NH_4^+)_2$; with methylamine, M is $(CH_3NH_3^+)_2$; and with tert.-butylamine, M is $[(CH_3)_3CNH_3^+]_2$.

Reaction of the decahydrodecaborate(2−) salts to obtain the compounds of the invention is conducted in conventional vessels with corrosion-resistant inner surfaces, e.g., glass, platinum, poly(tetrafluoroethylene)resin, and the like. The decahydrodecaborate salt, $M_a(B_{10}H_{10})_b$, and, optionally, an inert liquid solvent is charged into the reaction vessel. The electrophilic reactant is then supplied to the reaction vessel at a temperature and at a rate which will provide a controllable reaction and which will bring the reaction to completion within a reasonable time. When electrophilic reagents are employed which are hydrolytically stable, water or alcohols (methanol, ethanol) can be used conveniently as a solvent for the reaction. Other solvents can be used, for example, diethyl ether, benzene, heptane, carbon tetrachloride, carbon disulfide, and the like.

The temperature at which the reaction is conducted will be determined largely by the reactivity of the electrophilic reagent. In general, the temperature will be between about −20° C. and 150° C. Preferably, the temperature will be between about 0° and about 100° C.

The time of reaction in a batch process will also depend to a considerable extent on the reactivity of the electrophilic reagent. The reaction generally proceeds rapidly and, with thorough mixing of the reactants, the time may be as low as 5 minutes or even less. Generally a reaction time between about 10 minutes and 5 hours is sufficient. It is desirable and advantageous to mix the reactants by any suitable means although mixing is not essential for operability. In some cases, e.g., with alkyl halides as the electrophilic reagent, catalysts are used in the process employing the technology of well-known organic aromatic chemistry.

The reaction can be conducted under pressure, if desired, but it is not essential to use pressure. In most cases, the reaction proceeds satisfactorily at atmospheric pressure.

The proportions in which the reactants are used are not critical. It is preferable, in order to obtain maximum yield of desired product, to use at least one mole of the electrophilic reagent for each hydrogen which is to be replaced on the decaborate (2−) anion. It is not essential, however, that these ratios be used.

The compounds are purified by well-known and recognized procedures. For stable products, conventional crystallization procedures are used, employing water or alcohol as solvents. For products of limited stability, solutions of the products can be treated with absorptive agents, e.g., activated carbon or silica gel, to adsorb the major portion of the impurities.

Indirect substitution.—A second process for obtaining compounds of the invention in which X is hydroxyl, amine or substituted amine, is conducted in two steps. The reactants in the process are (1) a decahydrodecaborate(2−), described in the previous process, and (2) an amide derived from a carboxylic acid. In the initial step in the reaction an intermediate product can be obtained which, particularly in the preparation of products bearing —OH groups, is isolated and used in a second stage in the process. The intermediate reactant thus obtained can be a non-ionic compound of the formula $B_{10}H_8 \cdot 2Z$ or an ionic-type compound of the formula $M(B_{10}H_9 \cdot Z)_b$ where Z is an amide of a carboxylic acid, M has the meaning given in Formula 1 and b is a number which is equal to the chemical valence of M. These prodducts are new and their preparation is described more fully in the following paragraphs.

The intermediate products described above are not isolated in processes to obtain compounds bearing —NR₂ substituents.

The amide and a decahydrodecaborate salt, e.g., $(NH_4)_2B_{10}H_{10}$ or $Na_2B_{10}H_{10}$, are mixed to form a solution, and a hydrogen halide, e.g., hydrogen chloride, is bubbled through the mixture. The reaction is exothermic and proceeds rapidly. To obtain the non-ionic species as the principal product, heat is applied to the reaction mixture after the exothermic phase has passed and passage of the hydrogen halide is continued for a further period. To obtain the ionic species as the principal product, passage of hydrogen halide is stopped when the exothermic phase is over, as evidenced by a drop in temperature and no further heat is applied. In either case the reaction mixture is processed by filtration. The filtrate is diluted with water and the non-ionic species which is insoluble is separated. The remaining clear solution is reacted with a solution of a compound which contains the cation M, desired in the final product. Thus, the solution can be reacted with an inorganic base, an organic base, an inorganic salt, an organic salt, and the like. To illustrate, the solution can be reacted with NaOH, CsOH, Ba(OH)₂, NH₃, NH₄OH, substituted amines, tetrasubstituted nitrogen bases, and the like, to obtain compounds in which M covers a broad range of cations. Salts which can be used as reactants are, e.g., chlorides, carbonates, acetates of metals or organic bases of the kind illustrated above. This step in the process is a simple metathetic reaction and its many variations are well-known in chemical processes.

The preferred amides for use in the process are formamides, acetamides and N-substituted-2-pyrollidones in which the nitrogen, preferably, bears hydrocarbon substituents, i.e., compounds of the formula

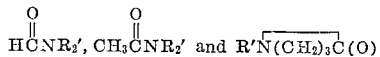

in which R' represents a hydrocarbon group as defined earlier.

The products obtained in this step of the process can, if desired, be purified by crystallization from conventional solvents, e.g., water, alcohol, glacial acetic acid, and the like, prior to their use in the next step in the preparation of compounds of Formula 1 in which X is —OH, —NH₂, —NHR' or —NR₂'.

Amide complexes in which M, if present, is a neutral or non-acidic group, e.g., a metal, NH₄, substituted ammonium and the like, are suspended or dissolved in an aqueous solution of a strong base, e.g., an alkali metal hydroxide, and the mixture is warmed for a time sufficient to hydrolyze the amide portion of the adduct. A reactant with the desired cation, i.e., M group, is added to the mixture to precipitate the boron compound as a salt of the general formula $M_a[B_{10}H_{10-y}(OH)_y]_b$ where M, a, b, and y have the meanings given for Formula 1.

Compounds of Formula 1 in which X is amine or a substituted amine group are prepared most readily by mixing the acid, $(H_3O)_2B_{10}H_{10}$, and an amide in aqueous solution. The solution is heated until water is removed completely and it is then refluxed. Dilution of the solution with an alcohol, e.g., $CH_3OH$, followed by addition of a salt having an appropriate cation leads to the isolation of a compound of generic Formula 1 in which X is $-NH_2$, $-NHR'$ or $-NR_2'$.

A second group of products is obtained in this reaction which are compounds of Formula 1 in which X is formyloxy or hydrocarbonyloxy, i.e., $-OC(O)H$ or $$-OC(O)R'$$

To illustrate, with dimethylformamide as the reactant, compounds of Formula 1 are obtained in which X is $-OC(O)H$; with dimethylacetamide, compounds in which X is $-OC(O)CH_3$ are obtained. This group of compounds are also obtained readily by esterification of the hydroxyl-bearing compounds as described below.

The hydroxyl- and amine-substituted compounds can be used as intermediates for the preparation of compounds of the invention in which X is bonded to boron through oxygen or nitrogen. To illustrate, the hydroxyl-bearing compound is reacted with acids, acid halides or acid anhydrides to obtain compounds in which X represents an ester group [$-OC(O)R'$, or $-OC(O)H$]; with isocyanates to obtain compounds in which X is $R'NHC(O)O-$; with olefins to obtain compounds in which X is $-OR'$; with acetylenic compounds to obtain products in which X is $-OCH=CHR'$; with sulfonyl halides to obtain products in which X is $-OSO_2R'$, and the like. As a further illustration, the amine-bearing compounds can be acylated to give products having groups such as $-NHC(O)R'$ and they can be reacted with isocyanates to obtain compounds having groups such as $-NHC(O)NHR'$.

In the above description, R' has the meaning defined in an earlier paragraph.

X groups which are not alike.—The processes which have been described can be employed to obtain compounds having one or more X groups. These groups, if more than one is present, can be alike or different. To obtain compounds having two or more X groups which are unlike, the decahydrodecaborate is reacted with one electrophilic reagent until the desired number of substituents are introduced and the partially substituted product is then reacted with a second electrophilic reagent. The intermediate partially substituted product can, if desired, be isolated prior to reaction with the second electrophilic reagent. The process can be repeated with a third electrophilic reagent, or even further, until all hydrogens bonded to borons have been replaced. Further modification of various substituent groups can be accomplished by conventional methods to obtain compounds having a broad range of X groups.

To illustrate, compounds of the following formulas can be obtained by the methods described above:

$Na_2B_{10}H_7(OH)_2OCH_3$, $BaB_{10}H_6[OC(O)H]_2(SCH_3)_2$,
$[(CH_3)_4S]_2B_{10}H_8(SCH_3)NO_2$,
$Zn(H_2O)_4B_{10}H_8(CH_2C_6H_5)OH$,
$[Co(H_2O)_6]_2[B_{10}H_7CH(CH_3)_2(SO_2C_6H_5)_2]_3$
$H_2B_{10}H_8[C(O)C_6H_5](OC_4H_9)$,
$H_2B_{10}H_6(OCH_3)_2(SCH_3)_2$, $(NH_4)_2B_{10}H_3Cl_3(OH)_2(SC_2H_5)_2$, and the like.

In the processes described above, direct replacement of hydrogen bonded to boron by another element or group of elements can occur, i.e., substitution, or the substituent atom or group can be replaced wholly or in part by some other atom or group, i.e., displacement. Whether the reaction is substitution, replacement or displacement, there is no change in the geometry of the decaborate cage or decaborate moiety.

The new compounds are usually solid products which are salt-like in character. Many of the compounds dissolve in water. The color of the compounds is dependent to some extent on the nature of the electrophilic group bonded to boron. Thus, chlorine and bromine substituted compounds are generally colorless products while nitro and nitroso-substituted derivatives are highly colored. The compounds vary in stability and caution must be exercised in handling them. Nitro and nitroso-substituted derivatives may in some cases be highly sensitive to shock and they are preferably kept moist while handling. Other derivatives, e.g., the halogen-substituted products, the alkyl-substituted compounds or those bearing acyl groups, are stable and they can be kept in storage for prolonged periods in conventional containers.

The products of the invention and processes for obtaining them are illustrated in the following examples. The preparation of a representative compound of the type $M_a(B_{10}H_{10})_b$, which is employed as a principal reactant, is also illustrated. Processes are described in the examples which are specific for the preparation of compounds having a particular group of substituents, e.g., hydrocarbon mercapto groups ($-SR'$).

EXAMPLE A (A) Preparation of a decaboryl bis(dialkyl sulfide).—
A reaction vessel having a capacity of about 365 g. of water is charged with 0.79 g. of decaborane(14), cooled in liquid nitrogen, and then evacuated to a pressure of 10 microns of mercury. Approximately 21 g. of methyl sulfide is condensed onto the decaborane in the reaction vessel. The reaction vessel is closed, allowed to warm to room temperature and stand for 4 days. During this time, 6.6 millimoles of hydrogen is evolved. The reaction vessel is opened and excess methyl sulfide is removed by distillation, leaving a practically quantitative yield of white solid residue of $B_{10}H_{12} \cdot 2(CH_3)_2S$. The compound is recrystallized from ethyl acetate and it melts at 122–124° C. The compound is called bis(dimethyl sulfide)decaborane(12).

The above procedure is equally operable with other organic sulfides.

(B) Preparation of $M_2B_{10}H_{10}$ (where M is $NH_4$).—
Bis(dimethyl sulfide)decaborane(12) (8.5 g.) is mixed with 50 ml. of liquid ammonia and stirred in a round-bottom reaction vessel for 1 hour with the vessel being cooled to a temperature of about −50° C. by partial immersion in a bath of a mixture of solid carbon dioxide and acetone. The cooling bath is then removed and the excess ammonia is allowed to evaporate with stirring. The remaining traces of ammonia are removed by subjecting the residue to a high vacuum (0.01 mm. of mercury) at 25° C. There is obtained 5.6 g. of solid residue which is virtually a quantitative yield of diammonium decahydrodecaborate(2−), i.e., $(NH_4)_2B_{10}H_{10}$.

By substituting other amine bases for liquid ammonia in the process of Part B, a wide range of substituted ammonium derivatives is obtained, e.g., trimethylamine yields $[(CH_3)_3NH]_2B_{10}H_{10}$, isopropylamine yields $$[(CH_3)_2CHNH_3]_2B_{10}H_{10}$$

Similarly, tert-butylamine yields $[(CH_3)_3CNH_3]_2B_{10}H_{10}$ and butylamine yields $(C_4H_9NH_3)_2B_{10}H_{10}$.

(C) Preparation of $H_2B_{10}H_{10}nH_2O$ or $$(H_3O)_2B_{10}H_{10} \cdot nH_2O$$

A solution of $(NH_4)_2B_{10}H_{10}$, obtained in part B, in 30 ml. of water is passed through a 0.5″ diameter chromatography column containing 80 ml. of a commercial acidic ion exchange resin ("Amberlite IR 120–H"). The water effluent is clear, colorless and acidic. The column is rinsed with more water until the effluent is no longer acidic and the water fractions are combined. Evaporation of the combined aqueous solutions under reduced pressure (1 mm. mercury) at a temperature of about 40° C. leaves a yellow viscous liquid which is $H_2B_{10}H_{10} \cdot (H_2O)_3$. The compound can also be written as $$(H_3O)_2B_{10}H_{10} \cdot H_2O$$

It is neutralized with $(CH_3)_4NOH$ to yield $$[(CH_3)_4N]_2B_{10}H_{10}$$

with isopropylamine to yield $(C_3H_7NH_3)_2B_{10}H_{10}$.

EXAMPLE 1

A reaction vessel, equipped with a stirrer and means for cooling, is charged with 2.0 g. of diammonium decahydrodecaborate(2−), $(NH_4)_2B_{10}H_{10}$, and 40 ml. of water. The solution is cooled to ice-water temperature and chlorine gas is bubbled through it. The solution is stirred during the reaction which is exothermic. The addition of chlorine gas is continued until the exothermic reaction subsides. An aqueous solution of 5.5 g. of tetramethylammonium chloride is added carefully and a white solid forms. The solid is separated by filtration and it is purified by crystallization from water. There is obtained 4.65 g. of bis(tetramethylammonium) octachlorodihydrodecaborate(2−) as white needle-shaped crystals. The compound has the formula $[(CH_3)_4N]_2B_{10}H_2Cl_8$. It does not react with silver nitrate in boiling water.

*Analysis.*—Calc'd for $C_8H_{26}B_{10}Cl_8N_2$: C, 17.7; H, 4.8; B, 19.99; Cl, 52.4; N, 5.11. Found: C, 17.38; H, 5.06; B, 19.56; Cl, 52.85; N, 4.46.

EXAMPLE 2

(A) A reaction vessel, equipped with a stirrer, is charged with 120 ml. of water and 8.0 g. of

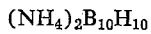

$(NH_4)_2B_{10}H_{10}$

Vessel and contents are cooled to 10–15° C. and chlorine gas is passed through the aqueous solution until no rise in temperature above about 25° C. occurs when the vessel is removed from the cooling mixture.

A portion of the reaction mixture is removed and it is mixed with an aqueous solution of cesium chloride. The white precipitate which forms is separated by filtration and it is washed thoroughly with water. The product is dicesium octachlorodihydrodecaborate(2−), i.e., $Cs_2B_{10}H_2Cl_8$, whose identity is confirmed by its infrared absorption spectrum. It is obtained in colorless needle-like crystals by crystallization from water.

Chlorination of the mixture which is left in the reaction vessel is continued for 1 hour at about 25° C. A transient dark violet color forms in the mixture which fades after chlorination is stopped. A saturated solution of 21 g. of CsCl in water is added with stirring to the mixture and the white precipitate which forms is separated by filtration. The product is recrystallized from water to obtain 22 g. of dicesium decachlorodecaborate (2−) as needle-like crystals. The identity of the compound, which has the formula $Cs_2B_{10}Cl_{10}$, is confirmed by elemental analysis.

*Analysis.*—Calc'd for $Cs_2B_{10}Cl_{10}$: B, 14.8; Cs, 36.5; Cl, 48.7. Found: B, 14.7; Cs, 34.0; Cl, 48.23.

(B) A reaction vessel is charged with 125 ml. of water and 5.0 g. of $(NH_4)_2B_{10}H_{10}$. The mixture is stirred and cooled to 5–15° C. Chlorine gas is bubbled through the mixture until the exothermic reaction ends. At this point passage of chlorine gas is stopped and nitrogen is bubbled through the mixture for 5 minutes to remove excess chlorine. The mixture is allowed to warm to about 25° C. and an aqueous solution of cesium chloride is added with stirring until precipitation of a white solid is complete. The mixture is partially evaporated by warming and the solid is separated by filtration. There is obtained 17.7 g. of $Cs_2B_{10}H_2Cl_8$ which is purified by recrystallization from water.

*Analysis.*—Calc'd for $Cs_2B_{10}H_2Cl_8$: Cs, 40.3; B, 16.4; Cl, 43.0. Found: Cs, 38.9; B, 15.56; Cl, 44.25.

The compound is soluble in cold 1,2-dimethoxyethane but, on boiling, it separates as an insoluble liquid which redissolves on cooling.

The free acid, $H_2B_{10}H_2Cl_8$, is prepared in aqueous solution by passing an aqueous solution of $Cs_2B_{10}H_2Cl_8$ through a column packed with a commercial acidic ion-exchange resin. The silver salt, $Ag_2B_{10}H_2Cl_8$, is obtained by reacting an aqueous solution of the above acid with silver oxide. The silver salt is soluble in water.

(C) A reaction vessel is charged with 125 ml. of water and 6.0 g. of $(NH_4)_2B_{10}H_{10}$. Chlorine gas is bubbled through the mixture at 10–15° C. until the exothermic reaction subsides. The solution turns blue near the beginning of the reaction and the color persists. After passage of chlorine is stopped, a stream of nitrogen is passed into the mixture and it is permitted to come to room temperature (about 25° C.) After standing overnight the solution is still blue in color. An aqueous solution of CsOH is added to the mixture until it is slightly basic. The solution is filtered and the filtrate is evaporated. The solid product is recrystallized from water until it is free of chloride ion (as shown by test with aqueous $AgNO_3$). There is obtained 15.5 g. of $Cs_2B_{10}H_2Cl_8 \cdot H_2O$. The compound is identified by elemental analysis.

*Analysis.*—Calc'd for $Cs_2B_{10}H_2Cl_8 \cdot H_2O$: B, 15.9; Cl, 41.9. Found: B, 16.36; Cl, 41.44.

(D) An aqueous solution of $Cs_2B_{10}Cl_{10}$ is prepared by heating 9.6 g. of the cesium salt with 150 ml. of water. The solution is passed through a column packed with an acidic ion-exchange resin ("Amberlite" IR–120H) to obtain an aqueous solution of the acid $H_2B_{10}Cl_{10}$. The aqueous acid solution is treated with freshly prepared $Ag_2O$ until no further reaction with the oxide is noted. The solution is filtered and the filtrate is evaporated to give about 4.0 g. of a white crystalline solid which is $Ag_2B_{10}Cl_{10}$. The identity of the compound, which is free of water of hydration, is confirmed by its infrared absorption spectrum.

The above process is repeated employing 15 g. of $Cs_2B_{10}Cl_{10}$ as the reactant in aqueous solution. The identity of the silver salt which is obtained is confirmed by elemental analysis.

*Analysis.*—Calc'd for $Ag_2B_{10}Cl_{10}$: Ag, 31.8; B, 15.9. Found: Ag, 31.58; B, 16.98.

(E) An aqueous solution containing 50 g. of $Cs_2B_{10}Cl_{10}$ is passed through an acidic ion-exchange column of the type described in Part D. The acid effluent is reacted with barium carbonate until the solution is neutral. The mixture is filtered and the filtrate is evaporated to dryness to yield $BaB_{10}Cl_{10}$ as a white, crystalline very hygroscopic solid.

The preparation is repeated and the white crystalline compound is recrystallized from water. It is dried for about 18 hours under reduced pressure to yield a hydrated $BaB_{10}Cl_{10}$. The elemental analysis is as follows: Ba, 17.51; B, 17.96; Cl, 59.12.

(F) An aqueous solution containing 10 g. of $Cs_2B_{10}Cl_{10}$ is passed through an acidic ion-exchange column of the type described in part D. The acid effluent is evaporated under reduced pressure to dryness, leaving a white, hygroscopic crystalline solid which is $H_2B_{10}Cl_{10}$ containing six moles of water of hydration [B, calc'd., 18.88; B (found), 18.58].

The above process is repeated, employing an aqueous solution containing 30 g. of $Cs_2B_{10}Cl_{10}$. The solid product obtained by evaporation of the acid effluent is dried further in an Abderhalden unit under reduced pressure for 6 hours, employing refluxing alcohol to control the temperature. There is obtained 20.5 g. of $H_2B_{10}Cl_{10} \cdot 6H_2O$, also written as $(H_3O)_2B_{10}Cl_{10} \cdot 4H_2O$.

*Analysis.*—Calc'd for $H_2B_{10}Cl_{10} \cdot 6H_2O$: B, 18.88; Cl, 62.0. Found: B, 19.38; Cl, 61.76.

A portion of the hydrate of $H_2B_{10}Cl_{10}$ is dried in an Abderhalden unit for 3 hours under reduced pressure at the boiling point of acetone. The acid thus obtained is a very strong acid and it contains 5 moles of water of hydration of which 2 moles are considered to be associated with the protons.

*Analysis.*—Calc'd for $(H_3O)_2B_{10}Cl_{10} \cdot 3H_2O$: B, 19.5; Cl, 64.1; N.E., 277. Found: B, 19.91, 20.04; Cl, 63.04, 62.99; N.E. 271.

A second portion of the hydrate of $H_2B_{10}Cl_{10}$ is added to a solution consisting of equal volumes of concentrated hydrochloric acid and dimethyl sulfoxide. The solid which precipitates is separated by filtration and it is crystallized from water. The product which is obtained is $H_2B_{10}Cl_{10}$ containing dimethyl sulfoxide as solvent of crystallization.

*Analysis.*—Calc'd for $H_2B_{10}Cl_{10} \cdot 4(CH_3)_2SO$: C, 12.35; H, 3.48; Cl, 45.6; B, 13.9; S, 16.4. Found: C, 12.60; H, 3.55; Cl, 44.44; B, 14.7; S, 16.73.

A third portion of the hydrate of $H_2B_{10}Cl_{10}$ is added to a solution of equal volumes of concentrated hydrochloric acid and dimethylformamide. The solid which precipitates is separated and it is crystallized from water to obtain $H_2B_{10}Cl_{10}$ containing dimethylformamide as solvent of crystallization.

*Analysis.*—Calc'd for $H_2B_{10}Cl_{10} \cdot 4HC(O)N(CH_3)_2$: B, 14.3; N, 7.4; C, 19.0; H, 4.0. Found: B, 14.63; N, 7.28; C, 19.4; H, 4.1.

(G) A column is charged with an acidic ion-exchange resin of the type described in Part D. An aqueous solution of LiCl is passed through the column followed by an aqueous solution of LiOH to convert the ion-exchange resin to a lithium salt. An aqueous solution containing 7.6 g. of $H_2B_{10}Cl_{10}$ [also referred to as $(H_3O)_2B_{10}Cl_{10}$], obtained as described in Part F, is then passed through the column and the effluent is collected. The effluent is evaporated under reduced pressure at 100° C. to dryness. The solid is dried further in an Aberhalden unit under reduced pressure for 6 hours, employing refluxing ethyl alcohol to control the temperature. There is obtained 5.8 g. of $Li_2B_{10}Cl_{10}$ as a hydrated white crystalline product. The identity of the compound is confirmed by elemental analysis.

*Analysis.*—Calc'd for $Li_2B_{10}Cl_{10} \cdot 5H_2O$: Li, 2.45; B, 19.1; Cl, 62.6. Found: Li, 2.3; B, 19.09; Cl, 62.77.

EXAMPLE 3

(A) A solution of bromine in water is carefully and slowly added with stirring to a solution of 0.22 g. of bis(tetramethylammonium) decahydrodecaborate(2−) in 30 ml. of water. The temperature of the reaction mixture is kept at 25° C. or lower during the addition. As soon as a solid precipitates, it is removed to prevent further bromination. The solid is dried as described in Example 1 and there is obtained 0.31 g. of bis(tetramethylammonium) pentabromopentahydrodecaborate(2−). The compound is a white crystalline solid which has the formula $[(CH_3)_4N]_2B_{10}H_5Br_5$.

(B) A solution is prepared which contains 5.0 g. of diammonium decahydrodecaborate(2−) in 50 ml. of methanol. The solution is stirred and there is added to it over a period of 10 minutes a solution of 3 g. of bromine in 50 ml. of methanol. The reaction mixture is filtered and the filtrate is evaporated under reduced pressure until all the solvent is removed. The white solid which remains is dissolved in water and to this solution there is added an excess of an aqueous solution of tetramethylammonium chloride. The solid which forms is separated by filtration. It is washed and dried to obtain 1.3 g. of bis(tetramethylammonium) pentabromopentahydrodecaborate(2−), $[(CH_3)_4N]_2B_{10}H_5Br_5$.

*Analysis*—Calc'd for $C_8H_{29}B_{10}Br_5N_2$: C, 14.5; H, 4.38; B, 16.35; Br, 60.55. Found: C, 13.75; H, 4.28; B, 15.95; Br, 60.88.

(C) To the aqueous filtrate remaining from the above preparation, there is added with stirring an aqueous solution of tetraethylammonium bromide. The solid which precipitates is separated and purified as described above. There is obtained 0.15 g. of bis(tetraethylammonium) tetrabromohexahydrodecaborate(2−),

*Analysis.*—Calc'd for $C_{16}H_{46}B_{10}Br_4N_2$: B, 15.6; Br, 46.2. Found: B, 16.26; Br, 48.43.

(D) A solution of 0.97 g. of bis(tert.-butyl-ammonium) decahydrodecaborate(2−), $[(CH_3)_3CNH_3]_2B_{10}H_{10}$, is prepared in 30 ml. of water and the solution is filtered. The filtrate is charged into a reaction vessel immersed in a water-ice bath. A mixture of bromine and water is added carefully and with stirring to the filtrate, care being taken to keep the temperature of the filtrate below 30° C. The addition of bromine and water is stopped when a brown color persists in the filtrate for about 1 minute. A solution of 2.8 g. of tetramethylammonium chloride in 10 ml. of water is then added carefully and with stirring. A white precipitate forms which is separated by filtration. The solid is washed with water and it is dried about 18 hours at 50° C. under reduced pressure (about 1 mm. of mercury pressure). There is obtained 2.8 g. of bis(tetramethylammonium) heptabromotrihydrodecaborate(2−). The compound is a white crystalline solid which has the formula $[(CH_3)_4N]_2B_{10}H_3Br_7$. The excellent stability of the bromine-boron bonds in the compound is shown by the fact that the compound is recovered unchanged after 1 hour in a refluxing methanol (125 ml.) solution of sodium methoxide (0.46 g.).

*Analysis.*—Calc'd for $C_8H_{27}B_{10}Br_7N_2$: C, 11.88; H, 3.33; B, 13.22; Br, 68.4; N, 3.92. Found: C, 11.60; H, 3.45; B, 12.17; Br. 68.93; N, 3.58.

(E) Di(propylammonium) decahydrodecaborate(2−) (2.0 g.) is dissolved in 50 ml. of ethanol and a solution of 10.6 g. of bromine in 41 ml. of ethanol is added dropwise with vigorous stirring of the decaborate solution. The bromine color disappears very slowly at the end of the addition. The reaction mixture is heated to reflux and a solution of 2.4 g. of bromine in 9 ml. of ethanol is added slowly.

The reaction mixture is divided into two equal parts. An excess of an alcohol solution of tetramethylammonium chloride is added to one part and a white solid precipitates. This solid is found to be a partially or incompletely brominated derivative.

The remaining portion of the reaction mixture is treated with a solution of 10 g. of bromine in 50 ml. of ethanol and the mixture is refluxed for 6 hours. The mixture is cooled and a solution of excess tetramethylammonium chloride in ethanol is added to it until precipitation of the white solid product which forms is completed. The white solid is separated by filtration, washed with ethanol and dried as described in Example 2. The white crystalline solid is bis(tetramethylammonium) decabromodecaborate(2−), a compound which has the formula $[(CH_3)_4N]_2B_{10}Br_{10}$. The identity of the compound is confirmed by the infrared spectrum and by elemental analysis.

*Analysis.*—Calc'd for $C_8H_{24}B_{10}Br_{10}N_2$: C, 9.1; H, 2.29; B, 10.25; Br, 75.65. Found: C, 10.04; H, 2.90; B, 10.25; Br, 74.45.

(F) Diammonium decahydrodecaborate(2−) (2.0 g.) is dissolved in 40 ml. of water and the solution is filtered. Bromine is added to the filtrate at ice-bath temperature with stirring until the bromine color persists. At this point, seven equivalents of bromine have been added. The solution is then concentrated under vacuum until ammonium bromide precipitates. The precipitate is removed by filtration, a large excess of ethyl acetate is added to the filtrate and the mixture is again filtered. The filtrate is concentrated under vacuum at about 40° C. until the color becomes dark red-brown. At this point the last traces of ammonium bromide are removed by filtration and the red-brown filtrate is concentrated to yield hydrated dihydrogen heptabromotrihydrodecaborate(2−), $(H_3O)_2B_{10}H_3Br_7 \cdot nH_2O$. The identity of the compound is confirmed by its infrared spectrum and by its conversion with tetramethylammonium chloride to bis(tetramethylammonium) heptabromotrihydrodecaborate(2−), the same compound prepared in Part D.

(G) Bis(tetramethylammonium) decahydrodecaborate(2−) (1.5 g.) is dissolved in 30 ml. of water and bromine is added slowly with stirring in an ice-bath.

A solid precipitates immediately but the addition of bromine is continued without removing the solid until the bromine color persists in the reaction mixture. The solid product is then removed by filtration and recrystallized from water. Bis(tetramethylammonium) nonabromohydrodecaborate(2−), $[(CH_3)_4N]_2B_{10}HBr_9$, is obtained.

*Analysis.*—Calc'd for $C_8H_{25}B_{10}Br_9N_2$: B, 11.1; Br, 73.9. Found: B, 11.61; Br, 72.53.

EXAMPLE 4

(A) A reaction vessel, equipped with a stirrer and a reflux condenser, is charged with 6.0 g. of $(NH_4)_2B_{10}H_{10}$ and sufficient ethyl alcohol to form a clear solution. Excess liquid bromine is added and the mixture is stirred for 15–30 minutes at prevailing atmospheric temperature (about 25° C.). The mixture is then heated to refluxing temperature and small portions are removed at intervals. Each portion is treated with an alcohol solution of $(CH_3)_4NCl$ to precipitate the tetramethylammonium decaborate. Refluxing of the reaction mixture is continued until the infrared absorption spectrum determined on the test sample of the tetramethylammonium salt is free of B–H bands. At this point the reaction mixture is cooled and it is mixed with an alcohol solution of $(CH_3)_4NCl$. The precipitate which forms is separated by filtration. The product, which is $[(CH_3)_4N]_2B_{10}Br_{10}$, is purified by crystallization from a mixture of alcohol and acetone.

(B) The salt $[(CH_3)_4N]_2B_{10}Br_{10}$, obtained in Part A, is dissolved in about 4000 ml. of hot water and the solution is passed through a column packed with an acidic ion-exchange resin ("Amberlite IR–120H"). Passage of the solution through the resin is repeated to assure complete removal of $(CH_3)_4N^+$ ions. The effluent is concentrated by warming to about 0.1 of its original volume. The liquid residue, which is an aqueous solution of $H_2B_{10}Br_{10}$, is neutralized with an aqueous solution of CsOH. The neutralized solution is evaporated to obtain 14.3 g. of white crystalline dicesium decabromodecaborate (2−), i.e., $Cs_2B_{10}Br_{10}$. The identity of the compound is confirmed by its infrared absorption spectrum and by elemental analysis.

*Analysis.*—Calc'd for $Cs_2B_{10}Br_{10}\cdot H_2O$: Cs, 22.3; B, 9.05; Br, 67.1. Found: Cs, 21.9; B, 8.99; Br, 66.89.

(C) A solution of 0.2 g. of $Cs_2B_{10}Br_{10}\cdot H_2O$ in 5 ml. of water is mixed with a solution of 0.065 g. of $AgNO_3$ in 5 ml. of water. The white precipitate which forms is separated by filtration to obtain silver decabromodecaborate(2−), i.e., $Ag_2B_{10}Br_{10}$. The product, which is washed with water and ethanol to purify it further, becomes slightly brown on prolonged exposure to light and air.

*Analysis.*—Calc'd for $Ag_2B_{10}Br_{10}$: Ag, 19.23. Found: Ag, 19.29.

(D) An aqueous solution containing 1.0 g. of $Cs_2B_{10}Br_{10}$ is passed through a column packed with an acid ion-exchange resin as described in Part B. The acid effluent, which contains $H_2B_{10}Br_{10}$, is titrated carefully with a 0.1 N solution of NaOH and the titration curve is followed with a pH meter. The data show that the acid is very strong, comparable to inorganic mineral acids; the neutral equivalent is 591 (calc'd, 596 for $Cs_2B_{10}Br_{10}\cdot H_2O$).

The above process is repeated employing 10.5 g. of $Cs_2B_{10}Br_{10}$. The neutralized acid effluent (pH=7) is evaporated to dryness to obtain $Na_2B_{10}Br_{10}$ as a white solid. The identity of the compound is confirmed by its Raman spectrum. Its identity is further confirmed by conversion to $[(CH_3)_4N]_2B_{10}Br_{10}$, obtained by reacting an aqueous solution of $(CH_3)_4NCl$ with an aqueous solution of $Na_2B_{10}Br_{10}$.

EXAMPLE 5

An aqueous solution of the acid prepared as described in Example 4, Part B, is added carefully and with stirring to an aqueous solution of cesium fluoride until precipitation is complete. The precipitate is separated by filtration and it is crystallized from hot water to give a white crystalline product which is dicesium decabromodecaborate(2−), $Cs_2B_{10}Br_{10}$.

*Analysis.*—Calc'd for $Cs_2B_{10}Br_{10}$: B, 9.26. Found: B, 9.01.

EXAMPLE 6

A solution of 1.04 g. of diammonium decahydrodecaborate(2−), $(NH_4)_2B_{10}H_{10}$, is prepared in 50 ml. of methanol and 5.6 g. of iodine is added carefully to the solution while it is stirred. The iodine color persists in the solution for several minutes at room temperature. A solution of 3.0 g. of tetramethylammonium chloride in 20 ml. of methanol is then added to the reaction mixture and the white precipitate which forms is separated by filtration. The solid is crystallized from water and bis(tetramethylammonium) tetraiodohexahydrodecaborate(2−) is obtained as a white crystalline compound which has the formula $[(CH_3)_4N]_2B_{10}H_6I_4$.

*Analysis.*—Calc'd for $C_8H_{30}B_{10}I_4N_2$: B, 14.05; I, 66.0. Found: B, 13.27; I, 66.47.

EXAMPLE 7

A reaction vessel is charged with 150 ml. of $C_2H_5OH$ and 10.0 g. of $(NH_4)_2B_{10}H_{10}$. Sufficient water is added to dissolve the $(NH_4)_2B_{10}H_{10}$ completely. The amount of water required is very small. The solution is cooled to 5–10° C. and crystalline iodine is added gradually in small portions with stirring until the color of iodine in the solution persists for 3–4 minutes. A total of 44.0 g. of iodine is added. The solution is stirred until it is colorless and it is then divided into two equal parts, identified as Fraction A and Fraction B.

Fraction A.—Excess aqueous CsF solution is added to this fraction to form a gummy precipitate. The precipitate is separated by filtration and the solid is crystallized twice from water to yield 1.9 g. of a slightly gray powdery solid which is dicesium heptahydrotriiododecaborate(2−), i.e., $Cs_2B_{10}H_7I_3$. The identity of the compound is confirmed by elemental analysis.

*Analysis.*—Calc'd for $Cs_2B_{10}H_7I_3$: Cs, 34.9; B, 14.18; I, 50.0. Found: Cs, 35.8; B, 14.0, 13.9; I, 49.28, 49.08.

The filtrate from the first separation is mixed with a large excess of aqueous CsF solution. A gummy precipitate forms which is redissolved in water and mixed with an aqueous solution of $(Ch_3)_4NCl$. The precipitate so obtained is crystalline in character and it is separated by filtration to obtain crude bis(tetramethylammonium) heptahydrotriiododecaborate(2−), i.e., $[(CH_3)_4N]_2B_{10}H_7I_3$.

A portion (4.0 g.) of $[(CH_3)_4N]_2B_{10}H_7I_3$ is dissolved in boiling water and the solution is passed through an acidic ion-exchange resin column of the type described in Example A, Part C. The acid effluent is titrated to a pH value of 7 with 0.1 N NaOH. The neutral solution is evaporated to dryness to obtain $Na_2B_{10}H_7I_3$ as a white crystalline solid.

Fraction B.—This fraction is heated to reflux and sufficient iodine is added to retain iodine color after one hour of refluxing. The alcohol is removed by evaporation under reduced pressure and the liquid residue is filtered to remove ammonium iodide. The filtrate is diluted with an equal volume of water and filtered again. An excess of aqueous 50% cesium fluoride solution is added to the filtrate and the viscous mass which forms is separated by filtration. The mass is triturated repeatedly with cold water and it is then crystallized twice from hot water. There is obtained 4.1 g. of a white powder which is dicesium tetrahydrohexaiododecaborate(2−), i.e.

$$Cs_2B_{10}H_4I_6$$

The identity of the compound is confirmed by elemental analysis.

*Analysis.*—Calc'd for $Cs_2B_{10}H_4I_6$: Cs, 23.2; B, 9.50; I, 66.9. Found: Cs, 23.1; B, 9.28; I, 66.92.

EXAMPLE 8

A solution of iodine in methanol is added slowly with stirring to a solution of 0.62 g. of di(isopropylammonium) decahydrodecaborate(2−), [(CH$_3$)$_2$CNH$_3$]$_2$B$_{10}$H$_{10}$, in methanol until the color of iodine persists in the reaction mixture for several minutes at room temperature (ca. 25° C.). The addition of bromine to the reaction mixture is then begun and the mixture is heated to refluxing temperature. Addition of bromine is continued until the color of excess bromine persists in the refluxing mixture for a few minutes. A solution of 2.0 g. of tetramethylammonium chloride in methanol is added to the reaction mixture which is then chilled in an ice-water bath. The solid product which precipitates is separated by filtration and it is extracted with water to remove soluble products. The water-insoluble portion is a white crystalline compound which is bis(tetramethylammonium) monobromopentaiodotetrahydrodecaborate(2−), a compound of the formula [CH$_3$)$_4$N]$_2$B$_{10}$H$_4$BrI$_5$. The identity of the compound is confirmed by elemental analysis.

*Analysis.*—Calc'd for C$_8$H$_{28}$B$_{10}$BrI$_5$N$_2$: Br, 8.24; I, 65.4. Found: Br, 7.81; I, 63.16.

EXAMPLE 9

A reaction vessel is charged with about 150 ml. of methanol and 6 g. of (NH$_4$)$_2$B$_{10}$H$_{10}$. The mixture is refluxed and iodine is added gradually until reaction is complete as shown by the presence of a stable iodine color. Methanol is removed under reduced pressure, leaving a gummy reaction mass. Iodine monochloride (150 g.) is added directly to this mass and the mixture is heated to 80° C. for 3 hours. The mixture is cooled and it is extracted with CCl$_4$ and CS$_2$ to remove ICl and iodine. The residue is dissolved in water, the solution is filtered and the filtrate is neutralized with NH$_4$OH. A concentrated aqueous solution of CsF is added until no further precipitation occurs. The precipitate is collected and it is crystallized from hot water. The product is a double salt of Cs$_2$B$_{10}$I$_{10}$ and CsI. The identity of the product is confirmed by elemental analysis.

*Analysis.*—Calc'd for Cs$_2$B$_{10}$I$_{10}$·CsI: Cs, 20.93; I, 73.3; B, 5.67. Found: Cs, 18.8; I, 73.98; B, 6.35.

A portion of the double salt is dissolved in water and the aqueous solution is passed through a column packed with a commercial acidic ion-exchange resin. The aqueous effluent is evaporated under reduced pressure to yield white crystals of dihydrogen decaiododecarborate (2−) containing 8 moles of water of hydration of which two moles are considered to be associated with the protons.

*Analysis.*—Calc'd for (H$_3$O)$_2$B$_{10}$I$_{10}$·6H$_2$O: B, 7.1; I, 83.5; N.E., 761. Found: B, 6.99; I, 83.51; N.E., 751, 754.

Examples 1 through 9 illustrate the compounds of the invention in which X is halogen and the process for preparing them. The process is generic to the preparation of halogen-containing compounds, e.g., Cs$_2$B$_{10}$H$_8$F$_2$, (NH$_4$)$_2$B$_{10}$H$_4$Cl$_6$, (NH$_2$NH$_3$)$_2$B$_{10}$Cl$_{10}$
[(C$_2$H$_5$)$_4$P]$_2$B$_{10}$Br$_{10}$, Zn(NH$_3$)$_4$B$_{10}$I$_{10}$ Na$_2$B$_{10}$H$_5$Br$_5$
Cu(H$_2$O)$_4$B$_{10}$H$_4$I$_6$, Ag$_2$B$_{10}$Cl$_{10}$ and the like. Compounds having mixed halogen substituents are obtained by halogenating the decahydrodecaborate(2−) salt partially with one halogen, e.g., chlorine, followed by halogenation with a second halogen, e.g., fluorine or iodine. Examples of compounds obtained by this mode of operation are Na$_2$B$_{10}$H$_5$Cl$_3$F$_2$, (NH$_4$)$_2$B$_{10}$Cl$_5$F$_5$, [(CH$_3$)$_4$N]$_2$B$_{10}$Cl$_5$I$_5$ and the like. The process can be extended to include all of the halogens.

EXAMPLE 10

(A) A reaction vessel is charged with 20 g. of (NH$_4$)$_2$B$_{10}$H$_{10}$ and 100 ml. of HC(O)N(CH$_3$)$_2$. The mixture is stirred at about 25° C. until the boron compound is dissolved and, with continued stirring, gaseous hydrogen chloride is bubbled through the solution. The temperature rises spontaneously to 126° C. over a period of 12 minutes and it then decreases to about 80° C. Flow of hydrogen chloride is stopped at this point and the solution is filtered to remove the ammonium chloride which precipitates in the reaction. The clear filtrate is added with stirring to a solution consisting of 400 ml. of ethanol, 10 ml. of methanol, and 45 g. of cesium hydroxide. A white solid precipitates and it is separated by filtration. The solid is extracted with 100 ml. of hot water. The portion remaining after extraction is crystallized three times from solution in hot water to obtain cesium dimethylformamidenonahydrodecaborate(1−), which is used as a reactant in the second step of the process.

*Analysis.*—Calc'd for CsB$_{10}$H$_9$·HC(O)N(CH$_3$)$_2$: Cs, 41.0; B, 33.4; C, 11.1; H, 5.0; N, 4.3. Found: Cs, 39.5; B, 32.7; C, 11.3; H, 5.1; N, 4.4.

The above compound is dissolved in a minimum quantity of water and slightly more than one equivalent of sodium hydroxide in aqueous solution is added with stirring. The solution is warmed on a steam bath for 2 hours. At the end of this time an excess of an aqueous solution of cesium hydroxide is added with stirring and the solution is poured into three times its volume of ethanol. Dicesium monohydroxynonahydrodecaborate(2−), i.e., Cs$_2$B$_{10}$H$_9$OH, precipitates. It is separated by filtration and it is purified by recrystallization from water.

(B) A portion (4.0 g.) of the cesium salt,

Cs$_2$B$_{10}$H$_9$OC(O)H obtained as described in Example 30 Part B, is dissolved in 60 ml. of water and 1.0 g. of NaBH$_4$ is added to the solution. The mixture is allowed to stand overnight (about 18 hours) at atmospheric temperature and it is then heated on a steam bath until bubbling ceases. The solution is added to 200 ml. of ethanol containing 3 g. of CsOH. The precipitate which forms is separated and crystallized from water to obtain needle-like crystals of Cs$_2$B$_{10}$H$_9$OH. The infrared absorption spectrum confirms the presence of the OH group.

*Analysis.*—Calc'd for Cs$_2$B$_{10}$H$_9$OH: Cs, 66.5; B, 27.0; H, 2.5. Found: Cs, 63.9; B, 26.30, 26.43; H, 2.67, 2.92.

(C) A portion of the cesium salt,

Cs$_2$B$_{10}$H$_9$OC(O)H prepared as described in Example 30, Part B, is dissolved in water and the solution is mixed with an aqueous solution of NaBH$_4$. The mixture is allowed to stand overnight and it is then heated on a steam bath until bubbling ceases. An aqueous solution of TlNO$_3$ is added with stirring and the precipitate which forms is separated. The product is crystallized from hot water to form gleaming white crystals of Tl$_2$B$_{10}$H$_9$OH.

(D) The compound CsB$_{10}$H$_9$·HC(O)N(CH$_3$)$_2$ prepared as described in Part A, is mixed with liquid ammonia. The mixture is stirred and it is evaporated to dryness. The residue is dissolved in water and the solution is mixed with an aqueous solution of TlNO$_3$. The precipitate which forms is separated to obtain Tl$_2$B$_{10}$H$_9$OH as a white crystalline solid.

(E) The compound CsB$_{10}$H$_9$·HC(O)N(CH$_3$)$_2$ is mixed with an aqueous solution of sodium hydroxide. The mixture is allowed to stand for a short period of time and it is then mixed with a solution of TlNO$_3$. The precipitate is processed as described earlier to obtain Tl$_2$B$_{10}$H$_9$OH.

(F) A portion (4.0 g.) of Cs$_2$B$_{10}$H$_9$OC(O)H, obtained as descriped in Example 30, Part B, is dissolved in 60 ml. of water containing 5 g. of sodium hydroxide. The solution is refluxed for 2 hours, cooled, chilled and filtered to separate the solid. There is obtained 36 g. of Cs$_2$B$_{10}$H$_9$OH. A portion (20 g.) of this compound is dissolved in hot water and passed through an acidic ion-exchange resin of the type described earilier to obtain the acid

H$_2$B$_{10}$H$_9$OH in aqueous solution. The acidic solution is neutralized with aqueous sodium hydroxide solution and the neutral solution is evaporated to dryness. There is obtained 9.0 g. of $Na_2B_{10}H_9OH$ as a white, hygroscopic crystalline salt.

(G) An aqueous solution of $H_2B_{10}H_9OH$, prepared by a process of the type described in Part F is neutralized to a pH value of 7 with an aqueous solution of $$(CH_3)_4NOH$$

The solution is evaporated to dryness under reduced pressure to obtain pure bis(tetramethylammonium) monohydroxynonahydrodecaborate(2−).

*Analysis.*— Calc'd for $[(CH_3)_4N]_2B_{10}H_9OH$: C, 34.0; H, 12.0; B, 38.2; N, 9.9. Found: C, 33.97, 34.02; H, 12.28, 11.82; B, 38.20, 38.05; N, 9.35.

EXAMPLE 11

(A) A reaction vessel, equipped with a stirrer and a condenser, is charged with 20 g. of $(NH_4)_2B_{10}H_{10}$, 22 ml. of concentrated hydrochloric acid and 150 ml. of N-methyl-2-pyrrolidone. The mixture is stirred and it is heated until 20 ml. of water is removed by distillation. The final pot temperature is 170° C. The reaction mixture is cooled to about 25° C. and it is filtered to remove any solid material which may be present. The filtrate is poured with stirring into 800 ml. of water. A solid forms which is separated by filtration to yield 3.0 g. of bis(N-methyl-2-pyrrolidone) decaborane(8), a compound of the following structure:

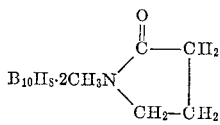

*Analysis.*—Calc'd for $B_{10}H_8 \cdot 2N(CH_3)(CH_2)_3CO$: C, 38.2; H, 8.3; N, 8.9. Found: C, 38.8, 39.0; H, 8.6, 8.8; N, 8.8, 8.3.

(B) A portion (1.0 g.) of bis(N-methyl-2-pyrrolidone) decaborane(8), obtained as described in Part A is suspended in an aqueous solution of NaOH. The suspension is boiled until the compound dissolves. The solution is filtered while hot and the filtrate is cooled. An aqueous solution of $TlNO_3$ is added to the filtrate and the yellow precipitate which forms is separated by filtration. The product is washed and dried to obtain dithallium dihydroxyoctahydrodecaborate (2−). The identity of the compound, which has the formula $Tl_2B_{10}H_8(OH)_2$, is confirmed by its infrared absorption spectrum.

(C) The process of Part B is repeated to the point where the solution is filtered and cooled. Aqueous CsOH is added to the filtrate and the white precipitate which forms is separated. The solid is crystallized from water to obtain dicesium dihydroxyoctahydrodecaborate(2−), i.e., $Cs_2B_{10}H_8(OH)_2$. The identity of the compound is confirmed by its infrared absorption spectrum. The infrared spectrum shows characterizing OH absorption bands at 2.8 and 3.0μ; other absorption bands are noted at 4.0, 4.1, 6.0 and 6.3μ.

(D) A suspension is prepared containing 10.4 g. of bis(N-methyl - 2 - pyrrolidone) decaborane(8), 3.5 g. of NaOH and 100 ml. of water. The suspension is refluxed for 10 minutes at which time all of the solid is dissolved. The solution is warmed under reduced pressure until the volume is about 20 ml. A solution consisting of 22 g. of CsOH in 25 ml. of water is added at this point with stirring and the resulting mixture is poured into 210 ml. of methanol. The solid which forms is separated and it is mixed with stirring with fresh methanol for a short time on a steam bath. The solid is separated again and it is recrystallized from water to obtain pure $$Cs_2B_{10}H_8(OH)_2$$

as a trihydrate.

*Analysis.*—Calc'd for $Cs_2B_{10}H_8(OH)_2 \cdot 3H_2O$: Cs, 56.6; B, 23.0; H, 3.4. Found: Cs, 56.4, 55.6; B, 24.30, 24.45; H, 3.24.

(E) A reaction vessel is charged with 20 g. of bis(N-methyl-2-pyrrolidone)decaborane(8), 7 g. of NaOH and 150 ml. of water. The mixture is refluxed for 2 hours and the solution is poured into an ethanol solution of $(CH_3)_4NOH$. The clear solution is distilled to remove the ethanol and the liquid which remains (about 100 ml.) is poured into 500 ml. of propanol. An oil separates and is removed. The oil solidifies when stirred with a small quantity of ethanol. The solid is crystallized from aqueous ethanol, the crystals are dissolved in methanol and the solid is reprecipitated with ethanol. The mixture is warmed on a steam bath to complete crystal formation, the crystals are separated by filtration and dried under reduced pressure to obtain bis(tetramethylammonium) dihydroxyoctahydrodecaborate(2−).

*Analysis.* — Calc'd for $[(CH_3)_4N]_2B_{10}H_8(OH)_2$: C, 32.2; H, 11.4; B, 36.2; N, 9.4. Found: C, 30.42, 30.16; H, 11.36, 11.40; B, 35.92, 36.00; N, 8.71, 8.79.

An aqueous solution of the crude tetramethylammonium salt obtained in the reaction is mixed with an aqueous solution of $TlNO_3$ to precipitate the thallium salt. The product is separated and crystallized from water.

*Analysis.* — Calc'd for $Tl_2B_{10}H_8(OH)_2$: Tl, 72.9. Found: Tl, 70.4.

(F) The process of Part E is repeated, employing 27 g. of bis(N-methyl-2-pyrrolidone)decaborane(8), 7.5 g. of NaOH and 100 ml. of water. The mixture is refluxed for 5 hours and one-half of the solution is poured into 400 ml. of propanol containing 21 g. of $(CH_3)_4NOH \cdot 5H_2O$. The oil which separates is processed, as described earlier, with ethanol to obtain the tetramethylammonium salt.

*Analysis.* — Calc'd for $[(CH_3)_4N]_2B_{10}H_8(OH)_2$: C, 32.2; H, 11.4; B, 36.2; N, 9.4. Found: C, 31.96, 32.28; H, 11.59, 11.42; B, 35.98, 36.07; N, 8.58.

Examples 10 and 11 illustrate the compounds of the invention in which X is hydroxyl, i.e., —OH, and their preparation. The process is generic to the preparation of hydroxyl-substituted decaborates, e.g., $$[(CH_3)_3S]_2B_{10}H_9OH, [C_6H_5NHNH_3]_2B_{10}H_8(OH)_2$$

$$NiB_{10}H_7(OH)_2, Fe_2[B_{10}H_8(OH)_2]_3, \text{ and the like.}$$

EXAMPLE 12

A solution of nitrous acid is prepared by dissolving 4.14 g. of sodium nitrite in 60 ml. of 1 N hydrochloric acid. The solution is cooled to approximately 0° C. in ice-water and there is added to it slowly and with vigorous stirring a solution of 1.5 g. of bis(tetramethylammonium) decahydrodecaborate(2−) in 25 ml. of water. A dark brown solution is obtained which contains brown solid material. The solid material is isolated by filtration. Care must be exercised in the isolation step as the solid is explosive and, when dry, detonates on touching with a rod. The filtrate, free of solid, is treated with an excess of an aqueous solution of tetraethylammonium bromide. A brown solid precipitates which is separated by filtration. This product is sensitive to shock and it must be handled with caution. The infrared absorption spectrum of the compound shows bands for substituents having nitrogen-oxygen bonds, for the diazonium group $(^+N\equiv N-)$ (4.5μ) and for B–H bonds (4.2μ). The compounds contain 13.42% nitrogen.

EXAMPLE 13

(A) Nitric acid (concentrated) is added carefully and slowly with vigorous stirring to an aqueous solution (50%) of the free acid, $(H_3O)_2B_{10}H_{10} \cdot H_2O$, until the reaction mixture becomes dark blue. The addition of nitric acid is stopped and a vigorous (almost violent) reaction develops. When the reaction subsides a dark red solution remains. The compound present in the solution is the hydrate of dihydrogen pentanitropentahydrodecaborate (2−), i.e., $(H_3O)_2B_{10}H_5(NO_2)_5$.

At this point the solution can be used directly to dye acid-modified poly(acrylonitrile) fibers an attractive shade of red. Addition of aqueous sodium carbonate to the solution to bring it to a pH value of 4–5 provides a dye bath which is useful for dyeing polyamide fibers obtained from hexamethylenediamine and adipic acid, and viscose fibers. The shade obtained on the fibers is determined by the pH of the dyeing solution. For example, in a slightly acidic solution viscose rayon is dyed orange or red; in a basic solution, viscose rayon is dyed blue.

The aqueous solution of the compound, obtained as described above, is useful as an acid-base indicator. The solution is red when acidic, blue-green when weakly alkaline and dark blue when strongly alkaline.

Upon adding an aqueous solution of tetramethylammonium chloride to the dark red reaction mixture, obtained as described in the first paragraph, a dark precipitate is obtained which is very shock-sensitive and which detonates readily when dry. The compound is bis(tetramethylammonium) pentanitropentahydrodecaborate(2−), i.e., $$[(CH_3)_4N]_2B_{10}H_5(NO_2)_5$$

The procedure, as described above, is applicable to the preparation of other pentanitrodecaborate salts. Thus, diammonium decahydrodecaborate(2−), $(NH_4)_2B_{10}H_{10}$, reacts vigorously with nitric acid to give principally $(NH_4)_2B_{10}H_5(NO_2)_5$. Other pentanitrodecaborate salts which are obtained from appropriate reactants are $$(NH_2NH_3)_2B_{10}H_5(NO_2)_5, [(CH_3)_4N]_2B_{10}H_5(NO_2)_5$$

and $Na_2B_{10}H_5(NO_2)_5$.

(B) A solution of 0.25 g. of cupric nitrate in 15 ml. of water is added to a solution of 0.5 g. of diammonium decahydrodecaborate(2−) in 15 ml. of water which has been acidified with dilute nitric acid. After two minutes an additional 1.0 g. of cupric nitrate is added to the solution and, after another two minutes, half of the reaction solution is added to 10 ml. of a saturated solution of cupric nitrate. A very intense blue color develops in the solution in a few minutes. The solution contains the copper salt of a nitrated decaborate(2−). The tetramethylammonium salt precipitates upon addition of aqueous tetramethylammonium chloride solution to the blue reaction mass; addition of cesium chloride results in precipitation of the cesium salt.

Examples 12 and 13 illustrate compounds of the invention in which X is a nitrogen-oxygen group and their preparation. The process is generic to the preparation of compounds bearing these substituents. To illustrate, it can be used to prepare $Li_2B_{10}H_9NO$, $$[(CH_3)_4N]_2B_{10}H_8(NO)_2, ZnB_{10}H_8(NO_2)_2$$

$BaB_{10}H_7(NO_2)_3$, $PbB_{10}H_6(NO_2)_4$, and the like.

EXAMPLE 14

(A) A mixture of an aqueous solution of $$(H_3O)_2B_{10}H_{10}$$

(about 0.1 mole) and 100 ml. of dimethylformamide is reacted and processed as described in Example 30, Part A. The less soluble fraction is recrystallized from water to obtain needle-like crystals of tetramethylammonium hydrogen dimethylaminononahydrodecaborate(2−).

Analysis.—Calc'd for $[(CH_3)_4N]HB_{10}H_9(CH_3)_2$: B, 45.7; C, 30.5; H, 11.9; N, 11.8. Found: B, 44.1; C, 31.6; H, 11.6; N, 11.8.

The above tetramethylammonium salt is dissolved in hot water and an aqueous solution of $TlNO_3$ is added with stirring. The solid which forms is separated and recrystallized from water to obtain thallium hydrogen dimethylaminononahydrodecarborate(2−).

Analysis.—Calc'd for $TlHB_{10}H_9N(CH_3)_2$: Tl, 55.7. Found: Tl, 54.5.

(B) The process is repeated as described in Example 30, Part B, and the less soluble fraction is dissolved in water and an aqueous solution of trimethylsulfonium iodide is added with stirring. The solid which precipitates is separated by filtration and it is crystallized from water to obtain trimethylsulfonium hydrogen dimethylaminononahydrodecaborate(2−).

Analysis.—Calc'd for $(CH_3)_3SHB_{10}H_9N(CH_3)_2$: C, 25.1; B, 45.2; H, 10.5; S, 13.4; N, 5.85. Found: C, 24.34, 25.78; B, 45.07; H, 10.33, 10.44; S, 13.78; N, 5.95.

Example 14, in combination with Example 30, illustrates the compounds of the invention in which X is an amino group. The process is generic to the preparation of amino-substituted decaborates and compounds having a range of amino groups can be obtained by the choice of an appropriate amide. To illustrate, the hydrate of dihydrogen decahydrodecaborate can be reacted (1) with formamide and then with CsF to yield $CsHB_{10}H_9NH_2$, (2) with diethylformamide and $TlNO_3$ to yield $$TlHB_{10}H_9N(C_2H_5)_2$$

(3) with monopropylformamide and $(CH_3)_4NOH$ to yield $(CH_3)_4NHB_{10}H_9NHC_3H_7$, (4) with dicyclohexylformamide and $(CH_3)_3SI$ to yield $$(CH_3)_3SHB_{10}H_9N(C_6H_{11})_2$$

and (5) with diallylformamide and LiOH to yield $$LiHB_{10}H_9N(C_3H_5)_2$$

Further, the process can be used with partially substituted compounds, e.g., compounds having halogen or acyl substituents, to obtain products having two or more unlike substituents of which one is an amine group. To illustrate, $Cs_2B_{10}H_2Cl_8$ obtained as described in Example 2, Part B, is passed through an acidic ion-exchange column as described in Part D of the same example to obtain an aqueous solution of the acid $H_2B_{10}H_2Cl_8$. This acid can be reacted as described in Examples 14 and 30 (1) with $HC(O)N(CH_3)_2$ and $(CH_3)_4NOH$ to obtain $$(CH_3)_4NHB_{10}HCl_8N(CH_3)_2$$

and (2) with $HC(O)NH_2$ and $(CH_3)_4PI$ to obtain $(CH_3)_4PHB_{10}HCl_8NH_2$.

EXAMPLE 15

A reaction vessel is charged with 7 ml. of 2-propanol and it is cooled in an ice-bath while 9 g. of a viscous aqueous solution of $H_2B_{10}H_{10}$ is added gradually. The temperature remains at 25° C. or lower during the addition. The solution is cooled to 10° C. and 5 g. of styrene monomer is added slowly with stirring. A slight temperature rise is noted (not over 15° C.) and the solution is stirred for 2 hours with ice-bath cooling, then for 2 more hours at prevailing air temperature (25° C.). The solution is neutralized with aqueous 10% NaOH solution and it is steam-distilled for 20 minutes. The solution is concentrated in a rotary evaporation unit to a slush. An aqueous 50% solution of CsF is added with stirring and the precipitate which forms is separated. It is crystallized from hot water to obtain a product consisting of about 80%

$$Cs_2B_{10}H_8(C_2H_4C_6H_5)_2$$

and 20%

$$Cs_2B_{10}H_9(C_2H_4C_6H_5)$$

The presence of cesium is confirmed by flame photometry.

Analysis.—Calc'd for 80:20 composition: C, 30.3; H, 4.3; B, 18.9. Found: C, 30.55; H, 5.27; B, 18.01.

EXAMPLE 16

A Carius tube (capacity, 50 ml.) is charged with 7 g. of the dihydronium salt of decahydrodecaborate(2−) $[(H_3O)_2B_{10}H_{10}]$, 0.9 ml. of water, 3 ml. of isopropyl alcohol and 8 g. of propylene. The charged tube is placed in a tumbler mixer and it is tumbled at about 25° C. for 8 hours. The tube is allowed to stand three days at prevailing atmospheric temperature (ca. 20–25° C.). It is then heated at 80–90° C. for 16 hours. The tube is cooled to about −78° C., opened, and it is allowed to warm to atmospheric temperature. Unreacted propylene evaporates during this period. The contents remaining in the tube are extracted with 10 ml. of ether and the ether extract is allowed to evaporate. A yellow-brown residue remains which is dissolved in 20 ml. of ether and the ether solution is washed with 20 ml. of water. The ether layer is dried and the ether is permitted to evaporate. There remains a thick yellow syrup which is dihydrogen bis(isopropyl)octahydrodecaborate(2−) trihydrate, i.e., $$H_2B_{10}H_8[CH(CH_3)_2]_2 \cdot 3H_2O$$

The identity of the compound is confirmed by its infrared spectrum and by elemental analysis. The infrared spectrum shows a strong B–H absorption at $3.9\mu$ medium C–H absorption at 3.4, 6.9 and $7.2\mu$ and broad skeletal absorption at $9.1\mu$.

*Analysis.*—Calc'd for $C_6H_{30}B_{10}O_3$: C, 27.88; H, 11.70; B, 41.86. Found: C, 29.57; H, 10.34; B, 40.10.

The process of Example 16 can be used to prepare other alkyl-substituted decaborates. To illustrate, by employing the appropriate olefin, there can be obtained $$H_2B_{10}H_9[CH(CH_3)C_2H_5]$$
$$H_2B_{10}H_9[CH(CH_3)C_4H_9]$$
$$H_2B_{10}H_9C_2H_5$$
$$H_2B_{10}H_9[CH(CH_3)C_6H_{13}]$$
$$H_2B_{10}H_7(C_2H_5)_3$$

and the like.

It is noted in the process of Example 16 that no catalyst is employed. The hydrated acid decahydrodecaborate has sufficient acidity to serve as its own catalyst in the alkylation process.

EXAMPLE 17

A portion (0.3 g.) of the product of Example 16 is heated one hour on a steam bath with 4 ml. of a 5% sodium hydroxide solution. A clear solution is obtained to which 4–5 drops of a 50% aqueous solution of cesium fluoride is added. A yellow microcrystalline solid is formed which is separated by filtration. The product is dicesium bis(isopropyl)octahydrodecaborate(2−)monohydrate, $Cs_2B_{10}H_8[CH(CH_3)_2]_2 \cdot H_2O$. The identity of the compound is confirmed by the infrared absorption spectrum and by elemental analysis. The infrared absorption spectrum shows weak bands at 8.55, 9.0 and $11.9\mu$, which is characteristic of the isopropyl group.

EXAMPLE 18

(A) A reaction vessel is charged with about 8.0 g. of hydrated $H_2B_{10}H_{10}$ and 8 g. of methanol at 0° C. Phenylacetylene (4.0 g.) is added and the mixture is shaken. It is maintained at 0° C. for 3 hours with intermittent shaking to assure intimate mixing and it is then allowed to stand at atmospheric temperature (about 25° C.) for 15 hours. Aqueous CsOH solution is added with stirring to the reaction mass until it is neutral. The mixture is cooled in ice-water and it is filtered to separate the precipitate. The product is extracted three times with boiling water, using volumes of 75 ml., 40 ml. and 25 ml., respectively. Each extract is cooled in ice and the precipitate which forms is separated. Each portion is recrystallized from boiling water and they are shown to be the same product by their infrared absorption spectra. The products are the dicesium salts of nonahydrodecaborates which have a hydrocarbon substituent of 8 carbons obtained from phenylacetylene.

Elemental analysis of the product is as follows: C, 18.76; H, 3.89; B, 21.73.

(B) The product obtained in the second extraction of the product of Part A is dissolved in boiling water and aqueous TlNO$_3$ solution is added with stirring. The precipitate which forms is separated and it is extracted with boiling water in a soxhlet unit for 50 minutes. The product is dried and it is shown by the infrared absorption spectrum and elemental analyses to be the dithallium salt of the decaborate anion described in Part A.

Elemental analysis of the product yields the following data: C, 15.2; H, 3.1; B, 18.0.

EXAMPLE 19

A reaction vessel, equipped with reflux condenser, is charged with 10 g. of the hydrate of $H_2B_{10}H_{10}$, i.e., $(H_3O)_2B_{10}H_{10}$, 50 g. of octadecene-1 and 50 ml. of 1,2-dimethoxyethane. The mixture is stirred and heated to refluxing for 24 hours. On cooling, the vessel is filled with light, yellow-brown waxy crystals. The solvent is evaporated from the reaction mass under reduced pressure and the crystalline residue is washed with 500 ml. of pentane. The product is dried thoroughly under reduced pressure to obtain 8.5 g. of the hydrate of dihydrogen bis(octadecyl)octahydrodecaborate(2−), a yellow crystalline solid which decomposes at 260–270° C. without melting.

*Analysis.*—Calc'd for $(H_3O)_2B_{10}H_8(C_{18}H_{37})_2$: C, 68.9; H, 12.5; B, 3.45. Found: C, 73.24; H, 13.35; B, 3.83.

EXAMPLE 20

A solution containing 9 g. of $(NH_4)_2B_{10}H_{10}$ in 50 ml. of water is passed through a column packed with an acidic ion-exchange resin of the type described previously. The acidic eluate is evaporated under reduced pressure and the residue is dried at 0.1 mm. pressure to yield the dihydrate of $H_2B_{10}H_{10}$, i.e., $(H_3O)_2B_{10}H_{10}$, as a slightly gray solid.

A reaction vessel, equipped with a reflux condenser, is charged with the acid obtained above, 70 ml. of 1,2-dimethoxyethane and 5 ml. of water. The mixture is stirred to form a solution and 15 ml. of 2,3-dimethyl-1,3-butadiene is added. The reaction mixture, which consists of two layers, is refluxed for 6 hours. The mixture becomes light green in color but it remains as two layers. It is transferred to a pressure vessel (225 ml. capacity) and heated for 16 hours at 100° C. under autogenous pressure. The tube is cooled in liquid nitrogen and vented to release gaseous products through a vacuum system. Non-condensable products are released which are principally hydrogen. The liquid residue in the pressure vessel is evaporated to yield a yellow syrup. The syrup is dissolved in 15 ml. of hot 5% aqueous KOH solution and 8 ml. of a 50% CsF solution is added. A sticky light yellow precipitate forms which is separated and recrystallized to obtain an almost white crystalline solid which is $$Cs_4[B_{10}H_9CH_2CH(CH_3)CH(CH_3)CH_2B_{10}H_9] \cdot 2H_2O$$

*Analysis.*—Calc'd for above compound: C, 8.13; H, 3.87; B, 24.41. Found: C, 7.86, 7.66; H, 3.89, 3.80; B, 23.78.

The compound is tetracesium 2,3-dimethylbutane-1,4-bis(nonahydrodecaborate). The substituent X in this compound is viewed as $$-CH_2CH(CH_3)CH(CH_3)CH_2B_{10}H_9Cs_2$$

EXAMPLE 20–A (A) Nine grams of the acid, $(H_3O)_2B_{19}H_{10} \cdot H_2O$, is added carefully to a solution of 40 ml. of cyclohexene in 60 ml. of 1,2-dimethoxyethane. After the initial vigorous exothermic reaction has subsided, the mixture is refluxed for 2 hours. The mixture is red and separates into two phases. Water (150 ml.) and pentane (50 ml.) are added and a third phase forms. This phase is separated and the solvent is removed under reduced pressure to yield a viscous cherry-red liquid which is the hydrate of dihydrogen bis(cyclohexyl)octahydrodecaborate (2−), i.e., $$H_2B_{10}H_8(C_6H_{11})_2 \cdot nH_2O$$

The identity of the compound is confirmed by its infrared absorption spectrum. The compound is soluble in ethanol, ether and tetrahydrofuran; insoluble in water and pentane.

(B) The compound of Part A is dissolved in hot 10% NaOH solution and aqueous 50% cesium fluoride solution is added with stirring. A gummy, off-white precipitate forms which is separated and recrystallized from water to give dicesium bis(cyclohexyl)octahydrodecaborate(2−), i.e., $Cs_2B_{10}H_8(C_6H_{11})_2 \cdot H_2O$, an off-white crystalline solid.

Compounds of the type described in Examples 17 and 20-A, Part B, show surface-active properties in aqueous solutions and they are useful as surface-active agents. To illustrate, water containing a minor amount of the compound of Example 20-A, Part B, forms a long-lasting blanket of foam when agitated.

Examples 15–20–A illustrate the compounds of the invention in which X is a hydrocarbon group. The group can be saturated or unsaturated, it can be open-chain or cyclic. The process is generic to the preparation of compounds bearing hydrocarbon substituents by reaction of an aqueous or alcoholic solution of $H_2B_{10}H_{10}$ with an appropriate olefinic or acetylenic hydrocarbon. To illustrate, an aqueous solution of $H_2B_{10}H_{10}$ can be reacted (1) with methylstyrene and NaOH to yield $$Na_2B_{10}H_8(C_2H_4C_6H_4CH_3)_2$$

(2) with ethylene and $(C_6H_5CH_2)(CH_3)_2SOH$ to yield $[(C_6H_5CH_2)(CH_3)_2S]_2B_{10}H_9C_2H_5$, (3) with cyclohexene and CsF to yield $Cs_2B_{10}H_9C_6H_{11}$, and (4) with octadecene-1 to yield $(H_3O)_2B_{10}H_9C_{18}H_{37}$.

EXAMPLE 21

A reaction vessel is charged with 12 g. of hydrated $$H_2B_{10}H_{10}$$

The reaction mass is stirred and 10 g. of propiolic acid is over a period of two hours. The temperature of the reaction mixture rises slowly to 30–35° C. in this time and, after the addition of the propiolic acid is complete, the mixture is warmed to 40° C. for 30 minutes. Aqueous 5% NaOH solution is added to the viscous mass until it is slightly alkaline. The solution is evaporated to a volume of 40 ml., an aqueous solution of cesium fluoride is added with stirring, and the precipitate which forms is separated by filtration. The solid so obtained is dried under reduced pressure and it is crystallized from water two or three times. The product is a mixture of cesium salts of nonahydrodecaborates which have a carboxyl-bearing hydrocarbon group of 2 carbons obtained from propiolic acid. On the basis of infrared absorption spectra, the carboxyl-substituted hydrocarbon group is saturated in some instances and, in others, it is unsaturated, i.e., olefinic.

The elemental analysis is as follows: Cs, 62.0; H, 3.12; C, 5.17.

An aqueous solution of the above product can be passed through a column packed with an acidic ion-exchange resin to yield an aqueous solution of the acid of the above-described anion. In view of the presence of the carboxyl-bearing substituent on the decaborate anion, the acid will be tribasic.

Example 21 illustrates the compounds of the invention in which X is a substituent which has a functional group that can undergo further reactions. Thus, the —COOH group in the compound of Example 21 can be reacted by well-known methods to form an ester, an amide, a nitrile or a salt (ammonium, substituted ammonium, hydrazinium, substituted hydrazinium, and the like). The process of Example 21 is generic to the preparation of compounds in which X bears a functional group. To illustrate, $H_2B_{10}H_{10}$ is reacted (1) with acrylonitrile and $NH_4OH$ to obtain $(NH_4)_2B_{10}H_9CH_2CH_2CN$, (2) with methyl acrylate and NaOH to yield $$Na_2B_{10}H_9C_2H_4C(O)OCH_3$$

and (3) with N,N-dimethyl acrylamide and CsF to yield $Cs_2B_{10}H_9C_2H_4C(O)N(CH_3)_2$. Each of the above compounds in aqueous or alcohol solution can be reacted with an acidic ion-exchange resin to yield aqueous or alcohol solutions of the acids, i.e., $H_2B_{10}H_9CH_2CH_2CN$, $$H_2B_{10}H_9C_2H_4C(O)OCH_3,$$

and $H_2B_{10}H_9C_2H_4C(O)N(CH_3)_2$. Solutions of these acids can, of course, be neutralized with any base to form the corresponding salt.

EXAMPLE 22

(A) A solution of 25 g. of $(NH_4)_2B_{10}H_{10}$ in 180 ml. of water is passed through a column packed with about 1080 g. of acid ion-exchange resin ("Amberlite" IR–120H). The column is rinsed with water to provide 305 ml. of effluent. The effluent is evaporated to about 50 ml. under reduced pressure at a temperature of less than 44° C. A viscous liquid remains which is cooled in an ice bath to 10° C. and 100 ml. of 1,2-dimethoxyethane (glyme) is added with stirring. The solution changes to light green in color and its temperature rises to about 38° C. Stirring and cooling is continued until the temperature drops to 25° C. at which time 12 ml. of benzoyl chloride is added. The temperature remains unchanged and the color of the solution becomes orange red. The solution is stirred about 4 hours in an ice bath and then for 1.5 hours at prevailing atmospheric temperature. The total volume is 130 ml. of a clear, dark red liquid.

(B) A portion (30 ml.) of the reaction liquid is mixed with 54 ml. of an aqueous solution of CsOH (prepared by dissolving 45 g. of CsOH in 100 ml. of water). A light yellow solid which precipitates is separated by filtration and the filtrate is mixed with an aqueous solution of $(CH_3)_4NOH$. The yellow precipitate is separated and it is crystallized from hot water to obtain 1.6 g. of cesium tetramethylammonium monobenzoylnonahydrodecaborate(2−), i.e., $Cs(CH_3)_4NB_{10}H_9C(O)C_6H_5$. The identity of the compound which is a macrocrystalline solid, is confirmed by elemental analysis.

Analysis.—Calc'd for $(CH_3)_4NCsB_{10}H_9C(O)C_6H_5$: Cs, 31.0; C, 30.8; H, 6.1; B, 25.2; N, 3.3. Found: Cs, 31.5; C, 27.8, 28.2; H, 5.6, 5.8; B, 24.8; N, 3.2, 3.0.

(C) A second portion (50 ml.) of the reaction mixture is poured with stirring into a solution of 12 g. of $(CH_3)_4NCl$ in 70 ml. of $CH_3OH$. The precipitate which forms is separated and it is washed with $CH_3OH$ to obtain 3.0 g. of $[(CH_3)_4N]_2B_{10}H_{10}$. A portion of the filtrate is mixed with aqueous $(CH_3)_4NOH$ until the color changes from dark red to very light orange. The mixture is poured into ethanol and the cream-colored precipitate which forms is separated. The solid is crystallized from aqueous ethanol to obtain 2.3 g. of $$[(CH_3)_4N]_2B_{10}H_9C(O)C_6H_5$$

The identity of the compound is confirmed by elemental analysis.

Analysis.—Calc'd for $[(CH_3)_4N]_2B_{10}H_9C(O)C_6H_5$: C, 48.6; B, 29.2; H, 10.3; N, 7.58. Found: C, 45.1, 46.3; B, 29.8, 29.8; H, 10.4, 10.4; N, 7.2, 7.4.

A second portion of the filtrate is poured into 50 ml. of ethanol and the mixture is cooled in an ice bath. The orange colored solid which forms is separated to obtain 0.15 g. of the hydrate of hydrogen tetramethylammonium monobenzoylnonahydrodecaborate(2−); the compound forms acidic solutions. Its identity is confirmed by elemental analysis.

Analysis.—Calc'd for $$(CH_3)_4NHB_{10}H_9C(O)C_6H_5 \cdot H_2O$$

C, 41.8; B, 34.3; H, 9.2. Found: C, 41.0, 41.4; B, 34.0, 34.0; H, 10.8, 10.5.

(D) A small quantity of $$[(CH_3)_4N]_2B_{10}H_9C(O)C_6H_5$$

is mixed with a few milliliters of methanol and water is added dropwise and with stirring until substantially all of the solid has dissolved. The solution is filtered and an aqueous solution of cesium hydroxide is added. The solid which precipitates is separated by filtration, recrystallized from hot water on a steam bath and washed thoroughly with ice-water. It is dried in vacuo to obtain cesium tetramethylammonium monobenzoylnonahydrodecarborate(2−) as a crystalline compound.

*Analysis.*—Calc'd for $Cs(CH_3)_4NB_{10}H_9C(O)C_6H_5$: C, 30.79; H, 6.11; B, 25.2. Found: C, 30.37, 30.32; H, 6.13, 6.41; B, 24.73, 24.79.

(E) An aqueous solution of

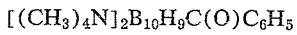
$$[(CH_3)_4N]_2B_{10}H_9C(O)C_6H_5$$

is passed through a column packed with an acidic ion-exchange resin of the type described earlier and the aqueous effluent is titrated carefully with aqueous NaOH. The progress of the titration is followed with a pH meter to determine the characteristics of the acid $$H_2B_{10}H_9C(O)C_6H_5$$

which is present in the acid effluent. The curve shows only one break up to a pH of 11, the break occurring at the neutral point. The behavior of $H_2B_{10}H_9C(O)C_6H_5$ is that of a strong acid in which both protons (H+) are equivalent.

The above procedure is repeated employing 5.0 g. of 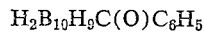$[(CH_3)_4N]_2B_{10}H_9C(O)C_6H_5$ and titrating the acidic effluent to a pH of 7 with aqueous cesium hydroxide. The solution is evaporated under reduced pressure until a solid begins to precipitate. The solution is filtered and the filtrate is chilled in an ice-ethanol bath. A white solid forms which is separated to yield a monohydrate of dicesium monobenzoylnonahydrodecaborate(2−).

*Analysis.*—Calc'd for $Cs_2B_{10}H_9C(O)C_6H_5 \cdot H_2O$: Cs, 53.3. Found: Cs, 52.9.

(F) A portion of the compound, $$[(CH_3)_4N]_2B_{10}H_9C(O)C_6H_5$$

obtained as described in Part A above, is dissolved in water and an aqueous solution of tetrapropylammonium hydroxide is added with stirring. The precipitate which forms is separated and it is crystallized from hot water to obtain bis(tetrapropylammonium) monobenzoylnonahydrodecaborate(2−) as a yellow crystalline product.

*Analysis.*—Calc'd for $[(C_3H_7)_4N]_2B_{10}H_9C(O)C_6H_5$: C, 62.56; H, 11.86; B, 18.18; N, 4.70. Found: C, 62.64, 62.76; H, 12.00, 11.96; B, 18.73, 18.62; N, 4.66, 4.73.

(G) A mixture of 2.0 g. of diammonium decahydrodecaborate(2−) and 30 ml. of polyphosphoric acid is heated at 45° C. for a short time. Benzoyl chloride (1.8 ml.) is added to the solution with stirring to form a solution of orange-red color. The solution is heated with stirring to 60–65° C. for 15 minutes and it is then poured into 100 ml. of water with vigorous stirring. An orange solid forms which is acidic and which is separated by filtration. The crude product is dissolved in hot chlorobenzene and it is reprecipitated by adding decahydronaphthalene or petroleum ether. The purified orange solid is dihydrogen di(benzoyl)octahydrodecaborate(2−), i.e.,

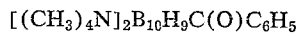
$$H_2B_{10}H_8(\overset{O}{\overset{\|}{C}}C_6H_5)_2$$

The identity of the compound is confirmed by elemental analysis.

*Analysis.*—Calc'd for $C_{14}H_{20}B_{10}O_2$; C, 51.1; H, 6.12; B, 32.9. Found: C, 49.82; H, 6.50; B, 27.42.

The compound is soluble in acetone, alcohol, dichlorobenzene, dioxane, and similar solvents. It is insoluble in water, petroleum ether, and other saturated hydrocarbons. Treatment of the compound with aqueous sodium hydroxide yields the sodium salt,

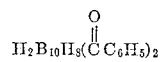
$$Na_2B_{10}H_8(\overset{O}{\overset{\|}{C}}C_6H_5)_2$$

Reaction of the sodium salt in aqueous solution with tetramethylammonium chloride gives

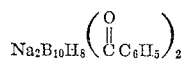
$$[(CH_3)_4N]_2B_{10}H_8(\overset{O}{\overset{\|}{C}}C_6H_5)_2$$

i.e., bis(tetramethylammonium) dibenzoyloctahydrodecaborate(2−). The identity of this compound is confirmed by elemental analysis.

*Analysis.*—Calc'd for $C_{22}H_{42}B_{10}N_2O_2$: B, 22.75. Found: B, 21.03.

By employing the process of Example 22, $$(NH_4)_2B_{10}H_{10}$$

and acetyl chloride are reacted to yield

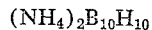
$$(NH_4)_2B_{10}H_8(\overset{O}{\overset{\|}{C}}CH_3)_2$$

which is an orange-colored solid.

The process of Example 22 is broadly applicable to the preparation of acylated decaborates. For example, $H_2B_{10}H_{10}$ with $C_3H_7C(O)Cl$ yields

$$H_2B_{10}H_8(\overset{O}{\overset{\|}{C}}C_3H_7)_2$$

$[(CH_3)_4N]_2B_{10}H_{10}$ with $CH_3C_6H_4C(O)Cl$ yields

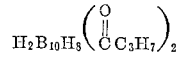
$$[(CH_3)_4N]_2B_{10}H_8(\overset{O}{\overset{\|}{C}}C_6H_4CH_3)_2$$

Other compounds which can be obtained from the appropriate acid chloride are as follows:

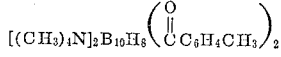
$$H_2B_{10}H_8(\overset{O}{\overset{\|}{C}}C_7H_{15})_2, \quad (NH_4)_2B_{10}H_9\overset{O}{\overset{\|}{C}}C_{11}H_{23}$$

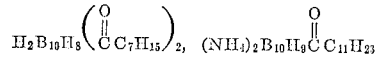
$$[(CH_3)_4N]_2B_{10}H_9\overset{O}{\overset{\|}{C}}C_{17}H_{35}, \quad Na_2B_{10}H_8(\overset{O}{\overset{\|}{C}}C_6H_4CH_3)_2$$

and the like.

EXAMPLE 23

(A) A solution of the acid $(H_3O)_2B_{10}H_{10}$ is prepared as described in Example B, Part C. The effluent from the ion-exchange column, which has a volume of about 345 ml., is evaporated to a volume of about 50 ml. The solution is cooled to 0–5° C., 100 ml. of 1,2-dimethoxyethane is added with stirring, followed by 21 g. of benzoyl chloride. The mixture, cooled in an ice bath, is stirred for one hour at which time the ice bath is removed and stirring is continued at atmospheric temperature for about 48 hours. The color of the solution is dark red. The mixture is then poured into a solution of 40 g. of $(CH_3)_4NCl$ in 200 ml. of $CH_3OH$. An aqueous solution of $(CH_3)_4NOH$ is added to the filtrate until the color changes to pale yellow and a further slight excess of the base is added. The mixture is poured into 700 ml. of $C_2H_5OH$ and the precipitate is separated by filtration. The product, weighing 23.5 g., is a cream-colored solid which is $[(CH_3)_4N]_2B_{10}H_9C(O)C_6H_5$.

A portion (10 g.) of the above compound is dissolved in water and the solution is passed through a sodium ion-exchange resin ("Amberlite" IR 120–Na form) to obtain a solution of $Na_2B_{10}H_9C(O)C_6H_5$. The effluent is evaporated to obtain 5.6 g. of the solid sodium salt, which is a hygroscopic, brittle, glass-like compound.

The sodium salt, in aqueous solution, is mixed with an aqueous solution of the hydrochloride of semicarbazide to form the semicarbazone. The solution of the semicarbazone is mixed with aqueous $(CH_3)_4NOH$ and the precipitate which forms is separated. The solid is crystallized from water to obtain the semicarbazone of $[(CH_3)_4N]_2B_{10}H_9C(O)C_6H_5$. The identity of the compound is confirmed by elemental analysis.

*Analysis.* — Calc'd for $[CH_3)_4N]_2B_{10}H_9C(C_6H_5) = NNHC(O)NH_2 \cdot H_2O$: C, 43.0; H, 9.71; B, 24.2; N, 15.7. Found: C, 43.64; H, 9.65, 9.83; B, 23.53; N, 15.29.

(B) A solution of 10 g. of $[(CH_3)_4N]_2B_{10}H_9C(O)C_6H_5$ in water is passed through an acidic ion-exchange resin column to obtain as the effluent a solution of $(H_3O)_2B_{10}H_9C(O)C_6H_5$. The effluent is titrated to the neutral point with 0.1N NaOH and the resulting solution is evaporated to a volume of about 100 ml. under reduced pressure. At this point 10 g. of the hydrochloride of semicarbazide and 15 g. of sodium acetate are added and the solution is heated on a steam bath for about 5 minutes. The solution is clear yellow and contains the sodium salt, $Na_2B_{10}H_9C(C_6H_5)=NNHC(O)NH_2$. Aqueous solutions of $(CH_3)_4NOH$ and $(CH_3)_4NCl$ are added in large excess until a precipitate forms. The precipitate is separated by filtration and crystallized from water to obtain 7.7 g. of $[(C_3H)_4N]_2B_{10}H_9C(C_6H_5)=NNH\ C(O)NH_2$.

The analysis of the compound (see Part A for calculated values) is as follows: B, 22.67, 22.71; C, 41.38, 41.58; N, 14.81, 14.93.

EXAMPLE 24

A reaction vessel is charged with 15 ml. of an aqueous solution containing 4 g. of $[(CH_3)_4N]_2B_{10}H_9C(O)C_6H_5$. To this solution there is added with stirring 10 ml. of an aqueous solution containing 0.01 mole of phenylhydrazine, and 5 ml. of glacial acetic acid. The yellow solid which precipitates is separated by filtration and dried. The compound so obtained is the trihydrate of the phenylhydrazone of $(CH_3)_4NHB_{10}H_9C(O)C_6H_5$.

*Analysis.*—Calc'd for $(CH_3)_4N(H_3O)B_{10}H_9C(C_6H_5)=NNHC_6H_5 \cdot 2H_2O$ C, 46.22; H, 8.90; B, 24.50; N, 9.51. Found: C, 48.15; H, 9.01; B, 24.52; N, 10.31.

Examples 23 and 24 illustrate compounds of the invention in which X is a substituent having a carbon-to-nitrogen multiple bond, i.e., a $>C=N-$ group. These are derived readily from compounds having carbacyl substituents and the processes of Examples 23 and 24 are generic to the preparation of this type of compound.

EXAMPLE 25

A mixture of 1.3 g. of p-toluenesulfonyl chloride and 45 ml. of polyphosphoric acid is stirred at 80–90° C. for 2 hours. To this mixture there is added 1.0 g. of diammonium decahydrodecaborate(2−), $(NH_4)_2B_{10}H_{10}$, and the mixture is stirred and heated at 80–90° C. for about 20 hours. The mixture is then added with stirring to 100 ml. of water and a yellow solid precipitates. The solid, which is dihydrogen (p-tolylsulfonyl)nonahydrodecaborate(2−), is separated by filtration and it is washed and dried in air. The identity of the yellow compound, which has the formula $H_2B_{10}H_9SO_2C_6H_4CH_3$, is confirmed by elemental analysis.

*Analysis.*—Calc'd for $C_7H_{18}B_{10}SO_2$: C, 30.6; H, 6.6; B, 39.4; S, 11.65. Found: C, 31.80; H, 7.05; B, 34.6; S, 11.05.

The procedure of Example 25 is generally operable for the preparation of decaborates having arylsulfonyl groups as substituents. By employing the appropriate arylsulfonyl chloride, there can be obtained, e.g., $H_2B_{10}H_9SO_2C_6H_5$, $[(CH_3)_4N]_2B_{10}H_9SO_2C_6H_3(CH_3)_2$, $(NH_4)_2B_{10}H_9SO_2C_6H_4C_2H_5$ $H_2B_{10}H_9SO_2(C_6H_4C_6H_5)$, and $(NH_4)_2B_{10}H_9-SO_2C_6H_4SO_2-B_{10}H_9(NH_4)_2$

EXAMPLE 26

(A) An aqueous solution containing 20 g. of $(NH_4)_2B_{10}H_{10}$ is passed through an acidic ion-exchange resin of the type described earlier and the acid effluent is evaporated under reduced pressure to a volume of about 45 ml. To this solution, which contains $(H_3O)_2B_{10}H_{10}$, 100 ml. of 1,2-dimethoxyethane is added with stirring. A blue color develops and the temperature of the mixture rises to 50° C. The solution is warmed on a steam bath at about 70–80° C. for 45 minutes. The solution, which is yellow, is poured into a solution (300 ml. propanol and 100 ml. ethanol) containing excess $(CH_3)_4NOH$. The white precipitate which forms is separated by filtration and it is dried overnight. There is obtained 31 g. of bis(tetramethylammonium) mono(2 - methoxyethoxy)nonahydrodecaborate (2−), i.e., $[(CH_3)_4N]_2B_{10}H_9OCH_2CH_2OCH_3$. The compound is a crystalline white water-soluble product.

A portion of the above compound is dissolved in water and an aqueous solution of $TlNO_3$ is mixed with it. The white precipitate which forms is separated and it is recrystallized from boiling water and from methanol to obtain $Tl_2B_{10}H_9OCH_2CH_2OCH_3$ as gleaming white crystals. The identity of the compound is confirmed by elemental analysis.

*Analysis.*—Calc'd for $Tl_2B_{10}H_9OCH_2CH_2OCH_3$: C, 5.98; H, 2.66; Tl, 68.0; B, 17.99. Found: C, 5.23; H, 2.82; Tl, 65.93; B, 17.99.

The infrared absorption spectrum of the thallium compound suggests that the thallium ion forms a complex with the β-methoxyethoxy substituent.

(B) A reaction vessel is charged with 35 ml. of 1,2-dimethoxyethane containing in solution 0.03 mole of a hydrate of $H_2B_{10}H_{10}$. Cyclohexanone (4 ml.) is added to the solution and the mixture is stirred at atmospheric temperature (about 25° C.). The initial light yellow color of the solution fades in about 20 minutes and 10 ml. more of cyclohexanone is added. The solution again becomes yellow and after 6 hours stirring it has a reddish tinge. The solution is allowed to stand for about three days and it is then medium dark red in color. The solution is added with stirring to a solution of 20 g. of $(CH_3)_4NOH$ in 300 ml. of isopropyl alcohol. A solid precipitates which is separated by filtration to obtain a pink-colored powder, a red gum and a dark red filtrate. The gum is boiled in ethanol and the insoluble portion (1.7 g.) is separated by filtration. The solid is crystallized from methanol to obtain light pink crystals of bis(tetramethylammonium) (2-methoxyethoxy)nonahydrodecaborate(2−). The identity of the compound is confirmed by elemental analysis.

*Analysis.*—Calc'd for $[(CH_3)_4N]_2B_{10}H_9OCH_2CH_2OCH_3$

C, 38.66; H, 11.9; B, 31.9; N, 8.25. Found: C, 38.62, 38.04; H, 11.90, 11.50; B, 31.01, 31.44; N, 8.22, 8.70.

(C) A reaction vessel is charged with 8 ml. of cyclohexanone and a solution of 0.059 mole of a hydrate of $H_2B_{10}H_{10}$, i.e., $(H_3O)_2B_{10}H_{10}$ in 50 ml. of 1,2-dimethoxyethane and 15 ml. of water. The mixture is stirred a few minutes in an ice bath and the bath is then removed. Stirring is continued at prevailing atmospheric temperature for about 5 minutes and 20 ml. of cyclohexanone is added. The mixture is stirred at about 25° C. for three days to form a red solution.

A portion of the reaction mixture is reacted with ethane - 1,2-bis(trimethylphosphonium) diiodide in water to obtain $(CH_3)_3PCH_2CH_2P(CH_3)_3B_{10}H_9OCH_2CH_2OCH_3$ A second portion of the reaction mixture is reacted with an alcohol solution of cesium hydroxide to obtain $Cs_2B_{10}H_9OCH_2CH_2OCH_3$. The compound is a white hygroscopic solid.

Another portion of the reaction mixture is stirred with 300 ml. of isopropyl alcohol containing 40 g. of $(CH_3)_4NOH$. The salt is separated by filtration to obtain 5.7 g. of product which is pale violet in color. The salt, which is $[(CH_3)_4N]_2B_{10}H_9OCH_2CH_2OCH_3$, is heated with 50 ml. of methanol and the insoluble portion is separated as a substantially colorless product. The identity of the compound is confirmed by elemental analysis as follows (for calculated values, see Part A): Found: C. 38.62, 38.04; H, 11.90, 11.54; B, 31.01, 31.44; N, 8.22, 8.70.

A portion of the tetramethylammonium salt is reacted in aqueous solution with aqueous silver nitrate. The precipitate which forms is separated and washed with water and methanol until free of excess silver nitrate. The product, which is $Ag_2B_{10}H_9OCH_2CH_2OCH_3$, is obtained as a white crystalline material which is stable in the absence of light but turns dark upon exposure to daylight.

A portion (15.0 g.) of

[(CH₃)₄N]₂B₁₀H₉OCH₂CH₂OCH₃ obtained as described in Part A, is dissolved in hot water and the solution is passed through an acidic ion-exchange column of the type described earlier. The acid effluent which contains H₂B₁₀H₉OCH₂CH₂OCH₃ is titrated with aqueous NaOH solution to a pH value of 7. The neutral solution is evaporated to dryness to yield Na₂B₁₀H₉OCH₂CH₂OCH₃ as a white crystalline salt.

EXAMPLE 27

An aqueous solution containing 4.0 g. of $(NH_4)_2B_{10}H_{10}$ is passed through a column packed with an acidic ion-exchange resin, described earlier, and the aqueous effluent is evaporated under reduced pressure to a volume of 10 ml. This solution of $(H_3O)_2B_{10}H_{10}$ is mixed with 75 ml. of tetrahydrofuran and the mixture is heated on a steam bath for 40 minutes. A blue color forms at first which changes slowly to yellow. The solution is poured with stirring into an aqueous solution of (CH₃)₄NOH. The white solid which forms is separated by filtration and it is recrystallized from aqueous ethanol to obtain light yellow crystals of bis(tetramethylammonium) butoxynonahydrodecarborate(2−). The identity of the compound is confirmed by elemental analysis.

*Analysis.*—Calc'd for [(CH₃)₄N]₂B₁₀H₉O(CH₂)₃CH₃: B, 33.4; H, 12.4; C, 40.7. Found: B, 32.75; H, 12.63, 12.20; C, 38.68, 38.46.

Examples 26 and 27 illustrate the compounds of the invention in which X is an —OR‴ group. The process of these examples is generic to the preparation of compounds which contain —OR‴ substituents, particularly where R‴ is a hydrocarbon group of an oxygen-interrupted hydrocarbon group of up to 12 carbons. To illustrate, the acid $(H_3O)_2B_{10}H_{10}$ is reacted with methyl ethyl ether to form $(H_3O)_2B_{10}H_9OC_2H_5$, with methyl octyl ether to form $(H_3O)_2B_{10}H_9OC_8H_{17}$, with methyl allyl ether to form $(H_3O)_2B_{10}H_9OC_3H_5$, with anisole to form $(H_3O)_2B_{10}H_9OC_6H_5$ and with methyl cyclohexyl ether to form $(H_3O)_2B_{10}H_9OC_6H_{11}$ The acids can be neutralized with the appropriate bases to form the desired salts, as illustrated in these and other examples.

EXAMPLE 27–A

An aqueous solution containing 8.0 g. of $(NH_4)_2B_{10}H_{10}$ is passed through a column packed with an acidic ion-exchange resin of the type described earlier. The acidic effluent is evaporated under reduced pressure to a syrup. To this syrup 8 g. of dimethyl disulfide is added and the mixture is stirred at prevailing temperature (about 25° C.) for 24 hours. The mixture is neutralized with aqueous NaOH solution and it is steam-distilled about one hour to remove unreacted CH₃SSCH₃. The residual solution is evaporated under reduced pressure to a volume of about 25 ml. and aqueous 50% cesium fluoride solution is added in excess. The precipitate which forms is separated and it it recrystallized twice to yield Cs₂B₁₀H₈(SCH₃)₂.

*Analysis.*—Calc'd for Cs₂B₁₀H₈(SCH₃)₂: C, 5.1; H, 3.0. Found: C, 5.27; H, 3.57.

Example 27–A illustrates compounds of the invention in which X is —SR‴ and a process for obtaining them. The group R‴ has the meaning defined in the discussion of Examples 26 and 27. Preferably R‴ is an aliphatically saturated hydrocarbon group of at most 12 carbons. The process of Example 27–A is generic to the preparation of compounds having hydrocarbonmercapto groups. It consists simply in reacting an organic disulfide of the formula R‴SSR‴ with an aqueous solution of the acid $H_2B_{10}H_{10}$, also expressed as $(H_3O)_2B_{10}H_{10}$. The substituted compound is most conveniently isolated as an insoluble salt by adding the appropriate cation (M⁺) to the reaction mixture. However, the reaction mixture can be evaporated to isolate soluble compounds. To illustrate, [(CH₃)₄N]₂B₁₀H₈)SC₄H₉)₂ is obtained from dibutyl disulfide and (CH₃)₄NCl; (C₃H₇NH₃)₂B₁₀H₈(SC₈H₁₇)₂ is obtained from di(2-ethylhexyl) disulfide and propylamine; Al₂(H₂O)₆]B₁₀H₈(SCH₂C₆H₅)₂]₃ is obtained from dibenzyl disulfide and AlCl₃·H₂O; Na₂B₁₀H₉SC₁₂H₂₅ is obtained from didodecyl disulfide and sodium hydroxide; and CaB₁₀H₈(SC₆H₁₁)₂ is obtained from dicyclohexyl disulfide and calcium hydroxide.

EXAMPLE 28

(A) A portion (about 0.5 g.) of Cs₂B₁₀H₉OH, prepared as described in Example 10, Part A, is dissolved in about 5 ml. of formic acid (98%+) and the solution is heated on a steam bath for 2–3 minutes. It is cooled, diluted with water and a solution of thallium nitrate is added with stirring. The precipitate which forms is separated and washed. The compound, dithallium formyloxynonahydrodecaborate (2−), is obtained as a white crystalline material. The identity of the compound, which has the formula Tl₂B₁₀H₉OC(O)H, is confirmed by its infrared absorption spectrum.

The compound is hydrolyzed to Tl₂B₁₀H₉OH by reaction with hydrogen peroxide or sodium hydroborate (NaBH₄).

(B) The compound CsB₁₀H₉·HC(O)N(CH₃)₂, prepared as described in Example 10, Part A, is dissolved in an aqueous solution of sodium cyanide and the solution is heated on a steam bath for 9–10 minutes. The solution is mixed with an aqueous solution of TlNO₃ and the precipitate which forms is separated to obtain Tl₂B₁₀H₉OC(O)H as a white crystalline solid. The identity of the compound is confirmed by its infrared absorption spectrum.

EXAMPLE 29

(A) A small portion (ca. 0.5 g.) of the hydrate of Cs₂B₁₀H₈(OH)₂, prepared as described in Example 11, Part C, is dissolved in formic acid (98%+) and the solution is heated on a steam bath for about 3 minutes. The solution is poured into water and aliquot portions of the resulting solution are removed for further reactions, as described below.

One portion is neutralized with aqueous CsOH solution to form the water soluble Cs₂B₁₀H₈[OC(O)H]₂. A second portion is mixed with aqueous TlNO₃ solution to form the water soluble Tl₂B₁₀H₈[OC(O)H]₂. A third portion is mixed with sufficient aqueous NaOH solution to make the solution basic. The product, Na₂B₁₀H₈[OC(O)H]₂ remains in solution.

An aqueous solution of (C₃H₇)₄NOH is added to the remaining reaction mixture and the precipitate which forms is separated to yield

[(C₃H₇)₄N]₂B₁₀H₈[OC(O)H]₂

The identity of the compound is confirmed by its infrared absorption spectrum.

(B) The process of Part A is repeated employing 1.0 g. of [(CH₃)₄N]₂B₁₀H₈(OH)₂, obtained as described in Example 11, Part E, and 6 ml. of glacial formic acid. The mixture is heated on a steam bath for 3 minutes and poured into 25 ml. of propanol. The precipitate is separated and crystallized from aqueous ethanol to obtain the tetramethylammonium salt of the formula shown below.

Analysis.—Calc'd for $[(CH_3)_4N]_2B_{10}H_8[OC(O)H]_2$: C, 33.8; H, 9.6; B, 30.5. Found: C, 30.43, 30.21; H, 9.80, 9.63; B, 32.63.

EXAMPLE 30

(A) A reaction vessel is charged with 100 ml. of dimethylformamide and an aqueous solution of $$(H_3O)_2B_{10}H_{10}$$

(about 0.1 mole), obtained as described in Example A, Part C. The solution is heated for one hour on a steam bath and the water is then removed by distillation at atmospheric pressure. The liquid residue is refluxed for 3.5 hours after which it is poured into 200 ml. of methanol which contains in solution 40 g. of $$(CH_3)_4NOH \cdot 5H_2O$$

The solution so obtained is stirred into a mixture of 400 ml. of n-$C_3H_7OH$ and 100 ml. of iso-$C_3H_7OH$. The solid which precipitates is separated by filtration.

The solid is separated into two fractions by repeated crystallization from ethanol and ethanol-water solutions. The less soluble fraction is set aside and it is described further in Example 14, Part A.

The more soluble fraction is dissolved in ethanol-water and 1-butanol is added to precipitate a white solid which is bis(tetramethylammonium) formyloxynonahydrodecarborate(2−).

Analysis.—Calc'd for $[(CH_3)_4N]_2B_{10}H_9OC(O)H$: B, 34.8; C, 34.8; H, 11.0; N, 9.0. Found: B, 35.6; C, 34.3; H, 11.5; N, 9.4.

The above tetramethylammonium salt is dissolved in water and an aqueous solution of $TlNO_3$ is added with stirring. The solid which forms is separated and crystallized from water to obtain dithallium formyloxynonahydrodecarborate(2−).

Analysis.—Calc'd for $Tl_2B_{10}H_9OC(O)H$: Tl, 71.6. Found: Tl, 73.2.

B. The process of Part A is repeated employing 100 ml. of $HC(O)N(CH_3)_2$ and 0.091 mole of $$(H_3O)_2B_{10}H_{10}$$

dissolved in 23 ml. of water. The mixture is heated and distilled to remove water as described earlier over a period of about 1.5 hours. The reaction mixture is poured into 400 ml. of ethanol containing 30 g. of CsOH. The solid which forms is separated by filtration and it is further separated into two fractions by repeated crystallization from 2-propanol-ethanol mixture. The less soluble fraction is set aside and it is described further in Example 14, Part B.

The more soluble fraction is crystallized from water to obtain 16 g. of dicesium monoformyloxynonahydrodecaborate(2−).

Analysis.—Calc'd for $Cs_2B_{10}H_9OC(O)H$: Cs, 62.1; B, 25.0; H, 2.34; C, 2.80. Found: Cs, 62.0; B, 25.57, 25.40; H, 2.65; C, 2.74.

EXAMPLE 31

(A) A reaction vessel is charged with $$[(CH_3)_4N]_2B_{10}H_9C(O)C_6H_5$$

prepared as described in Example 22, Part C, and 65 ml. of water. The mixture is stirred until a solution is formed and it is then filtered to remove a small quantity of insoluble material. The filtrate is mixed with 25 ml. of 30% aqueous hydrogen peroxide solution and the mixture is allowed to stand for 2–3 days at atmospheric temperature. A precipitate forms which is separated to yield 2.1 g. of a tan-colored solid. The product is purified by recrystallization from water to obtain bis(tetramethylammonium) monobenzoyloxynonahydrodecaborate(2−), i.e., $$[(CH_3)_4N]_2B_{10}H_9OC(O)C_6H_5$$

A further quantity of the compound is obtained by pouring the filtrate from the reaction mixture into propanol and separating the precipitate. The identity of the compound is confirmed by its infrared absorption spectrum and by elemental analysis.

Analysis.—Calc'd for $[(CH_3)_4N]_2B_{10}H_9OC(O)C_6H_5$: B, 28.0; C, 46.0; H, 9.85; N, 7.25. Found: B, 27.83, 27.58; C, 46.96, 46.90; H, 10.03, 10.04; N, 7.20, 7.40.

(B) The product of Part A is stable in boiling water and it forms a thallium salt of the formula $$Tl_2B_{10}H_9OC(O)C_6H_5$$

by reaction in aqueous solution with $TlNO_3$. The thallium salt is a white crystalline compound which is insoluble in water.

(C) The produce of Part A is hydrolyzed by refluxing 2 hours in 10 ml. of 20% NaOH and the resulting solution is reacted with aqueous $TlNO_3$ to form $Tl_2B_{10}H_9OH$, a compound also obtained in Example 10, Parts C and D.

(D) The product of Part A is dissolved in hot water and the solution is passed through an acidic ion-exchange column of the type described previously. The acidic effluent, which contains $H_2B_{10}H_9OC(O)C_6H_5$, is titrated with aqueous NaOH solution until neutral. The neutral solution is evaporated to dryness to yield disodium benzoyloxynonahydrodecaborate(2−), i.e., $Na_2B_{10}H_9OC(O)C_6H_5$, as a white crystalline hygroscopic salt.

Example 31 illustrates the compounds of the invention in which X is hydrocarbonyloxy, i.e., —OC(O)R′, where R′ has the meaning given earlier in the specification. The process of Example 31 is generic for the preparation of esters. The most versatile and, therefore, preferred method is the reaction of decaborate salts having hydroxyl groups with an organic acid. To illustrate, $Cs_2B_{10}H_9OH$ can be reacted (1) with propionic acid to obtain $$Cs_2B_{10}H_9OC(O)C_2H_5$$

(2) with methacrylic acid to obtain $$Cs_2B_{10}H_9OC(O)C(CH_3)=CH_2$$

(3) with dodecanoic acid to obtain $$Cs_2B_{10}H_9OC(O)C_{11}H_{23}$$

and (4) with toluic acid to obtain $$Cs_2B_{10}H_9OC(O)C_6H_4CH_3$$

In like manner $(NH_4)_2B_{10}H_8(OH)_2$ can be reacted (1) with hexahydrobenzoic acid to yield $$(NH_4)_2B_{10}H_8[OC(O)C_6H_{11}]_2$$

(2) with trichloroacetic acid to yield $$(NH_4)_2B_{10}H_8[OC(O)CCl_3]_2$$

(3) with trifluoroacetic acid to yield $$(NH_4)_2B_{10}H_8[OC(O)CF_3]$$

and (4) with naphthoic acid to yield $$(NH_4)_2B_{10}H_8[OC(O)C_{10}H_7]_2$$

The process of Examples 28–31 can be used to prepare compounds of the invention in which X is carbamoyloxy, i.e., —OC(O)NH_2, —OC(O)NHR and —OC(O)NR_2, where R is an organic group as defined earlier. In this manner of operation decaborates having —OH groups as substituents are reacted with carbamyl chlorides, e.g., $NH_2C(O)Cl$, $RNHC(O)Cl$, and $R_2NC(O)Cl$. To illustrate, $Na_2B_{10}H_9OH$ can be reacted (1) with $NH_2C(O)Cl$ to obtain $Na_2B_{10}H_9OC(O)NH_2$, (2) with $$(CH_3)_2NC(O)Cl$$

to yield $Na_2B_{10}H_9OC(O)N(CH_3)_2$, and (3) with $$C_6H_5NHC(O)Cl$$

to yield $Na_2B_{10}H_9OC(O)NHC_6H_5$. Further, by way of illustration, $(NH_4)_2B_{10}H_8(OH)_2$ can be reacted (1) with $(C_2H_5)_2NC(O)Cl$ to yield $$(NH_4)_2B_{10}H_8[OC(O)N(C_2H_5)_2]_2$$

(2) with $(C_4H_9)_2NC(O)Cl$ to yield $$(NH_4)_2B_{10}H_8[OC(O)N(C_4H_9)_2]_2$$

and (3) with $(C_6H_{11})_2NC(O)Cl$ to yield $$(NH_4)_2B_{10}H_8[OC(O)N(C_6H_{11})_2]_2$$

EXAMPLE 32

An aqueous solution of benzenediazonium chloride (13.8 millimoles) is added at 0° C. to 2.0 g. of diammonium decahydrodecaborate(2−) in 50 ml. of water. A brown solid precipitates which explodes readily when dry. The solid dissolves in ethanol at steam bath temperatures to form a deep red solution which is useful for dyeing wool and viscose rayon fibers a red color. Evaporation of the alcohol yields a solid which is extracted with hot benzene. The residual solid is brown and non-explosive. It is shown by infrared analysis to be a decaborate salt having a phenylazo group on the decaborate anion.

The above example illustrates a compound of the invention in which the group X is —N=N-aryl. By employing the appropriate diazonium chloride compounds of the invention can be obtained in which X is tolylazo, naphthylazo, chlorophenylazo, and the like.

The examples which follow illustrate compounds of the invention which have a plurality of X groups in which the X groups are not alike.

EXAMPLE 33

(A) A reaction vessel is charged with 4.6 g. of $[(CH_3)_4N]_2B_{10}H_9OCH_2CH_2OCH_3$, obtained as described in Example 6, Part A, and 75 ml. of $CH_3CN$. Chlorine gas is passed into the suspension and the temperature rises to 70° C. The suspended solid dissolves rapidly and the solution becomes reddish brown. Passage of chlorine is continued for about one hour until the temperature drops to about 30° C. The solution is evaporated under reduced pressure and the residue is stirred with water. Aqueous $(CH_3)_4NOH$ is added and the mixture is heated to boiling. The solution is filtered, the filtrate is cooled and the crystals which form are separated. The product is crystallized from water to obtain bis(tetramethylammonium)nonachloromono(2 - methoxyethoxy)decaborate-(2−), i.e., $[(CH_3)_4N]_2B_{10}Cl_9OCH_2CH_2OCH_3$.

(B) A mixture is prepared consisting of 14.4 g. of $[(CH_3)_4N]_2B_{10}H_9OCH_2CH_2OCH_3$ and 150 ml. of anhydrous $CH_3CN$. The mixture is stirred and chlorine gas is passed through it, using ice-bath cooling as needed, to maintain the temperature at 20–25° C. After passage of chlorine for one hour the reaction mixture is a clear dark-colored solution. The mixture is evaporated to obtain a thick syrup which is stirred into an aqueous solution of $(CH_3)_4NCl$. A precipitate forms which is separated and recrystallized from aqueous ethanol to obtain $$[(CH_3)_4N]_2B_{10}Cl_9OCH_2CH_2OCH_3$$

as a white crystalline product. The identity of the compound is confirmed by elemental analysis.

*Analysis.*—Calc'd for $$[(CH_3)_4N]_2B_{10}Cl_9OCH_2CH_2OCH_3:$$

B, 16.6; C, 20.3; H, 4.8; Cl, 49.0; N, 4.3. Found: B, 17.0; C, 18.9; H, 4.8; Cl, 53.0; N, 4.3.

EXAMPLE 34

(A) A reaction vessel is charged with a solution of 1 g. of $[(CH_3)_4N]_2B_{10}H_9OCH_2CH_2OCH_3$ (prepared as described in Example 26, Part A) in 30 ml. of $CH_3OH$ and 10 ml. of $H_2O$. A solution of 6 g. of bromine in 20 ml. of methanol is added slowly and with stirring. The reaction mixture becomes warm and substantially all of the bromine reacts. Excess aqueous $[(CH_3)_4N]OH$ is then added and a white crystalline solid precipitates which is separated by filtration. The solid is crystallized from water to obtain 1.3 g. of bis(tetramethylammonium) (2-methoxyethoxy)nonabromodecaborate(2−). The identity of the compound is confirmed by elemental analysis.

*Analysis.*—Calc'd for $$[(CH_3)_4N]_2B_{10}Br_9OCH_2CH_2OCH_3:$$

B, 10.3; Br, 68.4; C, 12.4; H, 2.94. Found: B, 10.03; Br, 67.99; C, 12.40, 12.76; H, 3.24, 3.39.

(B) A reaction vessel is charged with 180 ml. of methanol, 60 ml. of water and 6.2 g. of $$[(CH_3)_3N]_2B_{10}H_9OCH_2CH_2OCH_3$$

The mixture is stirred until the solid dissolves and a solution of 36 g. of bromine in 120 ml. of methanol is added slowly and with stirring over a period of 2 hours. Tetramethylammonium hydroxide is added until the color of excess bromine is gone and then 5 g. more of the base is added. A solid forms which is separated and washed with 50 ml. of water. The filtrate is diluted with 50 ml. of water and it is distilled until the methanol is removed. The solid which separates is removed by filtration and combined with the previous solid. The combined solids are washed with water to obtain 16.1 g. of product which is $[(CH_3)_4N]_2B_{10}Br_9OCH_2CH_2OCH_3$.

(C) The product of Part A is dissolved in hot water and the hot solution is passed through an acidic ion-exchange resin of the type described earlier. The aqueous effluent, which contains $H_2B_{10}Br_9OCH_2CH_2OCH_3$ is titrated with aqueous NaOH solution to a pH value of 7. The neutral solution is evaporated to dryness to obtain $Na_2B_{10}Br_9OCH_2CH_2OCH_3$ containing water of hydration. The product is a white crystalline solid.

(D) A solution of the acid $H_2B_{10}Br_9OCH_2CH_2OCH_3$, prepared as described in Part C, is stirred with an aqueous solution of silver nitrate for 15 minutes. The precipitate which forms is separated, washed and dried to obtain $Ag_2B_{10}Br_9OCH_2CH_2OCH_3$.

*Analysis.*—Calc'd for the above formula: C, 3.22; H, 0.63; B, 9.68. Found: C, 3.11; H, 0.92; B, 9.90.

EXAMPLE 35

(A) A glass reaction vessel is charged with 30 g. of $(NH_4)_2B_{10}H_{10}$ and 10.5 g. of $(CH_3)_2SO$. The mixture is stirred until a clear solution is formed and anhydrous HCl is bubbled into the mixture with continued stirring. An exothermic reaction sets in and the vessel is immersed in an ice bath to maintain the temperature below 45° C. A large quantity of $NH_4Cl$ forms as a precipitate and the solution is filtered to separate the solid. The filtrate is returned to the reaction vessel and the passage of HCl is continued until the reaction is no longer exothermic. The mixture is filtered again and the filtrate is diluted with water. A sticky mass forms which is separated by decantation of the water. The mass is triturated alternately with water and with acetone to separate the portions which are soluble in each of these liquids. The acetone extract is diluted with water and the solid which precipitates is separated by filtration. The solid is purified by repeated solution in acetone and precipitation with water and, finally, crystallization from acetone-water solution. The solid so obtained, which is $B_{10}H_8 \cdot 2S(CH_3)_2$, melts at 265–266° C. It is employed as a reactant in the next step of the process.

*Analysis.*—Calc'd for $B_{10}H_8 \cdot 2S(CH_3)_2$: B, 45.0; C, 19.98; H, 8.39; S, 26.62. Found: B, 44.69; C, 19.56; H, 8.32; S, 27.19.

A reaction vessel is charged with 7.0 g. of $$B_{10}H_8 \cdot 2S(CH_3)_2$$

and 80 ml. of acetonitrile. The mixture is stirred and chlorine gas is bubbled through it at a moderate rate. The temperature of the solution rises to about 65° C. and it is maintained at this point by the heat of the reaction for about one hour. At this time the temperature begins to drop and heat is applied to maintain the reaction at reflux temperature for one hour with continued passage of chlorine gas. The solution is cooled to about 25° C. and it is poured into 500 ml. of water with stirring.

A heavy oil forms from which the supernatant liquid is separated by filtration. The solid is washed with ethanol and dried to obtain 8.0 g. of bis(dimethylsulfide)hexachlorodihydrodecaborane(8).

*Analysis.*—Calc'd for $B_{10}H_2Cl_6 \cdot 2S(CH_3)_2$: B, 24.2; C, 10.72; H, 3.14; Cl, 47.6; S, 14.3. Found: B, 24.43; C, 10.83, 10.92; H, 3.41; Cl, 45.15; S, 14.85.

The product, so obtained, is employed as a reactant in the next step of the process.

A reaction vessel is charged with 1.0 g. of $$B_{10}H_2Cl_6 \cdot 2S(CH_3)_2$$

and 8 ml. of $(C_4H_9)_3P$. The mixture is allowed to stand overnight (18–24 hours) at about 25° C. and it is then heated to 195° C. under a nitrogen atmosphere for about 20 minutes. The mixture is cooled, benzene is added and the mixture is stirred thoroughly. The insoluble portion is separated by filtration and it is dissolved in methanol. A methanol solution of $(CH_3)_4NCl$ is added with stirring to form an insoluble salt which is separated. The product is bis(tetramethylammonium) hexachlorodi(methylthio)dihydrodecaborate(2−) whose identity is confirmed by elemental analysis.

*Analysis.*—Calc'd for $[(CH_3)_4N]_2B_{10}H_2Cl_6(SCH_3)_2$: B, 19.1; S, 11.3; N, 4.96. Found: B, 18.78; S, 11.31; N, 4.26.

(B) A reaction vessel is charged with 2.0 g. of $B_{10}H_2Cl_6 \cdot 2S(CH_3)_2$ and 15 ml. of $(C_4H_9)_3P$. The mixture is heated to 135° C. under a blanket of nitrogen. The mixture becomes an oil and it is cooled to about 25° C. It is processed as described in the last paragraph of Part A. There is obtained 2.0 g. of $[(CH_3)_4N]_2B_{10}H_2Cl_6(SCH_3)_2$.

EXAMPLE 36

(A) A reaction vessel is charged with 4.0 g. of $[(CH_3)_4N]_2B_{10}H_9C(O)C_6H_5$ and 60 ml. of acetonitrile. The solution is cooled in an ice bath and chlorine gas is passed through it for about one hour. The bath is removed and passage of chlorine gas is continued for another hour at prevailing atmospheric temperature (about 25° C.). After passage of chlorine gas is stopped the solution is warmed under reduced pressure to remove the acetonitrile. A brittle glassy solid remains of which a portion is crystallized twice from aqueous ethanol to obtain 3.1 g. of bis(tetramethylammonium) monobenzoylnonachlorodecaborate(2−). The identity of the compound is confirmed by elemental analysis.

*Analysis.*—Calc'd for $[(CH_3)_4N]_2B_{10}Cl_9C(O)C_6H_5$: C, 26.4; H, 4.29; N, 4.1; B, 15.85; Cl, 46.9. Found: C, 25.13, 24.71 H, 4.47, 4.54; N, 4.33, 4.47; B, 16.08; Cl, 48.1.

(B) The reaction of Part A is repeated, employing 7.5 g. of $[(CH_3)_4N]_2B_{10}H_9C(O)C_6H_5$ and 175 ml. of $CH_3CN$. The reaction slurry is cooled and chlorine gas is passed into it at a rate to maintain the temperature at 30–35° C. A clear dark red solution forms. This solution is evaporated under reduced pressure to about one-third its original volume and the liquid is poured into ethanol. The precipitate is processed as described in Part A to obtain 12 g. of $[(CH_3)_4N]_2B_{10}Cl_9C(O)C_6H_5$. The elemental analysis is as follows: C, 25.9, 25.69; H, 4.62, 4.69; B, 15.85, 15.77; Cl, 46.9, 45.78.

(C) A column is packed with an acidic ion-exchange resin of the type described earlier and the resin is converted to the sodium salt by passing an aqueous solution of NaOH through it. The resin is washed until the effluent is neutral and the column is then flushed with aqueous ethanol (1:1). A solution of 7.3 g. of $$[(CH_3)_4N]_2B_{10}Cl_9C(O)C_6H_5$$

in about 400 ml. of water is passed through the column and the effluent is evaporated to dryness under reduced pressure. The sodium salt, $Na_2B_{10}Cl_9C(O)C_6H_5$, is obtained as a very hard, glass-like, hydroscopic solid.

An aqueous solution of the sodium salt is mixed with aqueous cesium fluoride to precipitate the cesium salt. The precipitate is separated and dried to yield 5 g. of crystalline white $Cs_2B_{10}Cl_9C(O)C_6H_5$.

EXAMPLE 37

A solution of 13.0 g. of $[(CH_3)_4N]_2B_{10}H_9C(O)C_6H_5$ in about 300 ml. of water is passed through a column packed with an acidic ion-exchange resin, as described earlier. The column is washed with water until the effluent forms no precipitate with aqueous $AgNO_3$. The effluent is evaporated under reduced pressure to a volume of about 400 ml. The solution, which contains $(H_3O)_2B_{10}H_9C(O)C_6H_5$, is cooled in an ice-bath and chlorine gas in bubbled through it at a moderate rate for 3 hours. The ice-bath is removed and passage of chlorine gas is continued for 4 hours. The temperature of the solution rises to a maximum of 40° C. and then drops slowly. Passage of chlorine is stopped and one-half (200 ml.) of the solution is used for further processing.

A solution of 20 g. of CsF in 50 ml. of water is added to the portion (200 ml.) of the reaction mixture and the solution is cooled to about 10° C. The white solid which forms is separated by filtration and it is crystallized from water to obtain $Cs_2B_{10}Cl_9C(O)C_6H_3Cl_2 \cdot H_2O$. The identity of the compound is confirmed by elemental analysis.

*Analysis.*—Calc'd for $Cs_2B_{10}H_5C_7Cl_{11}O_2$: Cs, 30.0; H, 0.56; B, 12.19; Cl, 44.0. Found: Cs, 29.2; H, 0.79; B, 12.16; Cl, 44.09.

EXAMPLE 38

(A) A reaction vessel is charged with a solution consisting of 10 ml. of water, 10 ml. of methanol and 0.5 g. of $[(CH_3)_4N]_2B_{10}H_9C(O)C_6H_5$. The solution is cooled in an ice bath and a solution of 2.5 ml. of bromine in 10 ml. of methanol is added with agitation. An exothermic reaction develops and the temperature is maintained below about 40° C. by cooling. The bromine is absorbed rapidly in the first stage of the reaction but a slight excess of bromine remains at the end of the addition. The solution is filtered and the filtrate is chilled in liquid nitrogen until a large amount of solid precipitates. The solid is separated by cold filtration and it is crystallized from boiling water to give a small quantity of gray-white crystals of bis(tetramethylammonium) nonabromomonobenzoyldecaborate(2−), $[(CH_3)_4N]_2B_{10}Br_9C(O)C_6H_5$. The identity of the compound is confirmed by elemental analysis.

*Analysis.*—Calc'd for $[(CH_3)_4N]_2B_{10}Br_9C(O)C_6H_5$: C, 16.65; H, 2.68; B, 10.0; Br, 66.6. Found: C, 16.62, 16.59; H, 3.19, 3.01; B, 10.07; Br, 68.34.

(B) A reaction vessel is charged with 50 ml. of acetonitrile and 6.0 g. of $[(CH_3)_4N]_2B_{10}H_9C(O)C_6H_5$. The mixture is stirred to dissolve as much of the decaborate salt as possible. A further quantity (100 ml.) of acetonitrile is added and the mixture is stirred again for a short period. It is filtered, the filtrate is returned to the reaction vessel and 1.4 g. of $$[(CH_3)_4N]_2B_{10}H_9C(O)C_6H_5$$

is added with 100 ml. of acetonitrile. The mixture is stirred again and 50 ml. of $CH_3OH$ is added to facilitate the solution of the last portion of the decaborate salt. The clear solution is cooled in an ice-bath and a solution of 30 ml. of bromine in acetonitrile is added in portions with vigorous stirring. After about one-half of the bromine solution is added, the ice-bath is removed and the remaining bromine solution is added slowly. Excess bromine is present in the solution after addition is completed and the solution is stirred for 2 hours at prevailing atmospheric temperature. It is then evaporated at about 100° C. under reduced pressure, and the residue is mixed with 250 ml. of water. A gum forms which is separated by filtration and crystallized from aqueous ethanol to obtain 5.4 g. of $[(CH_3)_4N]_2B_{10}Br_9C(O)C_6H_5$.

*Analysis.*—Calc'd for $[(CH_3)_4N]_2B_{10}Br_9C(O)C_6H_5$: B, 10.0; C, 16.65; H, 2.68; Br, 66.0. Found: B, 9.87; C, 16.55; H, 3.06; Br, 66.0.

A portion (4.85 g.) of the tetramethylammonium salt, obtained above, is dissolved in boiling water and the solution is passed through a column packed with an acidic ion-exchange resin of the type described in Example A, Part C. The effluent, which is clear, colorless and acidic, contains $H_2B_{10}Br_9C(O)C_6H_5$. It is titrated to the neutral point with 0.1 N NaOH. The neutral solution is evaporated under reduced pressure and dried to yield $Na_2B_{10}Br_9C(O)C_6H_5$ as a brittle solid.

EXAMPLE 39

A quantity (2.5 g.) of $[(CH_3)_4N]_2B_{10}Cl_9C(O)C_6H_5$, prepared as described in Example 36, Part A, is dissolved in boiling water and the hot solution is passed through a column packed with an acidic ion-exchange resin of the type described earlier. The acid effluent, which contains $H_2B_{10}Cl_9C(O)C_6H_5$, is evaporated under reduced pressure to a volume of about 100 ml. and it is neutralized with aqueous sodium hydroxide solution to a pH of 10. It is again evaporated to a volume of 10 ml. and the concentrated solution is added with stirring to 20 ml. of an aqueous solution containing 3 g. of sodium acetate and 2 g. of the hydrochloride of semicarbazide. The solution is heated on a steam bath for 2 hours.

A portion of the solution is mixed with aqueous $(CH_3)_4NOH$ and the solid which forms is separated to obtain the semicarbazone, as the tetramethylammonium salt, i.e., $[(CH_3)_4N]_2B_{10}Cl_9C(C_6H_5)=NNHC(O)NH_2$.

A second portion of the solution is mixed with an aqueous solution of $(CH_3)_3SI$ and the solid which forms is separated to obtain the semicarbazone as a trimethylsulfonium salt.

*Analysis.*—Calc'd for

$[(CH_3)_3S]_2B_{10}Cl_9C(C_6H_5)=NNHC(O)NH_2$

B, 14.5; C, 22.6; H, 3.5; N, 5.65; Cl, 43.0. Found: B, 15.05; C, 21.7; H, 3.37; N, 4.56; Cl, 44.66.

EXAMPLE 40

One-half of the solution obtained in the first phase of the reaction in Example 11, Part F, is acidified with aqueous hydrochloric acid and chlorine gas is passed through the solution until the exothermic reaction subsides and the temperature drops to about 25° C. The liquid, which contains a small quantity of solid, is passed through an acidic ion-exchange resin and the acid effluent is diluted to a volume of 400 ml. with water. Chlorine gas is passed through the acid solution for about 3 hours. The temperature rises to 52° C. initially and stays at about 50° C. The solution is filtered and the filtrate, which contains $H_2B_{10}Cl_9OH$, is mixed with an aqueous solution of $(CH_3)_4NCl$ to precipitate

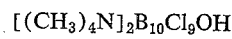

$[(CH_3)_4N]_2B_{10}Cl_9OH$

The compound is separated by filtration and it is crystallized from aqueous ethanol to obtain 4.1 g. of product in the first crop.

*Analysis.*—Calc'd for $[(CH_3)_4N]_2B_{10}Cl_9OH$: C, 16.2; H, 4.2; B, 18.3; Cl, 53.9. Found: C, 16.87, 16.75; H, 4.71, 4.72; B, 18.31, 18.44; Cl, 53.20, 53.62.

EXAMPLE 41

(A) A reaction vessel is charged with 20.5 g. of bis(N-methyl-2-pyrrolidone) octahydrodecaborane (8), prepared as described in Example 11, Part A, 100 ml. of water and 7 g. of NaOH. The mixture is refluxed for 2 hours and about one-fourth of the solution is removed for reaction as described in Part B which follows.

(B) The portion of the solution obtained in Part A is acidified with aqueous hydrochloric acid at about 25° C. and chlorine gas is passed into the solution. The temperature rises spontaneously to 96° in about 10 minutes and thereafter it drops slowly until, after about 2 hours it reaches 50° C. Heat is then applied to maintain the temperature at 50° C. and passage of chlorine gas is continued for 30 minutes. Passage of chlorine gas is stopped and water is added to the solution in sufficient quantity to dissolve any solid which forms. A concentrated solution of 10 g. of $(CH_3)_4NOH$ is added with stirring and the precipitate which forms is separated. The solid is crystallized from water to obtain 2.3 g. of bis(tetramethylammonium) octachlorodihydroxydecaborate(2−). The identity of the white crystalline compound is confirmed by elemental analysis.

*Analysis.*—Calc'd for $[(CH_3)_4N]_2B_{10}Cl_8(OH)_2$: B, 18.8; C, 16.8; H, 4.5; Cl, 49.4; N, 4.8. Found: B, 19.11, 19.38; C, 17.15, 17.18; H, 4.90, 4.94; Cl, 49.29, 49.55; N, 3.70, 3.63.

(C) The remaining portion of the solution obtained in Part A is employed to prepare a further quantity of $[(CH_3)_4N]_2B_{10}Cl_8(OH)_2$, as described in Part B. An aqueous solution of this salt is passed through a column packed with an acidic ion-exchange resin of the type described earlier. The acid effluent is evaporated until a viscous liquid remains. On standing the liquid crystallizes to yield a hydrate of the free acid $H_2B_{10}Cl_8(OH)_2$.

*Analysis.*—Calc'd for $H_2B_{10}Cl_8(OH)_2 \cdot 9H_2O$: B, 18.3; Cl, 48.1. Found: B, 18.63; Cl, 48.80.

EXAMPLE 42

(A) A solution of 0.58 g. of diammonium decahydrodecaborate (2−) in 50 ml. of water is chilled in an ice-water bath to about 0° C. To the cooled solution there is added carefully and with stirring an aqueous solution prepared at 0° C. from 0.26 g. of sodium nitrite and 0.4 g. of concentrated hydrochloric acid. The solution is stirred and allowed to warm to room temperature. Chlorine is then passed through at a moderate rate. The temperature rises spontaneously to 33° C. and the addition of chlorine is continued until the temperature falls back to about 25° C. A solution of 3 g. of cesium chloride in 4 ml. of water is then added. Filtration gives 0.2 g. of a cesium salt of a chlorinated decaborate(2−) bearing substituents which have nitrogen-oxygen bonds. The compound is a dark brown solid whose elemental analyses suggest the product is $CsHB_{10}HCl_7(NO)_2$.

*Analysis.*—Calc'd for $B_{10}Cl_7CsH_2N_2O_2$: B, 19.6; Cl, 45.1; Cs, 24.0; H, 0.36; N, 5.08. Found: B, 20.7; Cl, 44.6; Cs, 23.6; H, 0.66; N, 5.97, 5.63.

(B) The filtrate from the above separation is a dark blue liquid. Aqueous tetramethylammonium chloride solution is added to this filtrate until precipitation of a blue solid is completed. The solid, which is separated by filtration, is purified by solution in acetone and reprecipitation by the addition of ethanol to the acetone solution. The blue solid, which has a $k_{max.}$ of 1.98 at 583 mμ and of 0.69 at 440 mμ, is bis(tetramethylammonium) nonachloronitrodecaborate(2−), $[(CH_3)_4N]_2B_{10}Cl_9NO_2$. The identity of the compound is confirmed by elemental analysis.

*Analysis.*—Calc'd for $C_8H_{24}B_{10}Cl_9N_3O_2$: C, 15.5; H, 3.88; B, 17.35; Cl, 51.4; N, 6.78. Found: C, 13.66; H, 3.93; B, 17.37; Cl, 49.65; N, 5.07.

(C) Bis(tetramethylammonium) nonachloronitrodecaborate(2−) is converted to its parent acid by stirring in acetone with a strongly acid ion-exchange resin such as "Amberlite" IR–120 (acid form) followed by filtration and removal of the solvent by evaporation. The parent acid, i.e., $(H_3O)_2B_{10}Cl_9NO_2$, thus obtained is a viscous blue liquid which is converted to its cesium salt $(Cs_2B_{10}Cl_9NO_2)$ by reaction in concentrated aqueous solution with cesium chloride.

EXAMPLE 43

(A) A solution containing 0.5 g. of bis(tert.-butylammonium) decahydrodecaborate(2−),

$[(CH_3)_3CNH_3]_2B_{10}H_{10}$ in 20 ml. of water is chilled to 0° C. in ice-water. To this cooled solution, there is added carefully and with vigorous stirring a solution of 0.13 g. of sodium nitrite in 10 ml. of water containing about 0.20 ml. of concentrated hydrochloric acid. A red color forms initially but fades within a short time. Bromine (2.5 g.) is then added slowly and with stirring to the cooled solution. The reaction mixture is stirred and allowed to warm to room temperature (about 25° C.) over a period of about 35 minutes. The mixture is filtered and an aqueous solution of excess cesium fluoride is added to the filtrate. The blue-green solid which forms is separated by filtration, washed and dried in air. On drying, the color of the solid changes to yellow-brown. The compound is a salt of a decaborate(2−) anion bearing bromine substituents and groups which have nitrogen-oxygen bonds. The elemental analyses suggest that the product is $Cs_2B_{10}HBr_7(NO)_2$.

*Analysis.*—Calc'd for $Cs_2B_{10}HBr_7N_2O_2$: N, 2.82. Found: N, 2.86.

(B) The process of Part A is repeated except that a solution containing 0.26 g. of sodium nitrite and about 0.30 ml. of concentrated hydrochloric acid is used. The red color which forms on mixing the nitrous acid solution with the decaborate solution does not fade. Following the addition of bromine to the solution, the reaction mixture is stirred one hour at about 25° C. A dark green color develops in the mixture. The solution is divided into two equal portions and to one portion an excess of an aqueous solution of tetramethylammonium chloride is added. The green solid which forms is separated by filtration, washed and dried in air. The compound is a tetramethylammonium salt of a decaborate(2−) anion bearing bromine substituents and groups which have nitrogen-oxygen bonds. The elemental analyses suggest that the compound is $[(CH_3)_4N]_2B_{10}H_2Br_7NO$.

*Analysis.*—B, 12.7; Br, 66.0; N($R_4$N), 3.30; N(total), 4.96. Found: B, 13.5; Br, 68.4; N($R_4$N), 2.89; N(total), 4.91.

EXAMPLE 44

The nitration procedure of Example 13, Part A, is repeated starting with diammonium decahydrodecaborate (2−). The pH of the solution is adjusted to 7 by addition of aqueous sodium carbonate. Chlorine gas is bubbled through the solution until absorption of the gas ceases. The color of the solution, which originally is dark red, changes to purple. The solution, at the present stage, contains $(NH_4)_2B_{10}Cl_5(NO_2)_5$ and it is useful as a dyeing solution to impart a purple color to viscose rayon and acid-modified poly(acrylonitrile) fibers. The aqueous solution is also useful for dyeing to a dark red shade fibers obtained from wool or polyamides, e.g., a polyamide derived from hexamethylenediamine and adipic acid.

An excess of an aqueous solution of tetramethylammonium chloride is added to the solution of diammonium pentachloropentanitrodecaborate(2−). There is obtained a violet or deep purple solid which is separated by filtration, washed and dried. The solid, which is bis(tetramethylammonium) pentachloropentanitrodecaborate(2−), has the composition $[(CH_3)_4N]_2B_{10}Cl_5(NO_2)_5$. It is very explosive when dry. The identity of the compound is confirmed by elemental analysis.

*Analysis.*—Calc'd for $C_8H_{24}B_{10}Cl_5N_7O_{10}$: C, 14.5; B, 16.3; Cl, 26.75. Found: C, 14.84; B, 17.15; Cl, 27.24.

EXAMPLE 45

(A) A reaction vessel is charged with 0.7 g. of $[(CH_3)_4N]_2B_{10}Cl_8(OH)_2$, obtained as described in Example 41, Part B, and sufficient glacial HCOOH is added to cover the solid reactant. The mixture is heated on a steam bath for 5 minutes and then diluted to three times its volume with water. The mixture is filtered to separate the solid product which is crystallized from hot water to obtain bis(tetramethylammonium)octachlorodiformyloxydecaborate(2−).

(B) The process of Part A is repeated employing 2 g. of $[(CH_3)_4N]_2B_{10}Cl_8(OH)_2$ and 10 ml. of HCOOH (98–100%). The mixture is heated 2.25 hours on a steam bath and it is poured into 50 ml. of ethanol. The product is isolated by filtration and crystallized from hot water.

*Analysis.*—Calc'd for $[(CH_3)_4N]_2B_{10}Cl_8[OC(O)H]_2$: C, 19.0; B, 17.1; H, 4.1; Cl, 45.0; N, 4.4. Found: C, 19.5; B, 17.6; H, 4.6, 4.5; Cl, 45.9; N, 4.6, 4.6.

The processes of Examples 33–45 are broadly applicable to the preparation of compounds having two or more unlike X groups.

The preceding examples illustrate compounds of the invention which are obtained by processes employing as a principal reactant a salt or an acid of a decaborate(2−) anion. The examples which follow illustrate further the compounds of the invention which can be obtained both by the previously described processes and by other processes not described heretofore. These latter processes employ, as the boron-containing reactants, bis(carbonyl) decaboranes(8), (e.g., $B_{10}H_8 \cdot 2CO$), compounds having a diazonium group (e.g., $B_{10}H_8 \cdot 2N_2$) and modifications of these reactants (e.g., $B_{10}Cl_8 \cdot 2CO$). These classes of reactants provide routes to a wide range of compounds of the invention which are within the scope of Formula 1. The bis(carbonyl) and the diazonium reactants are new compounds and their preparation is, therefore, described in Example B.

EXAMPLE B (A) Preparation of $B_{10}H_8 \cdot 2N_2$.—A solution consisting of 20 g. of the dihydrate of $H_2B_{10}H_{10}$ in 60 ml. of water is cooled to less than 10° C. and to it there is added slowly and with stirring a cooled solution (less than 10° C.) consisting of 18 g. of $NaNO_2$ in 50 ml. of water. The reaction mixture, which now is a dark brown solution, is stirred for 30 minutes at atmospheric temperature (ca. 25° C.). Zinc dust, in excess, is added and the mixture is stirred again for 20 minutes. It is allowed to stand overnight and then filtered. An acid ion-exchange resin of the crosslinked poly(arylsulfonic acid) type is added to the filtrate as well as a small quantity of $NaNO_2$. The mixture is stirred for a short period, filtered and the filtrate is stirred with excess zinc and hydrochloric acid. A precipitate forms which is separated by filtration, extracted with ethanol and the extract is evaporated to obtain $B_{10}H_8 \cdot 2N_2$. The compound is further purified by crystallization from aqueous ethanol.

*Analysis.*—Calc'd for $B_{10}H_8 \cdot 2N_2$: B, 62.8; N, 32.6; mol. wt., 172. Found: B, 60.9; N, 32.5; mol. wt., 175, 180.

(B) Preparation of $B_{10}H_8 \cdot 2CO$.—A glass-lined, stainless steel pressure vessel (capacity, 100 ml.) is charged with 4.2 g. of $B_{10}H_8 \cdot 2N_2$ and 50 ml. of iron carbonyl. The tube is pressured with carbon monoxide, heated at 140° C. for 1.5 hours at 1000 atmospheres pressure, and cooled. It is vented and the reaction mixture is filtered. The filtrate is evaporated, the residue is dissolved in benzene and filtered. The filtrate is evaporated to yield 2.5 g. of $B_{10}H_8 \cdot 2CO$. The product is purified by sublimation at 80–120° C./0.1 mm.

*Analysis.*—Calc'd for $B_{10}H_8 \cdot 2CO$: B, 62.7; C, 14.0; H, 4.6. Found: B, 62.9; C, 14.2; H, 4.8.

(C) Preparation of $B_{10}Cl_8 \cdot 2CO$.—A solution is prepared consisting of 2 g. of $B_{10}H_8 \cdot 2CO$ in 50 ml. of water. The solution is cooled in an ice bath and chlorine is passed through the solution for 45 minutes. The solution is removed from the ice bath and passage of chlorine gas is continued for 3 hours at atmospheric temperature. The water is removed by evaporation and the residue is sublimed at 140° C. and 0.1 mm. Hg pressure. It is resublimed at 300° C. and atmospheric pressure to obtain $B_{10}Cl_8 \cdot 2CO$ as a solid, crystalline product.

EXAMPLE 46

(A) A solution is prepared consisting of 30 g. of $(NH_4)_2B_{10}H_{10}$ and 200 ml. of water. The solution is chilled to 5–10° C. and this temperature is maintained while chlorine gas is bubbled through it until the weight of the solution has increased by 70 g. Toward the end of the reaction the temperature of the solution is allowed to rise slowly to 20° C. An aqueous solution of $(CH_3)_4NCl$ is added to the reaction mixture with stirring and the precipitate which forms is separated and recrystallized from water to obtain bis(tetramethylammonium) pentachloropentahydrodecaborate(2−).

*Analysis.*—Calc'd for $[(CH_3)_4N]_2B_{10}H_5Cl_5$: B, 24.6; C, 21.9; H, 6.6; Cl, 40.5. Found: B, 23.9; C, 21.7; H, 6.5; Cl, 42.2.

(B) An aqueous solution of $[(CH_3)_4N]_2B_{10}H_5Cl_5$ is passed through a column filled with a strongly acidic ion-exchange resin. The effluent is an aqueous solution of $H_2B_{10}H_5Cl_5$. An excess of silver oxide is added to the effluent and the mixture is stirred about 18 hours at atmospheric temperature. The mixture is filtered through a layer of diatomaceous clay and the filtrate is evaporated on a steam bath until free silver begins to separate. At this point it is filtered again and the filtrate is evaporated at atmospheric temperature to obtain crystalline $$Ag_2B_{10}H_5Cl_5$$

The product, as obtained, contains a small amount of free silver and boric acid. The compound can, if desired, be recrystallized.

EXAMPLE 47

A reaction vessel is charged with 19 g. of potassium iodide, 20.4 g. of iodine and 1000 ml. of water. The mixture is stirred and sufficient methanol is added to dissolve the iodine. The reaction mixture is stirred vigorously and a solution consisting of 12.4 g. of $$(NH_4)_2B_{10}H_{10}$$

in 1000 ml. of water is added dropwise over a period of 2.5 hours. Stirring is stopped and the reaction mixture is evaporated under reduced pressure to about ¼ of its original volume. A concentrated aqueous solution of CsF is added in excess after which an aqueous solution of $(CH_3)_4NOH$ is added in sufficient quantity to adjust the pH of the solution to 7. An aqueous solution of $(CH_3)_4NCl$ is added until no further precipitate is formed. The precipitate is separated to obtain 25.1 g. of a solid product. The product is dissolved in aqueous acetonitrile and carefully crystallized to obtain 17 fractions.

Fractions 7 and 8 are recrystallized separately from hot aqueous methanol. The product which is obtained is cesium tetramethylammonium monoiodononahydrodecaborate (2−).

*Analysis.*—Calc'd for $Cs[(CH_3)_4N]B_{10}H_9I$: B, 21.0; I, 49.2. Found: B, 21.2; I, 48.2.

To the second portion, an aqueous solution of trimethylsulfonium hydroxide is added and the precipitate which forms is processed as described above to obtain bis(trimethylsulfonium) diiodooctahydrodecaborate(2−).

*Analysis.*—Calc'd for $[(CH_3)_3S]_2B_{10}H_8I_2$: B, 20.7; I, 48.4. Found: B, 22.0; I, 46.0.

EXAMPLE 48

A mixture is prepared consisting of 3.0 g. of $$(NH_4)_2B_{10}H_{10}$$

254 g. of $I_2$, 300 ml. of ethanol, and 100 ml. of water. The mixture is refluxed until all of the iodine color disappears. The mixture is cooled and an aqueous solution of $(CH_3)_4NCl$ is added. The precipitate which forms is separated and crystallized from aqueous ethanol to obtain bis(tetramethylammonium) pentaiodopentahydrodecaborate(2−).

*Analysis.*—Calc'd for $[CH_3)_4N]_2B_{10}H_5I_5$: B, 12.1; I, 70.9. Found: B, 12.1; I, 69.4.

Compounds bearing fluorine substituents are obtained, as described earlier, by employing fluorine diluted with nitrogen gas as the fluorinating agent. To illustrate, a gaseous mixture consisting of about 90% nitrogen and 10% fluorine is passed into an aqueous solution of $(NH_4)_2B_{10}H_{10}$ as described for the chlorination process in Example 46. The reaction mixture is processed as described in this example to obtain $[(CH_3)_4N]_2B_{10}H_5F_5$, $Ag_2B_{10}H_5F_5$, $Cs_2B_{10}H_2F_8$, and the like.

Fluorine-bearing compounds are also obtained by reacting decaborates bearing —OH substituents with hydrogen fluoride or other known fluorinating agents. The preparation of compounds bearing —OH groups is described in Examples 49–52 which follow. Compounds of this type are simply mixed with liquid hydrogen fluoride to obtain fluorine-substituted products. To illustrate, using hydrogen fluoride as a reactant, $Cs_2B_{10}H_9OH$ yields $Cs_2B_{10}H_9F$; $Tl_2B_{10}H_8(OH)_2$ yields $Tl_2B_{10}H_8F_2$;

$[(CH_3)_4N]_2B_{10}H_3Cl_6OH$ yields $[(CH_3)_4N]_2B_{10}H_3Cl_6F$ and $[(CH_3)_4N]_2B_{10}Cl_9OH$ yields $[(CH_3)_4N]_2B_{10}Cl_9F$.

EXAMPLE 49

A mixture of 1.54 g. of $(NH_4)_2B_{10}H_{10}$, 15 ml. of tetramethylene sulfone and 3.92 g. of anhydrous p-toluenesulfonic acid is stirred and heated in an oil bath at 85° C. for 70 minutes. Gas is evolved during this operation. The mixture is cooled, diluted with water and an excess of a mixture of $(CH_3)_4NOH$ and $(CH_3)_4NCl$ is added to it with stirring. A precipitate forms which is separated, washed and dried to obtain 2.77 g. of a compound of the formula

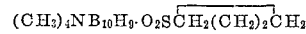

The product is recrystallized from acetonitrile-methanol to give large crystals which melt at 195–196° C. (with bubbling). The elemental analysis of the compound is as follows: B, 34.7; C, 31.1; S, 10.4; H, 9.33; N, 4.3.

The sulfone adduct, obtained above, is mixed with 50 ml. of aqueous 10% NaOH solution and the mixture is boiled for 1.5 hours. The reaction mixture is cooled and it is passed through a column filled with a commercial acid ion-exchange resin to obtain a solution of $H_2B_{10}H_9OH$ as the eluate. The eluate is neutralized with an aqueous solution of CsOH and the neutral solution is evaporated to dryness to obtain as a white crystalline solid the compound $Cs_2B_{10}H_9OH$. The product is recrystallized from aqueous ethanol and its identity is confirmed by elemental analysis.

*Analysis.*—Calc'd for $Cs_2B_{10}H_9OH$: B, 27.1; C, 0.0; H, 2.5. Found: B, 26.1; C, 0.3; H, 2.7.

EXAMPLE 50

A mixture consisting of 1.8 g. of $B_{10}H_8 \cdot 2N_2$ and 6 ml. of N-methyl-2-pyrrolidone is refluxed for two hours. The mixture is cooled and poured into water. A precipitate forms and sufficient $NH_4Cl$ is added to coagulate the precipitate. The solid, which is

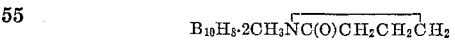

is separated, washed and mixed with an aqueous 10% NaOH solution. The mixture is heated to boiling for a short period and an aqueous solution of $TlNO_3$ is added with stirring. A precipitate forms which is separated, washed and dried to obtain $Tl_2B_{10}H_8(OH)_2$.

EXAMPLE 51

(A) A mixture consisting of 5.0 g. of $$[(CH_3)_4N]_2B_{10}H_9OH$$

and 50 ml. of $CH_3CN$ is stirred and chlorine gas is passed through it for two minutes at rate sufficient to keep the temperature at 66–70° C., employing cooling with an ice-bath if necessary. The reaction mixture is poured into an aqueous solution of $(CH_3)_4NCl$ and the precipitate which forms is separated. The product, which is principally $[(CH_3)_4N]_2B_{10}H_2Cl_7OH$, is recrystallized from aqueous ethanol. The product contains a minor amount of $[(CH_3)_4N]_2B_{10}H_3Cl_6OH$.

*Analysis.*—Calc'd for [(CH$_3$)$_4$N]$_2$B$_{10}$H$_2$Cl$_7$OH: B, 20.6; C, 18.3; H, 5.1; Cl, 47.4; N, 5.34. Found: B, 21.4, 21.0; C, 18.8, 18.9; H, 6.3, 6.3; Cl, 45.6; N, 5.6, 5.5.

(B) A mixture consisting of 5.0 g. of

[(CH$_3$)$_4$N]$_2$B$_{10}$Cl$_9$OCH$_2$CH$_2$OCH$_3$ and 30 ml. of 48% hydrobromic acid is heated to refluxing for 1.5 hours. A portion (15 ml.) of the liquid is removed by distillation and the residue is cooled. The crystalline product which forms is separated and recrystallized from 50% aqueous ethanol to obtain bis(tetramethylammonium) nonachloromonohydroxydecaborate-(2−).

*Analysis.*—Calc'd for [(CH$_3$)$_4$N]$_2$B$_{10}$Cl$_9$OH: B, 18.3; C, 16.2; H, 4.2; Cl, 53.9. Found: B, 18.3; C, 16.8, 17.0; H, 4.7, 4.6; Cl, 53.4.

The ultraviolet spectrum of the compound in solution in acetonitrile yields the following values: $\lambda_{max}$ 221 m$\mu$ ($k$=18.0); shoulder, 250 m$\mu$ ($k$=1.46).

EXAMPLE 52

(A) A reaction vessel equipped with a reflux condenser is charged with 4.519 g. of a hydrate of decahydrodecaboric acid of the formula H$_2$B$_{10}$H$_{10}$·11.2H$_2$O. The reaction vessel is cooled to −190° C., the vessel is connected to a vacuum pump and pressure in the system is reduced to a very low value. The acid, which is a liquid at this degree of hydration, is alternately frozen and thawed under low pressure to remove gaseous material. The acid is then heated at 60° C. under very low pressure (less than 0.1 mm. of mercury) for 22 hours and hydrogen gas (.0153 mole) is evolved. The residue in the vessel is dissolved in sufficient water to provide 200 ml. of solution and CsF. (.003 mole) is added in excess. The solution is heated to 100° C. and chlorine gas is passed into it for 25 minutes. At this point the color of the solution is dark purple. The solution is evaporated under reduced pressure at about 25° C. and the purple residue is recrystallized from water. The color of the product in solution disappears on heating to 60° C. The white crystalline product is dried under reduced pressure to yield the compound Cs$_2$B$_{10}$Cl$_9$OH. The identity of the product is confirmed by its infrared absorption spectrum and by elemental analysis.

*Analysis.*—Calc'd for Cs$_2$B$_{10}$Cl$_9$OH: B, 15.2; Cl, 44.9. Found: B, 14.4; Cl, 42.9.

(B) The procedure of Part A is repeated except that the acid is heated at 70° C. for 5.75 hours and 2.0 moles of hydrogen per mole of acid is released. The acid, after heating, is chlorinated as described and the product is precipitated as the cesium salt to obtain Cs$_2$B$_{10}$Cl$_8$(OH)$_2$. The product is a position isomer of the product of Example 41, described earlier. The infrared absorption spectrum of the compound is as follows (expressed as cm.$^{-1}$): 3485, medium; 1615, medium; 1300, weak; 1155, medium; 1030, medium, shoulder; 1005, medium; 96.8, strong; and 831, medium.

*Analysis.*—Calc'd for Cs$_2$B$_{10}$Cl$_8$(OH)$_2$: B, 15.6; Cl, 41.0. Found: B, 15.4; Cl, 41.6.

(C) A reaction vessel is charged with 60 g. of bis(N-methyl-2-pyrrolidone)octahydrodecaborane(8) and a solution of 30 g. of sodium hydroxide in 500 ml. of water. The mixture is refluxed for one hour. It is cooled and sufficient hydrochloric acid is added to form a neutral solution. Chlorine gas is bubbled into the solution and the solution is gradually heated to the boiling point over a period of one hour and ten minutes. Passage of chlorine is stopped and sufficient aqueous sodium hydroxide is added to form a neutral solution. The reaction mixture is now poured onto 50 g. of (CH$_3$)$_4$NOH. The mixture is cooled and the solid product which is present is separated by filtration. It is recrystallized from water containing a small amount of acetonitrile to obtain

[(CH$_3$)$_4$N]$_2$B$_{10}$HCl$_7$(OH)$_2$

The infrared absorption spectrum of the product shows a small band at 4.0$\mu$ (B–H bond).

*Analysis.*—Calc'd for [(CH$_3$)$_4$N]$_2$B$_{10}$HCl$_7$(OH)$_2$: C, 17.8; H, 5.0; N, 5.1; Cl, 46.1. Found: C, 18.2; H, 5.1; N, 5.1; Cl, 46.5.

EXAMPLE 53

A mixture of 1.0 g. of [(CH$_3$)$_4$N]$_2$B$_{10}$Cl$_8$(OH)$_2$ (see Example 41, Part B) and 25 ml. of acetic anhydride is heated to refluxing for one hour. The reaction mixture is diluted to 10 times its volume with water and sufficient aqueous 10% sodium hydroxide is added with shaking to dissolve all of the acetic anhydride. The mixture is chilled in ice and solid (CH$_3$)$_2$NCl is added. The precipitate which forms is separated, washed and dried to obtain [(CH$_3$)$_4$N]$_2$B$_{10}$Cl$_8$[OC(O)CH$_3$]$_2$. The identity of the compound is confirmed by its infrared absorption spectrum.

EXAMPLE 54

(A) A glass-lined pressure vessel is charged with 5.0 g. of B$_{10}$H$_8$·2N$_2$ and 100 g. of H$_2$S. The vessel is closed and the mixture is heated at 160° C. for 3.5 hours under autogenous pressure. It is cooled, vented and the reaction mixture is poured into water. The solution is filtered and aqueous CsCl is added to the filtrate to precipitate a white solid which is a dicesium salt of a decaborate(2−) anion bearing —SH groups.

(B) A mixture of 5.0 g. of B$_{10}$H$_8$·2N$_2$ and 150 g. of H$_2$S is heated, as described in Part A, at 150° C. for 3.5 hours under autogenous pressure. The reaction product is processed as described above, employing (CH$_3$)$_4$NCl in place of CsCl. The product which is obtained is a tetramethylammonium salt of a decaborate(2−) anion bearing —SH groups.

In the first step in the reaction of Parts A and B, the product which is obtained is the acid of a decaborate(2−) anion bearing —SH groups.

(C) A mixture of 3.1 g. of B$_{10}$Cl$_8$·2N$_2$ (prepared as described in Example 92) and 100 g. of H$_2$S is heated in a pressure vessel under autogenous pressure at 150° C. for 4 hours. The vessel is cooled, vented to remove excess H$_2$S and the crude reaction product is dissolved in water. To a portion of this solution an aqueous solution of (CH$_3$)$_4$NCl is added. The precipitate which forms is separated, washed and dried to obtain

[(CH$_3$)$_4$N]$_2$B$_{10}$Cl$_8$(SH)$_2$

To a second portion of the solution of the crude reaction product, an aqueous solution of CsCl is added and the precipitate which forms is separated, washed and dried. It is recrystallized from water to obtain Cs$_2$B$_{10}$Cl$_8$(SH)$_2$ as a monohydrate.

*Analysis.*—Calc'd for Cs$_2$B$_{10}$Cl$_8$(SH)$_2$·H$_2$O: B, 14.6; S, 8.64; Cl, 38.2. Found: B, 14.6; S, 8.69; Cl, 38.4.

The tetramethylammonium and cesium salts obtained in Part C dissolve in aqueous NaOH to form Na$_2$B$_{10}$Cl$_8$(SNa)$_2$ i.e., a compound bearing the B$_{10}$Cl$_8$·S$_2^{-4}$ anion in which two of the valences reside in the X substituents and two are present in the boron cage. Passage of the solution of the sodium salt through an acid ion-exchange resin yields an aqueous solution of H$_2$B$_{10}$Cl$_8$(SH)$_2$. This solution can be reacted with organic or inorganic bases (or their salts) to obtain a wide range of salts, e.g., aqueous cetyl pyridinium chloride will yield

[C$_5$H$_5$N(C$_{16}$H$_{33}$)]$_2$B$_{10}$Cl$_8$(SH)$_2$

KOH will yield K$_2$B$_{10}$Cl$_8$(SH)$_2$ and K$_2$B$_{10}$Cl$_8$(SK)$_2$; Ba(OH)$_2$ will yield BaB$_{10}$Cl$_8$(SH)$_2$; (CH$_3$)$_3$SOH will yield [(CH$_3$)$_3$S]$_2$B$_{10}$Cl$_8$(SH)$_2$; and (C$_4$H$_9$)$_4$PCl will yield [(C$_4$H$_9$)$_4$P]$_2$B$_{10}$Cl$_8$(SH)$_2$.

EXAMPLE 55

(A) Two solution are prepared consisting of (a) 24.0 g. (0.10 mole) of $B_{10}H_8 \cdot 2S(CH_3)_2$ in 22.0 g. of thiophenol, and (b) 11.2 g. (0.20 mole) of KOH in 100 ml. of ethanol. The solutions are mixed and the suspension which forms is refluxed for 6 hours. A clear light brown solution forms which, after cooling, is poured into a solution of 30.0 g. of CsF in 200 ml. of $C_2H_5OH$. A white gum precipitates which is solidified by cooling and stirring. The solid is separated by filtration and extracted with 100 ml. of hot water. The water extract is diluted with 100 ml. of ethanol and the solution is cooled in solid carbon dioxide. A white crystalline product separates which is isolated by filtration. It is recrystallized from a 50% aqueous ethanol solution to obtain dicesium di(methylmercapto)octahydrodecaborate(2−).

*Analysis.*—Calc'd for $Cs_2B_{10}H_8(SCH_3)_2$: C, 5.0; H, 2.9; B, 22.7. Found: C, 5.6; H, 3.4; B, 22.8.

(B) A solution consisting of 0.6972 g. of $$Cs_2B_{10}H_8(SCH_3)_2$$

in 250 ml. of water is passed through a column filled with a commercial ion-exchange resin. The column is washed until the effluent is neutral. Titration of the total effluent with 0.1 N sodium hydroxide solution shows that the acid is a strong acid with an equivalent weight (calculated as the cesium salt) of 240, compared to a theoretical value of 238. The free acid is isolated, if desired, by evaporation of the aqueous effluent under reduced pressure to dryness. The free acid has the formula $H_2B_{10}H_8(SCH_3)_2$, or, in its hydronium form, $$(H_3O)_2B_{10}H_8(SCH_3)_2$$

EXAMPLE 56

(A) A reaction vessel is charged with 0.053 mole of $CH_3SC_6H_5$ and 20 ml. of glacial acetic acid. The vessel is cooled in an ice bath and 0.053 mole of 30% hydrogen peroxide is added dropwise with stirring. The temperature is maintained at about 50° C. during this phase of the operation. After addition of hydrogen peroxide is completed, the mixture is preferably allowed to stand at least 1-2 hours at 25° C. The solution is then stirred and 4.0 g. of $(NH_4)_2B_{10}H_{10}$ is added. Hydrogen chloride is bubbled into the mixture for about 1 hour and the temperature is maintained at about 60° C. during the initial exothermic stage of the reaction. The mixture is cooled to about 25° C. and the precipitate which forms is separated, washed and dried to obtain $$B_{10}H_8 \cdot 2CH_3SC_6H_5$$

which is employed as a reactant in the next step in the process.

A solution is prepared consisting of 21.4 g. (0.19 mole) of thiophenol, 10.9 g. (0.19 mole) of KOH and 100 ml. of ethanol. To this solution 31.5 g. (0.09 mole) of $B_{10}H_8 \cdot 2CH_3SC_6H_5$ is added and the resulting suspension is refluxed for 6 hours. The reaction mixture is filtered and a solution of 60 g. (0.40 mole) of CsF in 100 ml. of ethanol is added to the filtrate. A white precipitate forms which is separated, washed and recrystallized from aqueous ethanol to obtain dicesium di(phenylmercapto)-octahydrodecaborate(2−).

*Analysis.*—Calc'd for $Cs_2B_{10}H_8(SC_6H_5)_2$: C, 24.0; H, 3.0; S, 10.7. Found: C, 24.4; H, 3.8; S, 10.3.

(B) A solution is prepared consisting of 5.0 g. of $Cs_2B_{10}H_8(SC_6H_5)_2$ in 200 ml. of hot water. The hot solution is passed through a column filled with a commercial acid ion-exchange resin and the column is washed with water until the effluent is neutral. The combined washings and effluent are evaporated at 25–30° C. under reduced pressure to obtain the free acid $H_2B_{10}H_8(SC_6H_5)_2$, as a light yellow oil.

EXAMPLE 57

(A) A solution of 154 g. of $(NH_4)_2B_{10}H_{10}$ and 226 g. of $H_2NOSO_3H$ in 1500 ml. of water is neutralized by adding, at 15–20° C., a solution of 80 g. of sodium hydroxide in 500 ml. of water. The solution is heated at 95° C. for 4 hours and then is cooled to 4° C. A white crystalline compound separates which is $$H_2B_{10}H_8(NH_2)_2$$

It is isolated by filtration and two additional crops are obtained successively by concentration of the solution, cooling and isolating the product as described above. The second concentration is carried to the point where Glauber's salt precipitates and the finely divided boron-containing product is decanted from the large crystals of Glauber's salt. The various crops of crystals are combined to obtain 24 g. of product which is recrystallized from water. The compound can be written as $$H_2B_{10}H_8(NH_2)_2$$

or, in view of the close association of the acidic protons with the —NH₂ groups, as $B_{10}H_8(NH_3)_2$ or $B_{10}H_8 \cdot 2NH_3$. These formulas represent the same compound.

*Analysis.*—Calc'd for $H_2B_{10}H_8(NH_2)_2$: B, 72.0; H, 9.4; N, 18.7. Found: B, 72.0; H, 8.5; N, 18.3.

(B) To the mother liquor remaining from the final crystallizations of Part A, there is added with stirring a solution of 200 g. of $(CH_3)_4NCl$ in 200 g. of water. A precipitate forms which is separated, washed and dried to obtain 68 g. of $[(CH_3)_4N]HB_{10}H_9NH_2$, i.e., the tetramethylammonium acid salt, which can also be written as $(CH_3)_4NB_{10}H_9NH_3$, to show the close association of the acidic proton with the —NH₂ group. The compound is purified by recrystallization from water.

*Analysis.*—Calc'd for $[(CH_3)_4N]HB_{10}H_9NH_2$: B, 51.9; N, 13.4. Found: B, 52.3; N, 13.3.

Treatment of the mother liquor with an aqueous solution of $(CH_3)_4NOH$ in place of $(CH_3)_4NCl$ will precipitate the neutral salt $[(CH_3)_4N]_2B_{10}H_9NH_2$.

EXAMPLE 58

(A) A mixture consisting of 1.0 g. of $B_{10}H_8 \cdot 2N_2$ and 15 ml. of liquid ammonia is heated in a sealed platinum tube at 1000 lb. pressure and 200° C. for 15 minutes. The tube is cooled and the contents are poured into a receiving vessel. The liquid ammonia is allowed to evaporate at atmospheric temperature, leaving 0.8 g. of impure $H_2B_{10}H_8(NH_2)_2$ as a solid residue. The compound is purified by recrystallization from water. Data obtained from boron resonance studies show that the compound obtained by this method is predominantly apically substituted. This compound and the product of Example 57, Part A, are position isomers.

*Analysis.*—Calc'd for $H_2B_{10}H_8(NH_2)_2$: B, 72.0; N, 18.7. Found: B, 71.4; N, 18.6, 18.3.

(B) A mixture is prepared consisting of $B_{10}H_8 \cdot 2CO$, 3 g. of $H_2NOSO_3H$ and 2 g. of NaOH. The mixture is stirred and a gas evolves. A solid crystallizes from the mixture and it is separated by filtration. The product is $H_2B_{10}H_8(NH_2)_2$ and it is purified as described earlier to obtain 1.3 g. of pure compound. Its identity is confirmed by its infrared absorption spectrum.

(C) A solution is prepared consisting of 0.523 g. of $B_{10}H_8 \cdot 2CO$ and 5 ml. of water. To this solution is added with stirring a solution of 1.5 g. of $H_2NOSO_3H$ in 10 ml. of water. Carbon dioxide (0.00568 mole) is evolved. A solid precipitates which is separated to obtain 0.32 g. of $H_2B_{10}H_8(NH_2)_2$.

(D) A mixture consisting of 0.2 g. of $$[(CH_3)_4N]_2B_{10}H_8(NCO)_2$$

prepared as described in Example 88, and 20 ml. of aqueous 5% NaOH is refluxed for 15 minutes. A clear solution forms which is passed while hot through a column filled with a commercial acid ion-exchange resin.

The effluent is evaporated to dryness and the residue is recrystallized from water to obtain pure $H_2B_{10}H_8(NH_2)_2$.

(E) A solution of 1 g. of $[(CH_3)_4N]_2B_{10}H_8(NCO)_2$ in hot water is passed through a column filled with a commercial acidic ion-exchange resin. Bubbling occurs in the column and a gas ($CO_2$) is released. The effluent is evaporated to dryness and the solid product is recrystallized from water to obtain pure $H_2B_{10}H_8(NH_2)_2$.

(F) A mixture is prepared consisting of 0.2 g. of $H_2B_{10}H_8(NH_2)_2$ and 25 ml. of 10% aqueous sodium hydroxide. The mixture is heated until the solid product dissolves and the solution is then cooled. The solution contains $Na_2B_{10}H_8(NH_2)_2$ at this point. It is filtered and aqueous $TlNO_3$ solution is added to the filtrate in excess. A light yellow solid precipitates which is separated, washed five times with water and dried in air. The product is dithallium diaminooctahydrodecaborate(2−). Its identity is confirmed by elemental analysis.

*Analysis.*—Calc'd for $Tl_2B_{10}H_8(NH_2)_2$: B, 19.4; N, 5.0. Found: B, 19.5; N, 5.1, 4.8.

The amine group (—$NH_2$) bonded to boron in the decaborate cage can be alkylated to obtain substituted amino groups bonded to boron, as illustrated in Example 58–A which follows:

EXAMPLE 58–A

A mixture of 1.04 g. of $(CH_3)_4NHB_{10}H_9NH_2$ (obtained as described in Example 57, Part B) and 50 ml. of water is heated to refluxing temperature. At this point 4 ml. of aqueous 10% NaOH is added and 0.5 ml. of $(CH_3)_2SO_4$. The mixture is refluxed for 15 minutes and addition of aqueous 10% NaOH and $(CH_3)_2SO_4$ is repeated four times at 15-minute intervals. Finally 20 ml. of aqueous 10% NaOH is added and the mixture is refluxed for 1 hour. The mixture is cooled and the solvent is removed by evaporation. The residue is mixed with an aqueous solution of $(CH_3)_4NCl$ and the white precipitate which forms is separated. The product is washed and dried to obtain 0.4 g. of $(CH_3)_4NHB_{10}H_9N(CH_3)_2$. The product is recrystallized from water.

*Analysis.*—Calc'd for $C_6H_{28}N_2B_{10}$: C, 30.5; H, 11.9; N, 11.9; B, 45.8. Found: C, 29.6; H, 11.7; N, 11.6; B, 46.1.

The X-ray powder pattern of the above compound is substantially identical with the pattern obtained on the compound of Example 14, Part A.

Amine groups bonded to boron in the decaborate cage react with aldehydes and ketones under basic conditions to yield the corresponding imino compounds, i.e., a compound of Formula 1 in which X is —N=CHR or —N=CR$_2$ where the R groups can form a ring with the carbon. To illustrate, $H_2B_{10}H_8(NH_2)_2$ reacts with cyclohexanone in a methanolic solution of NaOH to yield

or its sodium salt

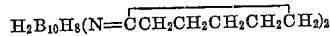

with benzaldehyde to yield $H_2B_{10}H_8(N=CHC_6H_5)_2$, with isobutyraldehyde to yield $H_2B_{10}H_8[N=CHCH(CH_3)_2]_2$, and the like.

EXAMPLE 59

(A) A solution consisting of 1 g. of $B_{10}H_8 \cdot 2CO$ in 25 ml. of diethyl ether is added slowly and with stirring to a solution of 0.7 g. of $LiAlH_4$ in 30 ml. of ether. After addition is complete, the mixture is refluxed for about 2 hours and then allowed to cool. Ether saturated with water is added slowly (and then water) to destroy unreacted $LiAlH_4$ and 10 ml. more of water is added. The ether layer is separated by decantation, the water layer is filtered and the filtrate is acidified with hydrochloric acid. An aqueous solution of CsF is added and dicesium dimethyloctahydrodecaborate(2−) precipitates. The product is separated by filtration, washed and dried. The identity of the compound, which has the formula $Cs_2B_{10}H_8(CH_3)_2$, is confirmed by its infrared absorption spectrum.

(B) The procedure of Part A is repeated, employing 3 g. of $B_{10}H_8 \cdot 2CO$ in 50 ml. of ether and 2 g. of $LiAlH_4$ in 50 ml. of ether and 1.8 g. of $Cs_2B_{10}H_8(CH_3)_2$ is obtained.

*Analysis.*—Calc'd for $Cs_2B_{10}H_8(CH_3)_2$: B, 26.3; C, 5.8; H, 3.4. Found: B, 25.8; C, 5.8; H, 3.4.

EXAMPLE 60

(A) A solution of $B_{10}H_8 \cdot 2CO$ in 50 ml. of glyme is added slowly and with stirring under an atmosphere of nitrogen to a mixture of 1.5 g. of $LiBH_4$ in 25 ml. of glyme. About 100 ml. of glyme is added during the operation as needed to maintain a solution which can be stirred. A large quantity of precipitate forms in the operation and, after addition is completed, the mixture is stirred for 30 minutes. It is then heated to 60–70° C. for 40 minutes, cooled and filtered. The solid product is dissolved in water and an aqueous solution of CsCl is added with stirring to precipitate $Cs_2B_{10}H_8(CH_2OH)_2$. The compound is separated, recrystallized from water and dried at atmospheric temperature under reduced pressure.

(B) A mixture consisting of 1.0 g. of $LiBH_4$ and 25 ml. of 1,2-dimethoxyethane is stirred under an atmosphere of nitrogen and to it there is added dropwise a mixture consisting of 2.6 g. of $B_{10}Cl_8 \cdot 2CO$ (prepared as described in Example 68) and 50 ml. of 1,2-dimethoxyethane. After addition is completed, the mixture is refluxed for 30 minutes to form a viscous oil and a clear supernatant layer of glyme solution. The supernatant layer is decanted and the residual oil layer is dissolved in about 50 ml. of water. An aqueous solution of CsCl is now added with stirring and the precipitate which forms is separated to obtain a white solid which contains $Cs_2B_{10}Cl_8(CH_2OH)_2$. The filtrate is passed through a column filled with an acidic ion-exchange resin and the effluent, which is a solution of the acid $$H_2B_{10}Cl_8(CH_2OH)_2$$

is mixed with $(CH_3)_4NCl$ to precipitate $$[(CH_3)_4N]_2B_{10}Cl_8(CH_2OH)_2$$

The compound is separated by filtration and recrystallized from water. It is dried in air at atmospheric temperature.

*Analysis.*—Calc'd for $[(CH_3)_4N]_2B_{10}Cl_8(CH_2OH)_2$: B, 18.0; C, 19.9; H, 5.0; N, 4.6. Found: B, 17.6; C, 19.9; H, 4,6; N, 4.7.

EXAMPLE 60–A

A mixture consisting of 1.0 g. of $$[(CH_3)_4N]_2B_{10}Cl_8(OH)_2$$

and 25 ml. of acetic anhydride is refluxed for 1 hour to form a clear orange-brown solution. An aliquot portion of the solution is removed and diluted to ten times its volume with water. Aqueous 10% NaOH solution is then added with shaking until all of the acetic anhydride is dissolved. The solution is chilled and solid $(CH_3)_4NCl$ is added. The precipitate which forms is separated, washed and dried to obtain $[(CH_3)_4N]_2B_{10}Cl_8[OC(O)CH_3]_2$. The compound is recrystallized from water.

*Analysis.*—Calc'd for $$[(CH_3)_4N]_2B_{10}Cl_8[OC(O)CH_3]_2$$

C, 24.5; H, 4.99. Found: C, 24.8; H, 5.12.

EXAMPLE 61

(A) A solution consisting of 0.6 g. of $B_{10}H_8 \cdot 2CO$ in 5 ml. of water is mixed with an aqueous solution of 2 g. of CsCl in 5 ml. of water. The precipitate which forms is separated and recrystallized from hot water to obtain 1.1 g. of $Cs_2B_{10}H_8(COOH)_2$. The ultraviolet absorption spectrum of the compound in water gives the following data: $\lambda_{max}$. 257 mμ ($\epsilon$=7700); 223 mμ ($\epsilon$=20,600).

*Analysis.*—Calc'd for $Cs_2B_{10}H_8(COOH)_2$: Cs, 56.4; B, 22.9; C, 5.1; H, 2.1. Found: Cs, 56.3; B, 22.7; C, 5.1; H, 2.4.

(B) To a small quantity of water, 0.3 g. of $B_{10}H_8 \cdot 2CO$ is added to form a solution of $H_2B_{10}H_8(COOH)_2$. An aqueous solution of thallium nitrate is added to this acid solution with stirring to precipitate a white crystalline solid which is $Tl_2B_{10}H_8(COOH)_2$. The salt is separated and recrystallized from water to obtain 0.7 g. of product whose identity is confirmed by elemental analysis.

*Analysis.*—Calc'd for $Tl_2B_{10}H_8(COOH)_2$: Tl, 66.5; B, 17.6; C, 3.9; H, 1.6. Found: Tl, 63.5; B, 17.3; C, 4.1; H, 2.0.

A solution is prepared consisting of 0.3 g. of $B_{10}H_8 \cdot 2CO$ in 10 ml. of water. To this solution, 3 ml. of 10% aqueous NaOH solution is added with stirring and then an aqueous solution of thallium nitrate is added. The white precipitate which forms is separated, washed well with water and dried under reduced pressure. The compound is the tetrathallium salt of $H_2B_{10}H_8(COOH)_2$.

*Analysis.*—Calc'd for $Tl_2B_{10}H_8(COOTl)_2$: Tl, 79.9; B, 10.6; C, 2.3; H, 0.8. Found: Tl, 78.4; B, 11.1; C, 2.7; H, 1.0.

(C) A solution of $B_{10}H_8 \cdot 2CO$ is prepared in water and aqueous $NH_4OH$ is added in excess. The resulting solution is evaporated to dryness to obtain, as a white crystalline solid, $(NH_4)_2B_{10}H_8(COOH)_2$. The identity of the compound is confirmed by its infrared absorption spectrum.

(D) The process of Part C is repeated employing pyridine in place of aqueous $NH_4OH$. The product which is isolated is $(C_5H_5NH)_2B_{10}H_8(COOH)_2$. It is a white crystalline solid whose identity is confirmed by its infrared absorption spectrum.

EXAMPLE 62

Ethanol is distilled in a nitrogen atmosphere from a solution of sodium ethoxide in ethanol. To 50 ml. of this ethanol, 0.5 g. of metallic sodium is added carefully until the sodium dissolves. Freshly sublimed $B_{10}H_8 \cdot 2CO$ (1.0 g.) is added and the reaction mixture is allowed to stand overnight. A solution of 3 g. of anhydrous $(CHC_3)_4NCl$ in 40 ml. of ethanol is added to the reaction mixture with stirring and $$[(CH_3)_4N]_2B_{10}H_8[C(O)OC_2H_5]_2$$

precipitates. The solid is separated, washed and recrystallized twice from aqueous ethanol.

*Analysis.*—Calc'd for $$[(CH_3)_4N]_2B_{10}H_8[C(O)OC_2H_5]_2$$

B, 26.4; C, 40.9; H, 10.3; N, 6.9. Found: B, 26.0; C, 38.7, 38.8; H, 10.2, 10.3; N, 6.7, 6.8.

EXAMPLE 63

(A) Excess liquid ammonia is added to 1.0 g. of $B_{10}H_8 \cdot 2CO$. The solution which forms is allowed to stand at atmospheric temperature until the liquid ammonia has evaporated. The solid residue, which is $$(NH_4)_2B_{10}H_8[C(O)NH_2]_2$$

is dissolved in water, the solution is filtered and aqueous CcF solution is added to the filtrate. The precipitate which forms is separated to obtain $Cs_2B_{10}H_8[C(O)NH_2]_2$. The compound is readily soluble in water and it is purified by recrystallization from a concentrated aqueous solution.

*Analysis.*—Calc'd for $Cs_2B_{10}H_8[C(O)NH_2]_2$: Cs, 56.5; B, 23.0; C, 5.1; H, 2.6; N, 6.0. Found: Cs, 57.6; B, 20.1; C, 4.8, 4.7; H, 2.8, 3.0; N 5.2 5.1.

(B) A mixture consisting of 0.5 g. of $B_{10}H_8 \cdot 2CO$ and 4 ml. of n-butylamine is warmed on a steam bath until the solid dissolves. The solution is mixed with 5 ml. of water, excess aqueous KOH solution is added and the aqueous solution is extracted with ethyl ether to remove unreacted butylamine. The aqueous layer at this stage is a solution of $K_2B_{10}H_8[C(O)NHC_4H_9]_2$. An aqueous solution of CcF is added with stirring and the solution is chilled until a crystalline salt precipitates. The salt, which is $Cs_2B_{10}H_8[C(O)NHC_4H_9]_2$, is separated and recrystallized from a minimum quantity of water to obtain 1.0 g. of pure compound.

*Analysis.*—Calc'd for $Cs_2B_{10}H_8[C(O)NHC_4H_9]_2$: B, 18.6; C, 20.6; H, 4.8; N, 4.8. Found: B, 18.5; C, 21.1; H, 4.9; N, 5.0.

(C) A mixture consisting of 0.5 g. of $B_{10}H_8 \cdot 2CO$ and 10 ml. of piperidine is heated on a steam bath until the solid dissolves. The solution is cooled and a crystalline product separates. The crystals are removed by filtration, washed with water and dried under reduced pressure at 57° C. for 8 hours to obtain 0.8 g. of dipiperidinium di-(N-pentamethylenecarbamyl)octahydrodecaborate(2−).

*Analysis.*—Calc'd for $$(C_5H_{10}NH_2)_2B_{10}H_8[C(O)NC_5H_{10}]_2$$

B, 21.1; C, 51.5; H, 10.2; N, 10.9. Found: B, 21.0; C, 52.0, 52.0; H, 10.2, 10.3; N, 11.2.

EXAMPLE 64

(A) A solution consisting of 0.7 g. of $B_{10}H_8 \cdot 2CO$ in 15 ml. of water is cooled in an ice bath and chlorine gas is passed through it for 15 minutes. The cooling bath is removed and passage of chlorine gas is continued. Very small portions are removed at intervals, mixed with an aqueous solution of $(CH_3)_4NCl$ and the salt which forms is examined in the infrared absorption spectrum for the presence of B–H bonds. When absorption due to B–H bonds has disappeared, passage of chlorine gas is stopped and the solution is divided into two portions.

One portion of the above solution is evaporated to leave a crystalline solid which is recrystallized from water and dried at atmospheric temperature under reduced pressure for 24 hours. The compound is a hydrate of $$H_2B_{10}Cl_8(COOH)_2$$

which can be written as $(H_3O)_2B_{10}Cl_8(COOH)_2 \cdot 3H_2O$. A small quantity of the acid is again crystallized from water and dried 2 hours at 25° C. under reduced pressure to obtain a higher hydrate of the acid which can be represented as $(H_3O)_2B_{10}Cl_8(COOH)_2 \cdot 5H_2O$.

*Analysis.*—Calc'd for $(H_3O)_2B_{10}Cl_8(COOH)_2 \cdot 3H_2O$: B, 18.8; C, 4.2; H, 2.4. Found: B, 18.6; C, 4.6; H, 3.0.

*Analysis.*—Calc'd for $(H_3O)_2B_{10}Cl_8(COOH)_2 \cdot 5H_2O$: B, 17.7; Cl, 46.6; neut. eq., 305. Found: B, 18.4; Cl, 46.9; neut, eq., 303.

(B) Careful titration of the hydrates of the above acid shows the presence of two strongly acidic protons and two weakly acidic protons. The products obtained by this titration are $Na_2B_{10}Cl_8(COOH)_2$ and $$Na_2B_{10}Cl_8(COONa)_2$$

The solution can also be titrated with CsOH to obtain $Cs_2B_{10}Cl_8(COOH)_2$ and $Cs_2B_{10}Cl_8(COOCs)_2$.

(C) To the second portion of the chlorinated solution of Part A, an aqueous solution of $(CH_3)_4NCl$ is added with stirring. The solid which forms is separated, recrystallized from water and dried to obtain bis(tetramethylammonium) dicarboxyoctachlorodecaborate(2−).

*Analysis.*—Calc'd for $[(CH_3)_4N]_2B_{10}Cl_8(COOH)_2$: B, 17.1; C, 19.0; H, 4.1; Cl, 45.1. Found: B, 16.9; C, 19.3; H, 4.5; Cl, 43.8.

EXAMPLE 65

(A) A solution is prepared consisting of 3.0 g. of $B_{10}H_8 \cdot 2CO$ in 100 ml. of water. Bromine is added to the solution with stirring at atmospheric temperature until the color of bromine persists in the solution, i.e., bromine is no longer absorbed in the reaction. The solution is then evaporated under reduced pressure to dryness and the tan solid which remains is a hydrate of $H_2B_{10}Br_8[C(O)OH]_2$, or, in its hydronium form, $(H_3O)_2B_{10}Br_8[C(O)OH]_2$. The tan solid is dissolved in 100 ml. of water and a solution of 10 g. of $(CH_3)_4NCl$ in 100 ml. of water is added with stirring. The precipitate which forms is separated. It is heated with 200 ml. of water and filtered to remove 5.7 g. of undissolved product. The hot filtrate on cooling yields 6.0 g. of a white crystalline product which is $[(CH_3)_4N]_2B_{10}Br_8[C(O)OH]_2$. The infrared spectra of the insoluble fraction and the soluble fraction are substantially the same.

*Analysis.*—Calc'd for $[(CH_3)_4N]_2B_{10}Br_8[C(O)OH]_2$: B, 11.0; C, 12.2; H, 2.6; Br, 64.9. Found: B, 11.0, 11.1; C, 11.6, 11.7; H, 2.6, 2.9; Br, 63.2, 63.4.

The ultraviolet absorption spectrum for the above compound is as follows: $\lambda_{max.}$, 263 m$\mu$ ($\epsilon$=2030) and 239 m$\mu$ ($\epsilon$=8900).

(B) A small quantity of $B_{10}H_8 \cdot 2CO$ is dissolved in water and liquid bromine is added in excess. The solution is warmed to expel excess bromine and aqueous $(CH_3)_4NCl$ is added directly to the reaction mixture to precipitate $[(CH_3)_4N]_2B_{10}Br_8[C(O)OH]_2$. The identity of the product is confirmed by its infrared absorption spectrum. It is relatively insoluble in water.

(C) The compound of Part B is dissolved in aqueous NaOH solution to form a solution of the tetrasodium salt, i.e., $Na_2B_{10}Br_8[C(O)ONa]_2$. An aqueous solution of $TlNO_3$ is added with stirring to precipitate the tetrathallium salt which is separated, washed and dried. The identity of the compound, which has the formula $Tl_2B_{10}Br_8[C(O)OTl]_2$ is confirmed by its infrared absorption spectrum.

EXAMPLE 66

A mixture consisting of 13 g. of iodine, 1.0 g. of $B_{10}H_8 \cdot 2CO$ and 100 ml. of water is prepared and refluxed for 3 hours. The mixture is cooled and shaken with zinc dust to remove unreacted iodine. The mixture is filtered and an aqueous solution of $(CH_3)_4NCl$ is added to the filtrate. The precipitate which forms is separated and recrystallized from water to obtain bis(tetramethylammonium) dicarboxypentaiodotrihydrodecaborate(2−).

*Analysis.*—Calc'd for $[(CH_3)_4N]_2B_{10}H_3I_5(COOH)_2$: B, 11.0; C, 12.3; H, 3.0; I, 64.5. Found: B, 10.7; C, 12.1; H, 3.0; I, 63.0.

EXAMPLE 67

A mixture is prepared consisting of $Cs_2B_{10}Cl_8(COOH)_2$ and excess thionyl chloride. The mixture is refluxed for 3 hours and the excess thionyl chloride is then removed by distillation. The residue is dried under reduced pressure and it is shown by examination of the infrared absorption spectrum to consist of $Cs_2B_{10}Cl_8[C(O)Cl]_2$, $Cs_2B_{10}Cl_8[C(O)OH][C(O)Cl]$ and unreacted $Cs_2B_{10}Cl_8[C(O)OH]_2$.

Complete conversion of the di(carboxy)substituted compound to the di(chlorocarbonyl)substituted product, $Cs_2B_{10}Cl_8[C(O)Cl]_2$ can be obtained by further refluxing of the above product with thionyl chloride.

EXAMPLE 68

A hydrate of the acid $H_2B_{10}Cl_8(COOH)_2$, obtained as described in Example 64, Part A, and conveniently referred to as $(H_3O)_2B_{10}Cl_8(COOH)_2$ with 3–5 moles of water of hydration, is heated under reduced pressure (less than 1 mm. of mercury) at 140–160° C. for 2 hours. The residue is sublimed through glass wool in a gun-type unit at 180–190° C. at less than 1 mm. mercury pressure and it is resublimed without use of glass wool. The compound, $B_{10}Cl_8 \cdot 2CO$, is obtained as yellow crystals. The product is hygroscopic and should be handled under anhydrous conditions. Elemental analysis of the product is as follows: B, 24.2; C, 6.2; H, 0.9; Cl, 63.3.

Sufficient liquid ammonia is added to the product obtained above to form a solution which is then evaporated to dryness. The solid residue is dissolved in aqueous 10% NaOH solution to obtain $Na_2B_{10}Cl_8[C(O)NH_2]_2$ in solution. An aqueous solution of CsOH is added to solution and the solid which precipitates is separated and recrystallized from water to obtain $Cs_2B_{10}Cl_8[C(O)NH_2]_2$ whose identity is confirmed by elemental analyses.

*Analysis.*—Calc'd for $Cs_2B_{10}Cl_8[C(O)NH_2]_2$: B, 14.5; Cl, 38.1; N, 3.8. Found: B, 14.5; Cl, 37.9; N, 3.7.

EXAMPLE 69

(A) A glass-lined pressure vessel is charged with 5.0 g. of $B_{10}H_8 \cdot 2N_2$ and 50 ml. of cyclohexane. The vessel is flushed with carbon monoxide and sufficient carbon monoxide is charged into the vessel to provide 1000 atmospheres pressure at 140° C. The reaction mixture is heated under this pressure at 140° C. for 1.5 hours. The vessel is cooled, vented and the liquid product is filtered. The filtrate is evaporated under reduced pressure to obtain a thick oil as the residue. Petroleum ether is added to the oil and crystals form which are removed by filtration. The filtrate is evaporated again under reduced pressure to obtain an oily residue which is extracted twice with hot water. The insoluble portion, designated as "A," is set aside for further work. The aqueous extracts are combined and evaporated on a steam bath to a volume where needle-shaped crystals form. The crystals, which are $B_{10}H_7C_6H_{11} \cdot 2CO$, are separated and dissolved in a small amount of water. Aqueous CsCl solution is added with stirring to precipitate $Cs_2B_{10}H_7C_6H_{11}[C(O)OH]_2$ The compound is purified by the conventional methods described earlier.

*Analysis.*—Calc'd for $Cs_2B_{10}H_7C_6H_{11}[C(O)OH]_2$: Cs, 48.0; B, 19.5; C, 17.3; H, 3.6. Found: Cs, 47.0; B, 18.9; C, 17.0 H, 3.8.

(B) The water-insoluble portion, designated as "A" in Part A is dissolved in aqueous 10% NaOH solution to obtain in solution $Na_2B_{10}H_6[C_6H_{11}]_2[C(O)ONa]_2$. An aqueous solution of $TlNO_3$ is added with stirring. The precipitate is separated, washed and dried to obtain the tetrathallium salt of the formula shown below.

*Analysis.*—Calc'd for $Tl_2B_{10}H_6[C_6H_{11}]_2[C(O)OTl]_2$: Tl, 69.0 B, 9.1; C, 14.2; H, 2.4. Found: Tl, 66.4; B, 9.9; C, 13.3, 13.0; H, 2.5, 2.2.

EXAMPLE 70

Sufficient cyclohexane is added to a small portion of $B_{10}H_7C_6H_{11} \cdot 2CO$ to form a solution. To this solution there is added with stirring a solution of cyclohexylamine in cyclohexane until no more precipitate is formed. The solid, which is $(C_6H_{11}NH_3)_2B_{10}H_7C_6H_{11}[C(O)NHC_6H_{11}]_2$ is separated, washed and dried. The product is dissolved in aqueous 10% NaOH solution to form a solution of $Na_2B_{10}H_7C_6H_{11}[C(O)NHC_6H_{11}]_2$. Aqueous CsF solution is now added to precipitate $Cs_2B_{10}H_7C_6H_{11}[C(O)NHC_6H_{11}]_2$ The salt is separated, washed and dried. Its identity is confirmed by its infrared absorption spectrum.

EXAMPLE 71

A pressure reaction vessel is charged with 2.0 g. of $B_{10}H_8 \cdot 2N_2$, 20 ml. of benzene and carbon monoxide gas. The vessel is closed and heated for 15 minutes at 200° C. and 255 atmospheres pressure. The vessel is cooled, opened and the reaction mixture is filtered. The filtrate is diluted with petroleum ether and a cream-colored solid precipitates. The solid is separated and dissolved in ethyl alcohol. An aqueous solution of CsOH is added with stirring to precipitate $Cs_2B_{10}H_6(C_6H_5)_2(COOH)_2$. The product is separated and recrystallized. Its identity, as dicesium dicarboxydiphenylhexahydrodecaborate(2−), is confirmed by elemental analysis.

*Analysis.*—Calc'd for $Cs_2B_{10}H_6(C_6H_5)_2(COOH)_2$: Cs, 42.5; B, 17.3; C, 26.9; H, 2.9. Found: Cs, 38.6; B, 16.2; C, 27.9 H, 4.2.

EXAMPLE 72

A pressure vessel is charged with 3.0 g. of $B_{10}H_8 \cdot 2N_2$, 50 ml. of decahydronaphthalene and carbon monoxide as described in Example 69. The mixture is heated with agitation at 175° C. for 20 minutes at 1000 atmospheres pressure. The vessel is cooled and vented. The reaction mixture in the vessel is a cloudy, pale yellow liquid. It is filtered and the filtrate is evaporated to leave a viscous oil. The oil is warmed at 40° C. and 0.02 mm. pressure to remove volatile material and to obtain, as an oily residue, the compound $B_{10}H_7C_{10}H_{17}(CO)_2$ ($C_{10}H_{17}$=decahydronaphthyl). The oil is mixed with methanol and a reaction ensues to obtain, in solution, a solvate of the acid, $H_2B_{10}H_7C_{10}H_{17}[C(O)OCH_3]_2$, i.e., dihydrogen bis(methoxycarbonyl)decahydronaphthylheptahydrodecaborate(2−). The methanol solution is diluted with water and the solution is divided into three portions. The first portion is mixed with an aqueous solution of $TlNO_3$, the second portion with aqueous CsCl and the third portion with aqueous $(CH_3)_4NCl$. The precipitates which form are separated, washed and dried in air to obtain $Tl_2B_{10}H_7C_{10}H_{17}[C(O)OCH_3]_2$, $Cs_2B_{10}H_7C_{10}H_{17}[C(O)OCH_3]_2$ and $[(CH_3)_4N]_2B_{10}H_7C_{10}H_{17}[C(O)OCH_3]_2$ The identity of the salts is confirmed by their infrared absorption spectra.

EXAMPLE 73

(A) A small portion of $Cs_2B_{10}H_8[C(O)NH_2]_2$, prepared as described in Example 63, Part A, is placed on a glass plate which is then heated on a hot plate at 300–450° C. Heating is continued until the infrared absorption spectrum of aliquot portions of the solid shows complete conversion of the amide groups to nitrile groups. The compound obtained is $Cs_2B_{10}H_8(CN)_2$.

(B) A reaction vessel is charged with 10.5 g. of $Cs_2B_{10}H_8[C(O)NH]_2$ and the vessel is connected to a vacuum pump. Pressure is reduced to a low value and the vessel is heated for 2 hours at 190–210° C. and then for 1⅔ hours at 300–310° C. Dehydration of the compound occurs at the later temperature and $Cs_2B_{10}H_8(CN)_2$ is obtained as a residue. The compound is recrystallized from water.

*Analysis.*—Calc'd for $Cs_2B_{10}H_8(CN)_2$: B, 24.9; C, 5.5; H, 1.8; N, 6.5. Found: B, 24.8; C, 6.2; H, 2.6; N, 6.4, 6.8.

EXAMPLE 74

(A) A mixture consisting of 1 g. of $B_{10}H_8 \cdot 2CO$, 6 g. of $(C_6H_5)_2Hg$ and 50 ml. of xylene is heated for 2 hours at about 80° C. A yellow solid forms which is separated, washed and dried. The infrared absorption spectrum shows that the solid is a salt of the anion $B_{10}H_8[C(O)C_6H_5]_2^{-2}$. A portion of the yellow solid is dissolved in aqueous sodium hydroxide solution to obtain in solution $Na_2B_{10}H_8[C(O)C_6H_5]_2$ An aqueous solution of $(C_3H_7)_4NOH$ is added to precipitate $[(C_3H_7)_4N]_2B_{10}H_8[C(O)C_6H_5]_2$.

(B) A portion (3.0 g.) of the yellow solid obtained initially in Part A is mixed with 75 ml. of ethanol and 120 g. of liquid bromine. The mixture is refluxed and small portions are removed at intervals which are mixed with $(CH_3)_4NOH$ to precipitate the tetramethylammonium salt. Refluxing of the mixture is continued until the test samples of tetramethylammonium salts show no B–H bonds in the infrared absorption spectra. Refluxing of the reaction mixture is stopped and it is evaporated to a volume of about 50 ml. The concentrated solution is poured into about 200 ml. of water and the solution is filtered to remove a small quantity of brown oil. Aqueous $(CH_3)_4NCl$ solution is added to the filtrate in excess and a pale yellow solid precipitates. The solid is contaminated with mercury (sodium sulfide test). It is combined with the filtrate and the entire mixture is passed through a column filled with a commercial acid ion-exchange resin. The effluent is mixed with $(CH_3)_4NOH$ to form a salt which precipitates. The salt is fractionally crystallized with water to yield two fractions. The second fraction is shown by elemental analysis to be $[CH_3)_4N]_2B_{10}Br_8[C(O)C_6H_5]_2$

*Analysis.*—Calc'd for $[CH_3)_4N]_2B_{10}Br_8[C(O)C_6H_5]_2$

B, 9.8; C, 23.9; H, 3.07; Br, 57.8; N, 2.5. Found: B, 9.4; C, 23.2, 23.0 H, 3.2, 3.4; Br, 58.5; N, 2.9.

(C) The process of Part B is repeated except chlorine is bubbled into the reaction mixture in place of the bromine reactant. The product which is separated and purified by crystallization is $[(CH_3)_4N]_2B_{10}Cl_8[C(O)C_6C_5]_2$ Its identity is confirmed by the infrared absorption spectrum.

The process of Example 74, Part A, is generic for the preparation of compounds of the invention in which X is a carbacyl group, i.e., RC(O)—. The acyl groups can be open or closed chain, e.g., R can be alkyl, cycloalkyl, aryl, and the like. In this process, $B_{10}H_8 \cdot 2CO$ is reacted with an organometallic compound, e.g., an organomercurial, in which the metal (mercury) is bonded to the group R which is desired in the acyl group. The operation of the process is simple and requires only the mixing of the reactants in an inert solvent (e.g., a hydrocarbon) with moderate warming to expedite the reaction. To illustrate, by using the appropriate organomercurial in the process of Example 74, one can obtain $Na_2B_{10}H_8[C(O)C_3H_7]_2$, $Na_2B_{10}H_8[C(O)C_6H_{13}]_2$, $Na_2B_{10}H_8[C(O)C_6H_4CH_3]_2$, and the like. The sodium salts are easily converted by metathetic reactions to any salt desired.

EXAMPLE 75

(A) A reaction vessel is flushed with nitrogen and charged with 2.36 g. of $B_{10}Cl_8 \cdot 2CO$ and 25 ml. of N,N-dimethylaniline. The mixture is stirred under a nitrogen atmosphere, the temperature rises to 34° C. and the solution becomes pale yellow in color. Acetonitrile (25 ml.) is added and the mixture is refluxed at 80° C. for 45 minutes. It is cooled to atmospheric temperature and the orange-brown solid which forms during the operation is separated by filtration. The product is $[C_6H_5NH(CH_3)_2]_2B_{10}Cl_8[C(O)C_6H_4N(CH_3)_2]_2$ It is mixed with aqueous 10% NaOH solution and the mixture is heated to boiling for a short time to convert the amine salt to $Na_2B_{10}Cl_8[C(O)C_6H_4H(CH_3)_2]_2$. The sodium salt is present as a solid product which is separated by filtration and recrystallization from water to obtain the pure product as a trihydrate.

*Analysis.*—Calc'd for $Na_2B_{10}Cl_8[C(O)C_6H_4N(CH_3)_2]_2 \cdot 3H_2O$:

Na, 5.8; B, 13.7; Cl, 36.0; C, 27.4; H, 3.32; N, 3.55. Found: Na, 5.6; B, 13.8; Cl, 37.3; C, 27.5, 27.5; H, 3.70, 3.54; N, 3.63.

(B) A portion of the sodium salt obtained in Part A is dissolved in a small quantity of water and an aqueous solution of $(CH_3)_4NCl$ is added with stirring until no more precipitate forms. The product, $[(CH_3)_4N]_2B_{10}Cl_8[C(O)C_6H_4N(CH_3)_2]_2$, is purified by recrystallization from 50% aqueous ethanol.

*Analysis.*—Calc'd for

[(CH$_3$)$_4$N]$_2$B$_{10}$Cl$_8$[C(O)C$_6$H$_4$N(CH$_3$)$_2$]$_2$:

B, 12.9; C, 37.3; H, 5.30; N, 6.70

Found: B, 13.0; C, 37.2; H, 5.98; N, 6.71.

(C) A portion of the sodium salt obtained in Part A is dissolved in water and the solution is acidified with hydrochloric acid. A yellow solid precipitates and it is separated to obtain H$_2$B$_{10}$Cl$_8$[C(O)C$_6$H$_4$N(CH$_3$)$_2$]$_2$.

(D) A mixture consisting of 31.1 g. of B$_{10}$Cl$_8$·2CO and 25 ml. of CH$_3$CN is prepared under a nitrogen atmosphere and 25 ml. of C$_6$H$_5$N(CH$_3$)$_2$ is added with stirring. The temperature rises rapidly to 50° C. and the mixture is refluxed one hour. It is cooled and filtered to separate 6.5 g. of

[C$_6$H$_5$NH(CH$_3$)$_2$]$_2$B$_{10}$Cl$_8$[C(O)C$_6$H$_4$N(CH$_3$)$_2$]$_2$

The compound is washed with petroleum ether and dried in air. It is now mixed with 15 ml. of aqueous 10% NaOH and 50 ml. of water. The mixture is stirred and sufficient water is added to dissolve the sodium salt thus formed. The solution is extracted three times with ethyl ether to remove free C$_6$H$_5$N(CH$_3$)$_2$. The aqueous layer is acidified and a bright yellow solid forms which is separated. It is washed thoroughly with water and dried in air about 18 hours and then under reduced pressure to obtain 49.0 g. of the acid of Part C.

*Analysis.*—Calc'd for H$_2$B$_{10}$Cl$_8$[C(O)C$_6$H$_4$N(CH$_3$)$_2$]$_2$: B, 15.7; C, 31.3; H, 3.21; N, 4.06. Found: B, 15.0; C, 31.1; H, 4.05; N, 4.08.

EXAMPLE 76

A solution consisting of 2.0 g. (0.013 mole) of (NH$_4$)$_2$B$_{10}$H$_{10}$ in 10 ml. of water is passed through a column filled with a commercial ion-exchange resin of the crosslinked polystyrenesulfonic acid class. The effluent, which is a solution of a hydrate of H$_2$B$_{10}$H$_{10}$, or, in its hydronium form, (H$_3$O)$_2$B$_{10}$H$_{10}$, is evaporated under reduced pressure at less than 25° C. to yield an oily residue. The residue is dissolved in 20 ml. of 1,2-dimethoxyethane (glyme) and the resulting solution is cooled in an ice bath. The solution is stirred and to it there is added dropwise a solution of 2.4 g. (0.026 mole) of epichlorohydrin in 10 ml. of glyme. After addition is completed, the glyme is removed by evaporation of the reaction mixture, which is a solution of H$_2$B$_{10}$H$_8$(OCH$_2$CH$_2$CH$_2$Cl)(OCH$_2$CH$_2$OCH$_3$), under reduced pressure. The residue is dissolved in ethanol and a solution of 3.9 g. of CsF in 10 ml. of glyme is added with stirring. The light yellow precipitate which forms is separated by filtration, washed and dried to obtain a substituted B$_{10}$ compound bearing one —OCH$_2$CH$_2$CH$_2$Cl group and one —OCH$_2$CH$_2$OCH$_3$ group. The identity of the compound is confirmed by elemental analysis.

*Analysis.*—Calc'd for Cs$_2$B$_{10}$H$_8$(OCH$_2$CH$_2$CH$_2$Cl)(OCH$_2$CH$_2$OCH$_3$): C, 13.8; H, 4.06; B, 20.9; Cl, 6.8. Found: C, 13.1; H, 4.03; B, 22.0; Cl, 4.0.

EXAMPLE 77

A reaction vessel, cooled in an ice bath is charged with a solution of a hydrate of H$_2$B$_{10}$H$_{10}$ in glyme, prepared as described in Example 76. The reaction mixture is stirred and 3.1 g. of styrene oxide is added dropwise at a rate to maintain a reaction temperature of 35–40° C. After addition is completed, the solvent is removed from the reaction mixture, which is a solution of

H$_2$B$_{10}$H$_8$(OCH$_2$CH$_2$C$_6$H$_5$)$_2$ under reduced pressure to obtain, as a residue, a dark brown gum. The gum is dissolved in 20 ml. of ethanol and an ethanol solution of 3.9 g. of CsF is added. The light gray precipitate which forms is separated and recrystallized from an ethanol-water mixture to obtain a substituted B$_{10}$ compound bearing two beta-phenylethoxy groups. The identity of the compound is confirmed by elemental analysis and by its infrared spectrum.

*Analysis.*—Calc'd for Cs$_2$B$_{10}$H$_8$(OCH$_2$CH$_2$C$_6$H$_5$)$_2$: C, 30.9; H, 4.17; B, 17.3. Found: C, 29.3; H, 4.36; B, 18.1.

EXAMPLE 78

Employing the procedure of Example 76,

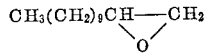

is reacted at 55° C. with an acetonitrile solution of a hydrate of H$_2$B$_{10}$H$_{10}$ to obtain, in solution, an acid of the formula

H$_2$B$_{10}$H$_8$[OCH$_2$(CH$_2$)$_{11}$CH$_3$]$_2$ which, on reaction with CsF, yields the dicesium salt, i.e., Cs$_2$B$_{10}$H$_8$[OCH$_2$(CH$_2$)$_{11}$CH$_3$]$_2$.

EXAMPLE 79

A solution of a hydrate of H$_2$B$_{10}$H$_{10}$ in 60 ml. of glyme is prepared as described in Example 76. To this solution 30.4 g. (0.20 mole) of dipentene monoxide is added with stirring and cooling to maintain the temperature at less than 0° C. Glyme is removed from the reaction mixture under reduced pressure and the residue is dissolved in 60 ml. of ethanol to obtain a solution of the acid, H$_2$B$_{10}$H$_8$(OC$_{10}$H$_{17}$)$_2$. A solution of 30.4 g. of CsF in 60 ml. of ethanol is added to precipitate the dicesium salt which is isolated as described in previous examples. The product has the formula

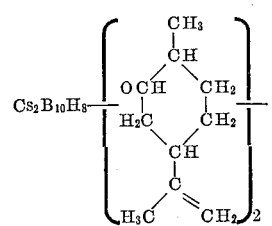

As a further illustration, employing the procedure of Example 76,

is reacted with an aqueous solution of a hydrate of H$_2$B$_{10}$H$_{10}$ to obtain a solution of

This solution is subjected to hydrolyzing conditions to remove the —C(O)C(CH$_3$)$_3$ groups and to obtain a solution of H$_2$B$_{10}$H$_8$(OCH$_2$CH$_2$CH$_2$OH)$_2$. This solution is reacted with an aqueous solution of CsF to obtain the dicesium salt of the above acid. The identity of the compound is confirmed by elemental analysis and by its infrared absorption spectrum.

*Analysis.*—Calc'd for Cs$_2$B$_{10}$H$_8$(OCH$_2$CH$_2$CH$_2$OH)$_2$: C, 7.87; H, 3.5; B, 23.5. Found: C, 7.70; H, 3.3; B, 18.5.

EXAMPLE 80

A solution of a hydrate of H$_2$B$_{10}$H$_{10}$ in 60 ml. of glyme is prepared as described in Example 76. To this solution 17.6 g. (0.20 mole) of 1,2-epoxy-3-methoxypropane is added dropwise and with stirring. The solvent is removed under reduced pressure. The residue is processed as described in Example 79, to obtain Cs$_2$B$_{10}$H$_8$(OCH$_2$CH$_2$CH$_2$OCH$_3$)$_2$

EXAMPLE 81

A solution of a hydrate of H$_2$B$_{10}$H$_{10}$ in 60 ml. of glyme is prepared as described in Example 76. To this solution 30 g. (0.20 mole) of 1,2-epoxy-3-phenoxypropane is added dropwise with stirring and cooling to maintain the temperature at less than 30° C. The reaction mixture is freed of solvent under reduced pressure and the residue is dissolved in 60 ml. of ethanol. The solution at this point contains the acid.

$$H_2B_{10}H_8(OCH_2CH_2CH_2OC_6H_5)_2$$

The solution is mixed with a solution of 30 g. of CsF in 60 ml. of ethanol and the dicesium salt which precipitates is separated and purified by recrystallization from aqueous ethanol. The product is a compound of the formula $Cs_2B_{10}H_8(OCH_2CH_2CH_2OC_6H_5)_2$.

EXAMPLE 82

A solution of a hydrate of $H_2B_{10}H_{10}$ in 60 ml. of glyme is prepared as described in Example 76. To this solution 33.6 g. (0.20 mole) of 1,2-epoxy-3-(4-chlorophenoxy) propane is added dropwise with stirring. After addition is completed, the glyme is removed from the reaction mixture by evaporation under reduced pressure and the residue which contains the acid, $$H_2B_{10}H_8(OCH_2CH_2CH_2OC_6H_4Cl)_2$$

is processed as described in Example 79 to obtain $$Cs_2B_{10}H_8(OCH_2CH_2CH_2OC_6H_4Cl)_2$$

EXAMPLE 83

A solution of the hydrate of $H_2B_{10}H_{10}$ in 60 ml. of glyme is prepared as described in Example 76. To this solution 22.8 g. (0.20 mole) of 3,4-epoxy-4-methyl-2-pentanone is added dropwise. The reaction mixture is evaporated under reduced pressure to remove the solvent and the residue is processed as described in Example 79 to obtain in pure form a compound of the following formula:

The reaction mixture obtained in the first step in the process contains the acid

EXAMPLE 84

Using the procedure of Example 76, β-methylglycidol is reacted with a hydrate of $H_2B_{10}H_{10}$ at a temperature of about 30° C. to obtain a solution of $H_2B_{10}H_8(OC_3H_7)_2$. The solution is reacted with an aqueous solution of CsF to obtain a product of the formula $Cs_2B_{10}H_6(OC_3H_7)_2$. The substituents, —$OC_3H_7$, is present both as the n-propoxy and iso-propoxy forms. The cesium salt, when hydrolyzed, yields both n-propyl alcohol and isopropyl alcohol.

As a further illustration of the process of Example 76, a solution of a hydrate of $H_2B_{10}H_{10}$ is reacted with an oxirane of the formula

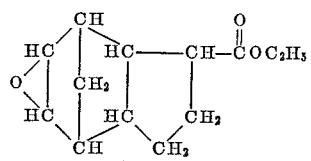

to obtain in aqueous solution the acid

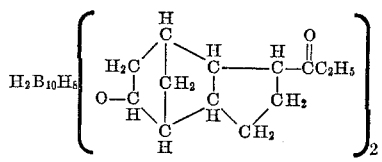

The aqueous solution is neutralized with a solution of cesium fluoride to precipitate the dicesium salt, i.e.,

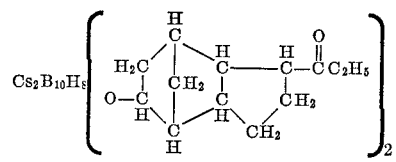

EXAMPLE 85

A solution of a hydrate of $H_2B_{10}H_{10}$ in 60 ml. of glyme, prepared as described in Example 76, is reacted with 38.4 g. of methyl methylphenylglycidate. The solvent is removed under reduced pressure and the residue which contains $$H_2B_{10}H_8[OCH(CO_2CH_3)CH(CH_3)C_6H_5]_2$$

is processed as described in Example 79 to obtain $$Cs_2B_{10}H_8[OCH(CO_2CH_3)CH(CH_3)C_6H_5]_2$$

EXAMPLE 86

A solution of 15.4 g. (0.10 mole) of $(NH_4)_2B_{10}H_{10}$ in 40 ml. of water is passed through a column filled with an acid ion-exchange resin as described earlier. The effluent is evaporated under reduced pressure to a volume of about 20 ml. and the liquid, which is a concentrated solution of $H_2B_{10}H_{10}$, is dissolved in 60 ml. of glyme. To this solution, 26.8 g. of 3,4-epoxy-2,5-dihydrothiophene-1,1-dioxide is added dropwise and with stirring. The solvent is removed under reduced pressure and the residue is dissolved in 60 ml. of ethanol to obtain a solution of

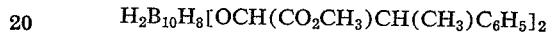

The solution is processed as described in Example 79 to obtain

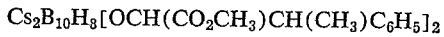

in pure form.

EXAMPLE 87

A solution of a hydrate of $H_2B_{10}H_{10}$ in 60 ml. of glyme is prepared as described in Example 76. To this solution, 24.6 g. (0.20 mole) of 3,4-epoxycyclohexanecarbonitrile is added dropwise. The temperature of the reaction mixture is maintained at less than 30° C. The reaction mixture at this point is a solution of

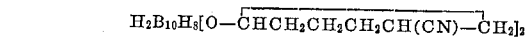

in glyme. The solution is processed as described in Example 79 to obtain a compound of the formula

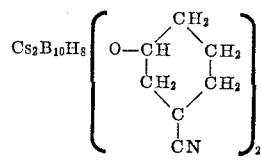

EXAMPLE 88

(A) A solution consisting of 1.0 g. of $B_{10}H_8 \cdot 2CO$ in 20 ml. of acetonitrile is added dropwise and with stirring to a slurry of 0.9 g. of sodium azide in 10 ml. of acetonitrile. The temperature rises to 50° C. and 230 ml. of nitrogen gas is evolved over a 1-hour period. The reaction mixture is filtered into an aqueous solution of $(CH_3)_4NCl$ and the solid which precipitates is separated. It is crystallized from water to obtain 0.7 g. of $$[(CH_3)_4N]_2B_{10}H_8(NCO)_2$$

The identity of the compound is confirmed by its infrared absorption spectrum and by elemental analyses.

Analysis.—Calc'd for [(CH$_3$)$_4$N]$_2$B$_{10}$H$_8$(NCO)$_2$: B, 31.0; C, 34.5; H, 9.2; N, 16.1. Found: B, 31.0; C, 34.1; H, 9.2; N, 16.2.

The ultraviolet spectrum of the compound in acetonitrile shows the following: $\lambda_{max}$ 217 m$\mu$ ($\epsilon$=22,800).

(B) The compound obtained in Part A is dissolved in water and the aqueous solution is passed through a column filled with a commercial sodium ion-exchange resin. The effluent is evaporated to dryness to obtain, as a white crystalline product, a hydrate of Na$_2$B$_{10}$H$_8$(NCO)$_2$. The identity of the compound is confirmed by its infrared absorption spectrum.

(C) A solution, consisting of 4.0 g. of

[(CH$_3$)$_4$N]$_2$B$_{10}$H$_8$(NCO)$_2$ in 125 ml. of CH$_3$CN, is cooled to 5° C. and chlorine gas is passed through for 4.5 hours, maintaining the temperature at 5–10° C. The solution, which is dark blue, is allowed to stand about 18 hours at atmospheric temperature and the blue color fades to yellow. The solvent is removed by evaporation to obtain a viscous liquid as the residue. The liquid is stirred with ethyl alcohol and a solid separates. The solid, which is

[(CH$_3$)$_4$N]$_2$B$_{10}$Cl$_8$(NCO)$_2$ is removed and dried to obtain 5.6 g. of product.

Analysis.—Calc'd for [(CH$_3$)$_4$N]$_2$B$_{10}$Cl$_8$(NCO)$_2$: B, 17.3; C, 19.2; H, 3.8; Cl, 45.4; N, 9.0. Found: B, 16.6; C, 19.5, 19.7; H, 3.9, 4.2; Cl, 46.0; N, 9.0.

(D) Sufficient CH$_3$CN is added to a small quantity of [(CH$_3$)$_4$N]$_2$B$_{10}$H$_8$(NCO)$_2$ to form a solution. Chlorine gas is bubbled through the solution until the precipitated solid formed by adding water to an aliquot portion of the reaction mixtures shows no B–H absorption band in the infrared absorption spectrum. The reaction mixture is then diluted with water and the precipitate which forms is collected, washed and dried to obtain

[(CH$_3$)$_4$N]$_2$B$_{10}$Cl$_8$(NCO)$_2$ (E) A quantity of (H$_3$O)$_2$B$_{10}$Cl$_8$(COOH)$_2$ is dried at 112° C. and a pressure of 0.1 mm. of mercury over P$_2$O$_5$ for 5 hours. The compound which is obtained is essentially B$_{10}$Cl$_8$·2CO. A quantity (2.7 g.) of this product is disolved in 30 ml. of CH$_3$CN and the solution is added to a slurry of sodium azide (1.5 g.) in 20 ml. of CH$_3$CN. The slurry is stirred and 300 ml. of gas is evolved over a period of 30 minutes. The solution is filtered and the filtrate is evaporated until a viscous oil remains. A portion of the oil is diluted with water and (CH$_3$)$_4$NCl is added to the solution. The precipitate which forms is separated, washed and dried to obtain

[(CH$_3$)$_4$N]$_2$B$_{10}$Cl$_8$(NCO)$_2$

A second portion of the oil is diluted with water and mixed with an aqueous solution of CsF to obtain Cs$_2$B$_{10}$Cl$_8$(NCO)$_2$ which is isolated and purified as described for the tetramethylammonium salt.

A third portion of the oil is diluted with water and reacted with (CH$_3$)$_3$SI to obtain

[(CH$_3$)$_3$S]$_2$B$_{10}$Cl$_8$(NCO)$_2$ which is purified as described for the two preceding salts.

The identities of the three salts are confirmed by their infrared absorption spectra.

EXAMPLE 89

(A) A slurry, consisting of 100 ml. of CH$_3$CN and 2 g. of [(CH$_3$)$_4$N]$_2$B$_{10}$H$_8$(NCO)$_2$ is cooled in an ice bath and chlorine gas is bubbled into the slurry for 16 minutes. At the end of this period the ice bath is removed and the temperature of the slurry rises to 60° C. The color of the solution becomes dark blue. Passage of chlorine gas is continued intermittently until no temperature rise occurs in the reaction mixture with further passage of chlorine. The reaction mixture is allowed to stand about 18 hours at atmospheric temperature and the color changes to light orange. Chlorine gas is passed into the solution again for 10 minutes. The acetonitrile solvent is now removed by blowing air over the reaction mixture. The residue is mixed with three times its volume of water and an oil separates. The oil is collected and it solidifies when washed with water. The solid which is

[(CH$_3$)$_4$N]$_2$B$_{10}$Cl$_8$(NCO)$_2$ is mixed with 100 ml. of aqueous 5% NaOH solution and the mixture is refluxed for a short time. The mixture is cooled and passed through a column filled with a commercial acid ion-exchange resin to obtain, as the eluate, an aqueous solution of H$_2$B$_{10}$Cl$_8$(NH$_2$)$_2$ which is evaporated to dryness to yield as a residue the solid product which can be viewed either as H$_2$B$_{10}$Cl$_8$(NH$_2$)$_2$ or as B$_{10}$Cl$_8$(NH$_3$)$_2$ in which the two acidic hydrogens are associated closely with the —NH$_2$ groups.

(B) The process of Part A is repeated employing 10 g. of [(CH$_3$)$_4$N]$_2$B$_{10}$H$_8$(NCO)$_2$ and 250 ml. of CH$_3$CN. The compound of Part A is obtained and its identity is confirmed by elemental analysis.

Analysis.—Calc'd for H$_2$B$_{10}$Cl$_8$(NH$_2$)$_2$: B, 25.4; Cl, 66.6; N, 6.6. Found: B, 25.0; Cl, 63.5; N, 6.2, 6.4.

(C) A mixture of 30 ml. of aqueous 10% NaOH solution and 1.1 g. of [(CH$_3$)$_3$S]$_2$B$_{10}$Cl$_8$(NCO)$_2$, prepared as described in Example 88, Part E, is refluxed for one hour and then filtered. The filtrate is passed through a column filled with an acidic ion-exchange resin and the eluate is evaporated to dryness to obtain H$_2$B$_{10}$Cl$_8$(NH$_2$)$_2$ as a solid residue.

(D) A mixture of 3.6 g. of [(CH$_3$)$_4$N]$_2$B$_{10}$Cl$_8$(NCO)$_2$, 50 ml. of water, 50 ml. of C$_2$H$_5$OH and 5 g. of NaOH is refluxed for 2 hours. The mixture is cooled and processed as described in Part A to obtain H$_2$B$_{10}$Cl$_8$(NH$_2$)$_2$. The solid acid is mixed with an aqueous solution of (CH$_3$)$_4$NOH, the precipitate which forms is separated and recrystallized twice from water to obtain

[(CH$_3$)$_4$N]$_2$B$_{10}$Cl$_8$(NH$_2$)$_2$

The identity of the compound is confirmed by elemental analysis.

Analysis.—Calc'd for [(CH$_3$)$_4$N]$_2$B$_{10}$Cl$_8$(NH$_2$)$_2$: B, 18.9; N, 9.8. Found: B, 20.2; N, 8.6.

(E) A solution is prepared consisting of 50 g. of H$_2$B$_{10}$Cl$_8$(NH$_2$)$_2$ in 150 ml. of aqueous 10% sodium hydroxide. To this solution, an aqueous solution of 50 g. (CH$_3$)$_4$NOH·4H$_2$O is added with stirring and a copious precipitate forms. The precipitate, which is

[(CH$_3$)$_4$N]$_2$B$_{10}$Cl$_8$(NH$_2$)$_2$ is separated, recrystallized from water and dried under reduced pressure.

Analysis.—Calc'd for [(CH$_3$)$_4$N]$_2$B$_{10}$Cl$_8$(NH$_2$)$_2$: B, 18.9; H, 4.93; Cl, 49.6; N, 9.79. Found: B, 18.8; H, 4.97; Cl, 49.6; N, 8.85.

(F) The acid (H$_3$O)$_2$B$_{10}$Cl$_8$(COOH)$_2$, obtained by chlorination of 5 g. of B$_{10}$H$_8$·2CO, as described in Example 64, Part A, is dissolved in 80 ml. of water and 13 g. of hydroxylamine-O-sulfonic acid is added. The mixture is warmed and gas begins to evolve at 70° C. After 40 minutes, gas evolution ceases and (CH$_3$)$_4$NCl is added to the solution. The solid which forms is a mixture of [(CH$_3$)$_4$N]$_2$B$_{10}$Cl$_8$(NH$_2$)$_2$ and

[(CH$_3$)$_4$N]$_2$B$_{10}$Cl$_8$(COOH)$_2$

The solid is extracted with two 20-ml. portions of aqueous 10% NaOH solution and two 20-ml. portions of water. The extracts, which contain the soluble Na$_2$B$_{10}$Cl$_8$(COONa)$_2$ are acidified with hydrogen chloride gas and the $(CH_3)_4NCl$ which is also present results in the separation of 8.0 g. of $[(CH_3)_4N]_2B_{10}Cl_8(COOH)_2$.

The NaOH insoluble product from the above extraction is dissolved in hot water to form a solution of $[(CH_3)_4N]_2B_{10}Cl_8(NH_2)_2$ which is passed through a column filled with an acidic ion-exchange resin. The eluate is evaporated to yield 4.0 g. of $H_2B_{10}Cl_8(NH_2)_2$.

(G) A mixture consisting of 3.4 g. of hydrated $H_2B_{10}Br_8(COOH)_2$, 4.0 g. of $H_2NOSO_3H$, and 30 ml. of water is stirred and heated to refluxing temperature for 30 minutes. During this time 170 ml. of gas is evolved. The mixture is cooled and sufficient $(CH_3)_4NOH$ is added with stirring to make the solution basic. A white precipitate forms which is separated and recrystallized from water to obtain a white crystalline product which is $[(CH_3)_4N]_2B_{10}Br_8(NH_2)_2$.

Sufficient water is added to the above tetramethylammonium salt to form a solution and the solution is passed through a column packed with an acidic ion-exchange resin. The effluent is evaporated to dryness to obtain $H_2B_{10}Br_8(NH_2)_2$ as a white crystalline product.

*Analysis.*—Calc'd for $H_2B_{10}Br_8(NH_2)_2$: B, 13.8; N, 3.6. Found: B, 13.2; N, 3.6.

EXAMPLE 90

(A) A reaction vessel is charged with 2.1 g. of $[(CH_3)_4N]_2B_{10}Cl_8(NCO)_2$ and 50 ml. of ethanol. Anhydrous HCl is bubbled into the mixture, the solid dissolves in the ethanol and the temperature of the solution rises to 78° C. Bubbling of HCl is continued until the temperature drops to 50° C. The ethanol is evaporated under reduced pressure and a viscous oil remains. A small quantity of water is added, the mixture is stirred and the oil solidifies. The product is dissolved in hot water, cooled and filtered. The filtrate is made basic with $(CH_3)_4NOH$ and $(CH_3)_4NCl$ is added. The precipitate which forms is separated to obtain $[(CH_3)_4N]_2B_{10}Cl_8[NHC(O)OC_2H_5]_2$ i.e., bis(tetramethylammonium) di(carbethoxycarbonylamino)octachlorodecaborate(2−).

*Analysis.*—Calc'd for above compound: B, 15.1; C, 23.4; H, 5.0; Cl, 39.7; N, 7.8. Found: B, 15.2; C, 23.5, 23.2; H, 5.1, 5.2; Cl, 40.4; N, 7.8, 7.3.

(B) A mixture is prepared consisting of 2.6 g. of $[(CH_3)_4N]_2B_{10}H_8(NCO)_2$ and 50 ml. of ethanol. The mixture is stirred and hydrogen chloride is bubbled through it as described in Part A. The clear solution is evaporated to a volume of about 7 ml., ethanol (25 ml.) is added, and the solution is made basic with $(CH_3)_4NOH$. Excess propyl alcohol is now added with stirring and a solid precipitates. The solid is separated, extracted three times with boiling ethanol and it is then recrystallized from water to obtain 1.1 g. of $(CH_3)_4NHB_{10}H_8(NH_2)[NHC(O)OC_2H_5]$ which can also be viewed as $(CH_3)_4NB_{10}H_8(NH_3)[NHC(O)OC_2H_5]$ i.e., a structure in which the acidic proton is closely associated with the —$NH_2$ group.

*Analysis.*—Calc'd for the above compound: B, 36.3; C, 28.5; H, 9.9; N, 14.2. Found: B, 36.0; C, 28.5, 28.3; H, 10.0; N, 14.0, 13.8.

The above compounds illustrate products of the invention bearing hydrocarbyloxycarbonylamino substituents, i.e., compounds of Formula 1 in which one or more X groups are —NHC(O)OR.

EXAMPLE 91

A reaction vessel is charged with 2 g. of $H_2B_{10}Cl_8(NH_2)_2$ and 30 ml. of water. The mixture is stirred to form a solution and a solution of 4 g. of $NaNO_2$ in 100 ml. of water is added. Stirring is continued and 5 ml. of concentrated hydrochloric acid is added slowly. Considerable foaming develops and a white precipitate forms. The mixture is stirred 15 minutes and the solid product is separated by filtration. The product is extracted with alcohol and the alcohol-insoluble portion is crystallized from a mixture of ethanol and ethyl acetate to obtain 0.5 g. of $B_{10}Cl_8 \cdot 2N_2$. The above process is repeated to obtain a sufficient quantity of product for use as a reactant in the next step.

A mixture consisting of 2 g. of $B_{10}Cl_8 \cdot 2N_2$, 60 ml. of $CH_3CN$ and 1 g. of sodium azide is stirred at atmospheric temperature until evolution of gas ceases. The mixture is then refluxed for one hour, cooled and filtered. The filtrate is evaporated under a stream of air until a viscous gum remains. The gum is dissolved in 50 ml. of water and 1 g. of sodium azide is added. The mixture is refluxed and small portions are removed at intervals and mixed with $(CH_3)_4NCl$ to precipitate a tetramethylammonium salt. Refluxing is continued until the test tetramethylammonium salt shows no absorption in the infrared spectrum for $(N_2)$ groups, i.e., no absorption at 4.45μ. The reaction mixture is then mixed with an excess of aqueous CsCl solution to precipitate $Cs_2B_{10}Cl_8(N_3)_2$, i.e., dicesium bis(azido)octachlorodecaborate (2−). The precipitate is separated, recrystallized from water and dried under reduced pressure. The infrared spectrum of the compound shows strong absorption bands at 4.7μ (the azido group).

*Analysis.*—Calc'd for $Cs_2B_{10}Cl_8(N_3)_2$: B, 14.6; Cl, 38.2; N, 11.3. Found: B, 14.6; Cl, 38.7; N, 11.4.

EXAMPLE 92

A pressure vessel (capacity, 80 ml.) lined with stainless steel, is charged with 5 g. of $B_{10}H_8 \cdot 2N_2$ and 3 ml. of $PCl_3$. The reaction mixture is heated slowly under autogenous pressure to 135° C. and maitained at this temperature for 1 hour. The temperature is then gradually raised to 160° C. The vessel and reaction mixture are cooled to 25° C., the vessel is vented to release gaseous by-products and the residue, which is principally an orange-colored liquid, is removed. The liquid is evaporated to dryness and the solid residue is dissolved in water. Liquid bromine is added to the solution until the color of bromine persists in the mixture. The reaction mixture is evaporated to a volume of 20 ml. and sufficient $NH_4OH$ is added to obtain a solution whose pH is 10. A saturated aqueous solution of $(CH_3)_4NCl$ is added and the precipitate which forms is separated. It is recrystallized from water to obtain a tris(tetramethylammonium) salt of the following formula:

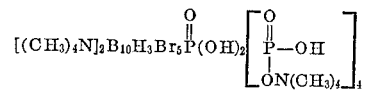

*Analysis.*—Calc'd for above salt: C, 16.2; H, 4.6; N, 4.7; P, 7.0; B, 12.2; Br, 44.9. Found: C, 18.9; H, 3.7; N, 5.5; P, 6.8; B, 12.1; Br, 45.8.

Hydrates of free acids of the formula $H_2B_{10}H_{10-y}X_y$ are readily obtained by passing an aqueous solution of the appropriate metal or diammonium salt through an acidic ion-exchange resin, e.g., the ion-exchange resin known commercially as "Amberlite" IR–120, acid form, or "Dowex" 50. The free acid is obtained from the aqueous solution by evaporation at moderately elevated temperature, e.g., 40–50° C., and at reduced pressure. The hydrates of the acids are generally written as hydronium compounds, i.e., $(H_3O)_2B_{10}H_{10-y}X_y \cdot nH_2O$, where n is a positive number, usually between 1–6, inclusive.

EXAMPLE 93

(A) The procedure of Example 43, Part A, is repeated up to, but not including, the addition of cesium fluoride.

At this point the aqueous solution which has been nitrosated and brominated, is passed through a chromatography column which is packed with an acidic ionic exchange resin of the type described earlier. The effluent, which is green, is evaporated under reduced pressure to yield the acid, dihydrogen heptabromodinitrohydrodecarboate(2−), i.e., $H_2B_{10}HBr_7(NO_2)_2$. The acid, as isolated, usually contains water of hydration and is a brown oil. The infrared spectrum of the compound is in agreement with the assigned structure.

(B) An aqueous solution of a substituted ammonium decabromodecaborate, prepared, by the process described in Example 4, Part A, is passed through a chromatography column (0.5″ diameter) containing, by volume, about 80 ml. of an acidic ion-exchange resin of the type described earlier. The water effluent is clear, colorless and acidic. The column is rinsed with more water until the effluent is no longer acidic and the water fractions are combined. The combined aqueous effluent is evaporated under about 1 mm. mercury pressure at a temperature of about 40° C. to obtain a concentrated solution of dihydrogen decabromodecaborate(2−), i.e., $H_2B_{10}Br_{10}$ or, as its hydronium salt, $(H_3O)_2B_{10}Br_{10}$.

By using aqueous or methanol solutions of the compounds prepared as described in the examples, solutions of the corresponding acids are obtained, as follows:

| Compound used: | Acid obtained (in aqueous solution) |
|---|---|
| $Na_2B_{10}H_2Cl_8$ | $H_2(B_{10}H_2Cl_8)$ |
| $[(CH_3)_4N]_2B_{10}H_5Br_5$ | $H_2(B_{10}H_5Br_5)$ |
| $[(CH_3)_4N]_2B_{10}H_3Br_7$ | $H_2(B_{10}H_3Br_7)$ |
| $Li_2B_{10}Br_{10}$ | $H_2(B_{10}Br_{10})$ |
| $[(CH_3)_4N]_2B_{10}H_6I_4$ | $H_2(B_{10}H_6I_4)$ |
| $[(CH_3)_4N]_2B_{10}H_4BrI_5$ | $H_2(B_{10}H_4BrI_5)$ |
| $[(C_2H_5)_4N]_2B_{10}H_9NO_2$ | $H_2(B_{10}H_9NO_2)$ |
| $Tl_2B_{10}H_8(OH)_2$ | $H_2B_{10}H_8(OH)_2$ |
| $Cs_2B_{10}Cl_8(OH)_2$ | $H_2B_{10}Cl_8(OH)_2$ |

Careful concentration of the solutions of the acids and intensive drying under low pressure and moderate temperature of the liquid residues yields the anhydrous acids or hydrates of the acids in the form of hydronium salts, i.e., acids of the general formula $$(H_3O)_2B_{10}H_{10-y}X_y \cdot nH_2O$$

where $n$, as defined earlier, is a positive number usually from 1–6, inclusive.

Acids having the decaborate anion, e.g., $H_2B_{10}H_{10}$, react with nitriles, e.g., acetonitrile, propionitrile and benzonitrile, to form substituted polyhydrodecaborates bearing one or more nitrogen-containing substituents.

The structure of the substituent groups has not been established exactly. The substituted compounds can be reacted with halogens, e.g., bromine, to obtain decaborates bearing both bromine and nitrogen-containing groups as substituents.

For example, a solution of 10 g. of $(NH_4)_2B_{10}H_{10}$ is passed through a column packed with an acidic ion-exchange resin. The aqueous effluent, which contains $H_2B_{10}H_{10}$, is concentrated in a rotary evaporator at about 25° C. to a thick syrup. Acetonitrile (50 ml.) is added to the syrup and the mixture is refluxed for a short period. During this time a gas is evolved which is not identified. The solution is cooled and blown with air to remove excess $CH_3CN$. The solid residue is crystallized from an acetonitrile-ethanol mixture to obtain 1.7 g. of a white crystalline product. It is further purified by crystallization from water. The infrared spectrum of the product shows characteristic absorption bands as follows (expressed as microns): 3.0, sharp; 9.6–10.1, broad with peaks at 9.6, 9.9 and 10.1. Elemental analysis of the product is as follows: C, 13.67; H, 5.58; B, 33.60; N, 4.61, 4.56, 4.44.

Metal salts of the invention can be prepared by neutralization of the acids, obtained as described above, in aqueous or alcohol solution with an aqueous solution or suspension of an inorganic base, e.g., an alkali or alkaline earth metal hydroxide. The resulting aqueous solution of the metal salt of the $(B_{10}H_{10-y}X_y)^{-2}$ anion is concentrated by evaporation of water or alcohol until the salt crystallizes out. In many cases the salt may precipitate during its preparation and evaporation of the solution is not necessary. The crystalline salt is dried under reduced pressure, e.g., 0.1 mm. of mercury, and moderately elevated temperature, e.g., 50–100° C. The metal salts frequently contain water of hydration which can be removed by heating for several hours at a temperature of about 200° C. under low pressure, e.g. 0.1 mm. mercury or lower. Specific examples of salts which are obtained by the process described above are $Na_2B_{10}H_2Cl_8$, $K_2B_{10}H_5Br_5$, $Li_2B_{10}H_3Br_7$, $Cs_2B_{10}Cl_{10}$ $MgB_{10}H_6I_4$, $BaB_{10}H_4BrI_5$, $CaB_{10}H_2Cl_8$, and $SrB_{10}H_3Br_7$.

Water-insoluble heavy metal salts of the acids can be prepared by adding a water-soluble heavy metal salt, e.g., silver nitrate or mercuric nitrate, to an aqueous solution of the boron containing acid, $H_2B_{10}H_{10-y}X_y$, whereupon the heavy metal salt of the $B_{10}H_{10-y}X_y^{-2}$ ion precipitates out as a white or light colored solid. The salts formed in this procedure are usually anhydrous. Examples of heavy metal salts which can be prepared by this method from halo-substituted compounds are $HgB_{10}H_2Cl_8$, $HgB_{10}H_5Br_5$, $Ag_2B_{10}H_3Br_7$, and $Ag_2B_{10}Br_{10}$. The procedure is generic to the preparation of metal salts of the compounds of the invention and it is not restricted to halogen-substituted compounds.

Light-sensitive salts, e.g., the silver salt, are preferably prepared under conditions providing minimum exposure to light although exclusion of light is not essential for operability. These salts are useful in photographic processes. To illustrate, a section of filter paper is dipped into dilute silver nitrate solution and then, in the absence of light, into a dilute aqueous solution of $$(H_3O)_2B_{10}Br_{10}$$

The filter paper is rinsed with water and dried in air in the absence of light. A portion of the dried paper is exposed for about 20 seconds to a sun lamp. The exposed portion and the unexposed portion are immersed in a commercial developing solution. There is formed a dark gray image on the portion of the paper which has been exposed to the sun lamp; no image forms on the unexposed portion.

Nitrates, carbonates, chlorides or oxides of metals can be used to prepare the salts by the methods described earlier. Specific examples of salts of other metals which can be prepared from the acids are $CuB_{10}H_2Cl_8$, $Zn(H_2O)_4B_{10}H_5Br_5$, $CdB_{10}H_3Br_7$, $Cr_2(H_2O)_6(B_{10}H_2Cl_8)_3$, $Mn(H_2O)_6B_{10}Br_{10}$, $[Fe(H_2O)_6]_2(B_{10}H_6I_4)_3$, $[Co(NH_3)_6]_2(B_{10}H_2Cl_8)_3$, $Ni(H_2O)_6(B_{10}H_3Br_7)$, $Sn(B_{10}Br_{10})_2$, and $Pb(B_{10}H_5Br_5)$.

Other salts which are obtained by the process are $Cu(H_2O)_4B_{10}H_9SO_2C_6H_5CH_3$ $$Zn(NH_3)_4B_{10}H_8\left(\overset{O}{\underset{\|}{C}}C_6H_5\right)_2$$

and $[Fe(H_2O)_6]_2[B_{10}H_9CH(CH_3)_2]_3$.

The following table illustrates further the salts which can be obtained by neutralizing the acids with a base or appropriate salt. Each of the acids is obtained by passing an aqueous or alcohol solution of a salt, whose preparation is illustrated in the examples, through a column filled with an acid ion-exchange resin. The effluent can be employed, if desired, without concentration.

TABLE

| Acid | Neutralizing Agent | Product |
| --- | --- | --- |
| $H_2B_{10}H_3Cl_5$ | $MgCO_3$ | $MgB_{10}H_5Cl_5$ |
| $H_2B_{10}H_9I$ | $La_2(CO_3)_3$ | $[La(H_2O)_x]_2[B_{10}H_9I]_3$ |
| $H_2B_{10}H_8I_2$ | $PbO$ | $Pb(B_{10}H_8I_2)$ |
| $H_2B_{10}H_9OH$ | $NH_2NH_2$ | $(NH_2NH_3)_2B_{10}H_9OH$ |
| $H_2B_{10}H_9OH$ | $Ca(OH)_2$ | $CaB_{10}H_9OH$ |
| $H_2B_{10}H_8(OH)_2$ | $Ga(OH)_3$ | $[Ga(H_2O)_x]_2[B_{10}H_8(OH)_2]_3$ |
| $H_2B_{10}Cl_9OH$ | $MnO$ | $Mn(H_2O)_6B_{10}Cl_9OH$ |
| $H_2B_{10}Cl_8(OH)_2$ | $FeCl_2$ | $[Fe(H_2O)_6]_2[B_{10}Cl_8(OH)_2]_3$ |
| $H_2B_{10}H_8(SCH_3)_2$ | $Co(OH)_3$ | $Co(H_2O)_6]B_{10}H_8(SCH_3)_2]$ |
| $H_2B_{10}H_8(SC_6H_5)_2$ | $Ni(OH)_2$ | $Ni(H_2O)_6[B_{10}H_8(SC_6H_5)_2]$ |
| $H_2B_{10}H_8(NH_2)_2$ | $(CH_3)_2NNH_2$ | $[(CH_3)_2NNH_3]_2B_{10}H_8(NH_2)_2$ |
| $H_2B_{10}H_8(NH_2)_2$ | $Ag_2O$ | $Ag_2B_{10}H_8(NH_2)_2]$ |
| $H_2B_{10}H_8(CH_3)_2$ | $CuO$ | $Cu(H_2O)_4B_{10}H_8(CH_3)_2$ |
| $H_2B_{10}H_8(CH_2OH)_2$ | $ZnCl_2$ | $Zn(H_2O)_4B_{10}H_8(CH_2OH)_2$ |
| $H_2B_{10}Cl_8(CH_2OH)_2$ | $HgCl_2$ | $HgB_{10}Cl_8(CH_2OH)_2$ |
| $H_2B_{10}H_8(COOH)_2$ | $AlCl_3 \cdot 6H_2O$ | $[Al(H_2O)_6]_2[B_{10}H_8(COOH)_2]_3$ |
| $H_2B_{10}C(O)NH_2]_2$ | $SnCl_2$ | $SnB_{10}H_8[C(O)NH_2]_2$ |
| $H_2B_{10}H_3I_5[C(O)OH]_2$ | $PbCl_2$ | $PbB_{10}H_3I_5[C(O)OH]_2$ |
| $H_2B_{10}Cl_8[C(O)C_6H_5]_2$ | $EuCl_3$ | $Eu_2[B_{10}Cl_8(COC_6H_5)_2]_3$ |
| $H_2B_{10}Cl_{10}$ | $UO_2(OH)_2$ | $(UO_2)B_{10}Cl_{10}$ |
| $H_2B_{10}H_8[OCH_2(CH_2)_{11}CH_3]_2$ | $NH_2NH_2$ | $(NH_2NH_3)_2B_{10}H_8[OCH_2(CH_2)_{11}CH_3]_2$ |
| $H_2B_{10}H_8[OCH_2CH_2CH_2OH]_2$ | $(CH_3)_2NNH_2$ | $[(CH_3)_2NNH_3]_2B_{10}H_8[OCH_2CH_2CH_2OH]_2$ |
| $H_2B_{10}Cl_8[OCH_2CH_2OCH_3]_2$ | $(C_{18}H_{37})_2NH$ | $[(C_{18}H_{37})_2NH_2]_2B_{10}Cl_8[OCH_2CH_2OCH_3]_2$ |
| $H_2B_{10}H_8(NCO)_2$ | $(C_6H_{11})_3N$ | $[(C_6H_{11})_3NH_2]_2B_{10}H_8(NCO)_2$ |
| $H_2B_{10}Cl_8(NCO)_2$ | $C_9H_7N$ (quinoline) | $(C_9H_7NH)_2B_{10}Cl_8(NCO)_2$ |
| $H_2B_{10}Br_8(NH_2)_2$ | $Zn(NH_3)_4Cl$ | $[Zn(NH_3)_4]_2B_{10}Br_8(NH_2)_2$ |
| $H_2B_{10}Cl_8(N_3)_2$ | $Co(NH_3)_4Cl$ | $[Co(NH_3)_4]_2B_{10}Cl_8(N_3)_2$ |
| $H_2B_{10}Cl_9C_{18}H_{37}$ | $(CH_3)_3SOH$ | $[(CH_3)_3S]_2B_{12}Cl_9C_{18}H_{37}$ |
| $H_2B_{10}H_2Cl_6(SCH_3)_2$ | $C_6H_5N_5NCl$ | $(C_6H_5N_2)_2B_{10}H_2Cl_6(SCH_3)_2$ |
| $H_2B_{10}Cl_8[C(O)C_6H_2Cl_2]$ | $(C_4H_9)_4PCl$ | $[(C_4H_9)_4P]_2B_{10}Cl_9[C(O)C_6H_3Cl_2]$ |
| $H_2B_{10}H_8(OH)_2$ | $NH_2CH_2COOH$ | $(HOOCCH_2NH_3)_2B_{10}H_8(OH)_2$ |
| $H_2B_{10}Cl_{10}$ | $CeCl_3$ | $Ce_2(B_{10}Cl_{10})_3$ |
| $H_2B_{10}Cl_{10}$ | $C_5H_5N(C_{16}H_{33})Br$ | $[C_5H_5N(C_{16}H_{33})]_2B_{10}Cl_{10}$ |
| $H_2B_{10}H_5Cl_5$ | $Co(NH_2CH_2CH_2NH_2)_3Cl_2$ | $[Co(NH_2CH_2CH_2NH_2)_3]B_{10}H_5Cl_5$ |

The preceding examples illustrate broadly the substitution, replacement and metathetic reactions which the $B_{10}H_{10}$ anion undergoes, employing techniques which are in many cases appropriate for effecting hydrogen substitution reactions on carbons of a benzene nucleus. The substitution reactions employed for carbocyclic aromatic compounds may be employed or modifications of these reactions be used. Versatile intermediates, illustrated in the examples, are employed in many cases. Thus, decaborate derivatives bearing sulfo groups (—$SO_3H$) may be obtained by reacting $B_{10}H_8 \cdot 2N_2$ with sulfur dioxide and hydrolyzing the resulting product. The sulfo substituted compounds, i.e., products where X is —$SO_3H$, can be neutralized with bases ($NA_2CO_3$, $NH_4OH$, and the like) to obtain salts such as $Na_2B_{10}H_9SO_3Na$ or $$(NH_4)_2B_{10}H_9SO_3NH_4$$

Compounds bearing sulfonic groups can be reacted with $PCl_5$ to obtain products bearing sulfonyl chloride groups, e.g., $H_2B_{10}H_9SO_2Cl$. The sulfonyl chlorides can be reacted with amines, e.g., $CH_3NH_2$, to obtain compounds bearing sulfamyl groups, e.g., $(CH_3NH_3)_2B_{10}H_9SO_2NHCH_3$.

Compounds bearing amine, hydroxyl and isocyanate groups have been described in the examples. The substituent groups in these compounds, i.e., the —$NH_2$, —OH and —NCO groups undergo the same or similar types of reaction as their counterparts in organic chemistry. Thus, the organic chemistry of aromatic amines, phenols and isocyanates can be applied to these compounds of the invention to provide a wide range of compounds bearing other substituents. These compounds are, therefore, valuable and versatile intermediates which can be employed by a skilled organic chemist to obtain products which fall within the scope of the invention. To illustrate, a compound of the invention bearing —$NH_2$ groups can be reacted (1) with an isocyanate to form a product bearing ureido or ureylene groups, e.g., $$Tl_2B_{10}H_8(NH_2)_2$$

or its equivalent can be reacted with $C_6H_5NCO$ to form $Tl_2B_{10}H_8[NHC(O)NHC_6H_5]_2$, (2) with isothiocyanates to obtain products bearing thioureido or thioureylene groups, e.g., $Tl_2B_{10}H_8(NH_2)_2$ can be reacted with allyl isothiocyanate to obtain $Tl_2B_{10}H_8[NHC(S)NHC_3H_5]_2$, (3) with sulfonyl chlorides to obtain products which bear sulfonamino groups, e.g., $H_2B_{10}H_8(NH_2)_2$ can be reacted with $C_6H_5SO_2Cl$ to obtain $H_2B_{10}H_8(NHSO_2C_6H_5)_2$, and (4) with oxiranes to obtain hydroxyhydrocarbylamino-substituted compounds, e.g., $[(CH_3)_4N]_2B_{10}H_9NH_2$, can be reacted with glycidol to obtain $$[(CH_3)_4N]_2B_{10}H_9NHCH_2CH(OH)CH_2OH$$

As further illustrations, compounds of the invention bearing hydroxyl substituents can be reacted, as described above for the amine-substituted compounds, with isocyanates, isothiocyanates, sulfonyl halides and oxiranes to obtain products which bear N-substituted carbamyloxy groups [—NHC(O)O—], N-substituted thiocarbamyloxy groups [—NHC(S)O—], sulfonyloxy groups [—S(O)$_2$O—] and hydroxyl-bearing ether groups. To illustrate, by reacting (1) $Cs_2B_{10}Cl_9OH$ with $C_2H_5NCO$, the compound $Cs_2B_{10}Cl_9OC(O)NHC_2H_5$ can be obtained, (2) $Cs_2B_{10}Cl_8(OH)_2$ with phenylisothiocyanate will yield $Cs_2B_{10}Cl_8[OC(S)NHC_6N_5]_2$, (3)

$$[(CH_3)_4N]_2B_{10}H_8(OH)_2$$

with ethylene oxide will yield $$[(CH_3)_4N]_2B_{10}H_8(OCH_2CH_2OH)_2$$

and (4) $[(CH_3)_4N]_2B_{10}H_3Cl_6OH$ reacted with $$CH_3C_6H_4SO_2Cl$$

will yield $[(CH_3)_4N]_2B_{10}H_3Cl_6OS(O)_2C_6H_4CH_3$.

Compounds bearing the anion $B_{10}H_8(NCO)_2^{-2}$ can be reacted with alcohols, mercaptans, amines and the like to obtain products bearing carbamyl and thiocarbamyl substituents in which the nitrogen is bonded to the boron cage, and also ureylene groups. To illustrate, compounds which can be obtained include $$Cs_2B_{10}H_8[NHC(O)OC_2H_5]_2$$

$$Tl_2B_{10}H_8[NHC(O)SC_6H_5]_2$$

and $$[(CH_3)_4N]_2B_{10}H_8[NHC(O)NHC_6H_5]_2$$

The nitro-substituted decaborate compounds can, if desired, be reduced with hydrogen to amino-substituted decaborate derivatives, i.e., compounds of the general formula $M_a[B_{10}H_{10-y}(NH_2)_y]_b$, where M, a, b and y have the meanings given in earlier paragraphs. Conventional processes employing iron and a mineral acid are satisfactory for use in the reduction step. To illustrate, by reduction of the appropriate nitro derivatives, there can be obtained $(NH_4)_2B_{10}Cl_5(NH_2)_5$, $$[CH_3)_4N]_2B_{10}H_5(NH_2)_5$$

$Cs_2B_{10}H_7(NH_2)_3$, $Na_2B_{10}H_8(NH_2)_2$, and the like.

Compounds of the invention in which at least one X is alkynyl can be obtained from derivatives bearing open chain acyl groups by reaction with a halogenating agent followed by dehydrohalogenation. To illustrate, $$(NH_4)_2B_{10}H_8[C(O)CH_3]_2$$

can be reacted with PCl$_5$ to obtain $$(NH_4)_2B_{10}H_8(CCl_2CH_3)_2$$

This compound can then be dehydrohalogenated with, e.g., aqueous KOH solution, to obtain $$(NH_4)_2B_{10}H_8(C\equiv CH)_2$$

Compounds in which at least one X is halomethyl are obtained by reacting compounds bearing hydroxymethyl groups with concentrated hydrohalogenic acids. For example, a mixture of 5 g. of $[(CH_3)_4N]_2B_{10}Cl_8(CH_2OH)_2$ and 75 ml. of concentrated hydrobromic acid (from which any free bromine has been removed) is refluxed for 2 hours. The mixture is cooled and the solid product (ca 4.7 g.) which is present is separated by filtration. The product is recrystallized from aqueous CH$_3$CN to obtain $[(CH_3)_4N]_2B_{10}Cl_8(CH_2Br)_2$. Elemental analyses are as follows: C, 16.5; H, 3.9; B, 14.9; Cl, 39.0; Br, 21.8.

Compounds of the invention bearing —SH groups can be oxidized to obtain compounds bearing —SO$_3$H groups. To illustrate, $[(CH_3)_4N]_2B_{10}Cl_8(SH)_2$ can be oxidized, e.g., with hydrogen peroxide, potassium permanganate, and the like, to obtain $[(CH_3)_4N]_2B_{10}Cl_8(SO_3H)_2$.

Utility

The invention provides a broad class of new boron compounds which find applications in many fields. The compounds are useful as intermediates in the preparation of dyes or then can be used directly as dyes. This application has been illustrated in many of the preceding examples.

The compounds of the invention are generically useful as components of fireworks compositions to impart a pleasing color and sparkle to the display. Every one of the compounds of the invention contains an anion which has boron as a common component. The presence of this element imparts a green color to a fireworks, rocket or flare display. The compounds of the invention can have a wide range of cations, designated as M, and it is thus possible to provide a broad range of colors in any display or flare by choice of the appropriate cation. The compounds of the invention can be used in combination with oxidizing agents, e.g., lithium perchlorate, sodium nitrate, potassium permanganate, strontium peroxide, manganese dioxide, and the like, to provide the desired propulsive effect and color. The following combinations, in which the boron-containing compounds can be from 5–25% by weight of the combination, are illustrative of the compositions which can be used:

$(NH_4)_2B_{10}H_5Cl_5$—NaO$_3$,
Cs$_2$B$_{10}$H$_3$I$_2$—LiNO$_3$,
$[(CH_3)_4N]_2B_{10}H_8(NH_2)_2$—SrCl$_2$—NaNO$_3$,
$[(CH_3)_4P]_2B_{10}H_8[C(O)OH]_2$—Co(NO$_3$)$_2$,
$[(CH_3)_3S]_2B_{10}Cl_{10}$—KMnO$_4$,
Cs$_2$B$_{10}$H$_8$(OCH$_2$CH$_2$OC$_6$H$_5$)$_2$—NH$_4$NO$_3$,
Na$_2$B$_{10}$H$_8$[C(O)C$_6$H$_5$]$_2$—LiClO$_4$,
H$_2$B$_{10}$H$_7$C$_{10}$H$_{17}$[C(O)OCH$_3$]$_2$—NH$_4$NO$_3$KMnO$_4$,
$[(CH_3)_4N]_2B_{10}H_9$I—MnO$_2$—Sr(NO$_3$)$_2$—NaClO$_4$, and the like. These examples are not limiting but are illustrative of the combinations which are possible for use in the above field.

The compounds of the invention are useful in the field of high energy fuels. For this purpose, partially substituted compounds are preferred, i.e., compounds having one to three substituents on the decaborate anion. The compounds can be used in combination with oxidizing agents, e.g., nitric acid, fluorine oxide, and the like. They can be used in solution in hydrazine or N,N-disubstituted hydrazines, e.g., N,N-dimethylhydrazine. They are useful, therefore, as components of liquid and solid rocket propellant fuels. To illustrate, combinations which can be employed include H$_2$B$_{10}$H$_8$(CH$_3$)$_2$ in hydrazine, $$(NH_2NH_3)_2B_{10}H_9OH$$

in hydrazine, $[(CH_3)_2NNH_3]_2B_{10}H_8(NH_2)_2$ in $$(CH_3)_2NNH_2$$

H$_2$B$_{10}$H$_8$(NH$_2$)$_2$ in hydrazine, and the like. The boron-containing component can be present in from about 5–50% by weight of the solution.

The compounds of the invention, exclusive of the fully halogenated products, are useful as impregnating agents in the preparation of resistors. To illustrate, a section of a cotton string is immersed in a nearly saturated solution of $[(CH_3)_4N]_2B_{10}H_9C(O)C_6H_5$ in a mixture of acetonitrile and hydrochloric acid. The string is withdrawn from the solution and the solvent is removed by drying in air. A free flame is applied to the dried impregnated string and it burns to yield a coherent ash which in size and shape resembles the original string. The residual skeleton is of sufficient coherence to permit embedding in paraffin. The section of residue, so treated, shows a resistance in excess of 10,000 ohms/inch. The residue from the control section of string is very small and shapeless and it cannot be handled. All of the compounds of the invention, illustrated generically in the examples, exclusive of those which have 10 halogens bonded to boron, are useful in the above application.

Highly halogenated compounds, e.g., the salts of B$_{10}$Br$_{10}$ anion, are useful as impregnating agents for retarding the combustion of cellulosic products. To illustrate, filter paper which has been treated with an aqueous solution of (NH$_4$)$_2$B$_{10}$Br$_{10}$ and dried, does not burn freely when touched with a free flame.

The nitrated and nitroso-substituted compounds are useful as explosives or detonating agents.

In the group of compounds which fall within the scope of Formula 1, the component M represents a range of groups which are readily interchangeable by metathetic reactions as described earlier. All of the salts which fall within the scope of Formula 1 can be used to prepare the group of acids represented generically as H$_2$B$_{10}$H$_{10-y}$X$_y$ or, in aqueous solution, as (H$_3$O)$_2$B$_{10}$H$_{10-y}$X$_y$ by passing aqueous or alcoholic solutions of the salts through an acidic ion-exchange resin as described earlier. The acids of this group, exclusive of compounds in which X is an amine group, are strong acids and they are useful in industrial applications where it is desired to avoid contamination from sulfate, chloride, bromide, chlorate, phosphate, and like strong acid anions. Thus, the acids are useful for etching metals, such as steel, and for rust removal, for pickling, for scale removal and for similar metal processing operations.

The acids, described above, are useful as catalysts in the preparation of esters, e.g., in the reaction of alcohols and organic carboxylic acids, to improve the yields of the desired esters. The acids of the invention are employed for this purpose in the same manner as p-toluenesulfonic acid, sulfuric acid or alcoholic hydrogen chloride.

Aqueous solutions of the acids are useful as agents for absorbing noxious basic materials from the air, e.g., traces of ammonia, lower alkyl amines and the like. To illustrate, air contaminated with methylamines is passed through an aqueous solution of H$_2$B$_{10}$H$_8$(OH)$_2$ and the amines are removed.

The acids and many of the salts, particularly the alkali metal and alkaline earth metal salts, are useful as sequestering agents for heavy metals. Thus, a mixture of hydrocarbons in the boiling range of gasoline which contains a copper salt of an organic acid (copper stearate), is thoroughly agitated with aqueous ammoniacal solutions of any of the alkali metal or alkaline earth metal salts of the anion $(B_{10}H_{10-y}X_y)^{-2}$, e.g., Cs$_2$B$_{10}$H$_9$C(O)C$_6$H$_5$, $$Na_2B_{10}H_8(OH)_2$$

and the like. The hydrocarbon layer, which is separated from the aqueous reagent, is completely free of deleterious copper salt.

The new compounds, particularly the acids, alkali metal, alkaline earth metal and ammonia, salts, are useful as sequestering agents for metals in aqueous media. Thus, copper, nickel, cobalt, zinc and cadmium are removed from aqueous solutions of salts containing these metals by mixing the solutions with ammoniacal solutions of the acids and alkali metal, alkaline earth metal and ammonium salts.

The substituted ammonium salts and, in general, all of the nitrogen-base salts as well as phosphonium and sulfonium salts are useful in the field of sequestering agents to remove undesirable metals from aqueous or hydrocarbon media, e.g., $[(CH_3)_4N]_2B_{10}H_8[OC(O)H]_2$, $[(C_2H_5)_3NH]_2B_{10}H_9OCH_2CH_2OCH_3$, and the like.

The silver salts, i.e., the compounds of Formula 1 where M is Ag, are sensitive to light and they are useful in the photographic arts as described previously. As a further illustration, the cesium salt, $Cs_2B_{10}H_9OC(O)H$, is reacted with silver nitrate to obtain $Ag_2B_{10}H_9OC(O)H$. An alcoholic solution of the silver salt is prepared in subdued light and a strip of pure cellulose sheet is immersed to half its length in the solution. The strip is removed and dried in the absence of light. When exposed to light the treated portion of the strip turns dark, while the untreated portion is not affected.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A compound of the formula $M_a(B_{10}H_{10-y}X_y)_b$ wherein M is a cation having the property of forming a positively charged group in water; X is a monovalent group which has the characterizing property of forming X—C bonds when C represents a carbon which is a nuclear member of a benzene ring and where the X—C bond is formed in place of the H—C bond and when more than one X group is present the Xs can be different; y is a positive whole number of 1 through 10, inclusive; and a and b are positive whole numbers of 1 through 3, inclusive and a multiplied by the valence of M is equal to 2b.

2. A compound of claim 1 wherein X comprises halogen.
3. A compound of claim 1 wherein X comprises hydrocarbon.
4. A compound of claim 1 wherein X comprises acyl.
5. A compound of claim 1 wherein X comprises nitro.
6. A compound of claim 1 wherein X comprises amino.
7. A compound of claim 1 wherein X comprises hydroxyl.
8. A compound of claim 1 wherein X comprises carboxyl.
9. A compound of claim 1 wherein X comprises isocyanato.
10. A compound of claim 1 wherein X comprises hydrocarbyloxy.
11. A compound of claim 1 wherein X comprises cyano.
12. A compound of claim 1 wherein X comprises azido.
13. A compound of claim 1 wherein X comprises hydroxymethyl.
14. A compound of claim 1 wherein X comprises hydrocarbyloxycarbonyl.
15. A compound of claim 1 wherein X comprises carbamyl.
16. A compound of claim 1 wherein X comprises thiol.
17. Compounds selected from the class consisting of $H_2B_{10}Cl_8(OH)_2$ and hydrates thereof.
18. Compounds selected from the class consisting of $H_2B_{10}Br_{10}$ and hydrates thereof.
19. Compounds selected from the class consisting of $H_2B_{10}I_{10}$ and hydrates thereof.
20. The compound disilver nonabromo(methoxyethoxy)decaborate(2−), said compound having the formula $Ag_2B_{10}Br_9OCH_2CH_2OCH_3$.
21. The compound bis(tetramethylammonium) octachlorodihydrodecaborate(2−), said compound having the formula $[(CH_3)_4N]_2B_{10}H_2Cl_8$.
22. The compound tetramethylammonium hydrogen (dimethylamino)nonahydrodecaborate(2−), said compound having the formula $(CH_3)_4NHB_{10}H_9N(CH_3)_2$.
23. The compound bis(tetramethylammonium) dihydrooctachlorodi(methylmercapto)decaborate(2−), said compound having the formula $$[(CH_3)_4N]_2B_{10}H_2Cl_6(SCH_3)_2$$

24. The compound bis(tetramethylammonium) (2-methoxyethoxy)nonahydrodecaborate(2−), said compound having the formula $$[(CH_3)_4N]_2B_{10}H_9OCH_2CH_2OCH_3$$

25. The compound of claim 1 wherein X is selected from the class consisting of halogen, hydrocarbon, acyl, nitro, amino, hydroxyl, carboxyl, isocyanato, hydrocarbyloxy, cyano, azido, hydroxymethyl, hydrocarbyloxycarbonyl, carbamyl, and thiol.
26. The compound of claim 1 wherein X is selected from the class consisting of carboxyl, isocyanato, azido and hydroxyl.
27. The compound of claim 25 wherein M is a cation selected from the class consisting of hydrogen, alkali metal and tetramethylammonium.
28. The compound of claim 26 wherein M is a cation selected from the class consisting of hydrogen, alkali metal and tetramethylammonium.
29. A process for preparing compounds having the formula $$M_a(B_{10}H_{10-y}X_y)_b$$

wherein M is a cation having the property of forming a positively charged group in water, X is a group which has the characterizing property of forming X—X bonds when C represents a carbon which is a nuclear member of a benzene ring and where the X—C bond is formed in place of the H—C bond, and when more than one X group is present the X's can be different, y is a positive whole number of 1 through 10 inclusive, and a and b are positive whole numbers of 1 through 3 inclusive and a multiplied by the valence of M is equal to 2b, which comprises the step of contacting and reacting a boron containing compound of the general formula $M_a(B_{10}H_{10})_b$ with a reagent capable of introducing an electrophilic group into a benzene nucleus by replacement of hydrogen bonded to a carbon of said nucleus.

References Cited

UNITED STATES PATENTS 3,009,961  11/1961  Knoth _____ 260—606.5

FOREIGN PATENTS 885,063  10/1958  Great Britain.

OSCAR R. VERTIZ, *Primary Examiner.*

H. S. MILLER, *Examiner.*